(12) United States Patent
Evulet

(10) Patent No.: US 11,001,378 B2
(45) Date of Patent: *May 11, 2021

(54) CONFIGURATION FOR VERTICAL TAKE-OFF AND LANDING SYSTEM FOR AERIAL VEHICLES

(71) Applicant: JETOPTERA, INC., Edmonds, WA (US)

(72) Inventor: Andrei Evulet, Edmonds, WA (US)

(73) Assignee: JETOPTERA, INC., Edmonds, WA (US)

( * ) Notice: Subject to any disclaimer, the term of this patent is extended or adjusted under 35 U.S.C. 154(b) by 500 days.

This patent is subject to a terminal disclaimer.

(21) Appl. No.: 16/020,802

(22) Filed: Jun. 27, 2018

(65) Prior Publication Data

US 2018/0305007 A1    Oct. 25, 2018

Related U.S. Application Data

(63) Continuation-in-part of application No. PCT/US2018/037902, filed on Jun. 15, 2018, and a
(Continued)

(51) Int. Cl.
*B64C 29/00* (2006.01)
*B64C 15/02* (2006.01)
(Continued)

(52) U.S. Cl.
CPC .............. *B64C 29/005* (2013.01); *B64C 3/16* (2013.01); *B64C 15/02* (2013.01);
(Continued)

(58) Field of Classification Search
CPC ....... B64C 29/04; B64C 11/001; B64C 15/02; B64C 21/00
(Continued)

(56) References Cited

U.S. PATENT DOCUMENTS 3,831,887 A * 8/1974 Fosness .............. B64C 29/0091
244/207
4,796,836 A  1/1989 Buchelt
(Continued)

FOREIGN PATENT DOCUMENTS

AU  2009100459 A4  7/2009
AU  2011356667 A1  8/2013
(Continued)

OTHER PUBLICATIONS

Larry D Birckelbaw, "High Speed Aerodynamics of Upper Surface Blowing Aircraft Configurations", 10th Applied Aerodynamics Conference, 1992, pp. 100-116, California, USA.
(Continued)

*Primary Examiner* — Christopher P Ellis
(74) *Attorney, Agent, or Firm* — P. G. Scott Born; Foster Garvey PC

(57) ABSTRACT

A vehicle, includes a main body. A fluid generator is coupled to the main body and produces a fluid stream. At least one tail conduit is fluidly coupled to the generator. First and second fore ejectors are coupled to the main body and respectively coupled to a starboard side and port side of the vehicle. The fore ejectors respectively comprise an outlet structure out of which fluid flows. At least one tail ejector is fluidly coupled to the tail conduit. The tail ejector comprises an outlet structure out of which fluid flows. A primary airfoil element includes a closed wing having a leading edge and a trailing edge. The leading and trailing edges of the closed wing define an interior region. The at least one propulsion device is at least partially disposed within the interior region.

19 Claims, 15 Drawing Sheets

Related U.S. Application Data continuation-in-part of application No. 29/645,616, filed on Apr. 27, 2018, now Pat. No. Des. 868,627, and a continuation-in-part of application No. 29/625,624, filed on Nov. 10, 2017, now Pat. No. Des. 856,899, and a continuation-in-part of application No. 29/625,625, filed on Nov. 10, 2017, now Pat. No. Des. 883,899, and a continuation-in-part of application No. 29/625,627, filed on Nov. 10, 2017, now Pat. No. Des. 887,950, and a continuation-in-part of application No. 15/670,947, filed on Aug. 7, 2017, now abandoned.

(60) Provisional application No. 62/677,419, filed on May 29, 2018, provisional application No. 62/673,094, filed on May 17, 2018, provisional application No. 62/629,626, filed on Feb. 12, 2018, provisional application No. 62/531,817, filed on Jul. 12, 2017, provisional application No. 62/525,592, filed on Jun. 27, 2017, provisional application No. 62/371,926, filed on Aug. 8, 2016.

(51) Int. Cl.
  *B64C 39/12* (2006.01)
  *B64C 3/16* (2006.01)
  *B64D 33/04* (2006.01)
  *B64D 27/16* (2006.01)
  *B64C 39/06* (2006.01)
  *B64D 27/18* (2006.01)

(52) U.S. Cl.
  CPC ........ *B64C 29/0066* (2013.01); *B64C 39/066* (2013.01); *B64C 39/068* (2013.01); *B64C 39/12* (2013.01); *B64D 27/16* (2013.01); *B64D 27/18* (2013.01); *B64D 33/04* (2013.01)

(58) Field of Classification Search
  USPC ........................................................ 244/7 C
  See application file for complete search history.

(56) References Cited

U.S. PATENT DOCUMENTS

| | | | |
|---|---|---|---|
| 4,898,343 A | 2/1990 | Kamo | |
| 5,035,377 A | 7/1991 | Buchelt | |
| 5,096,012 A | 3/1992 | Chia et al. | |
| 5,098,034 A | 3/1992 | Lendriet | |
| 5,102,067 A | 4/1992 | Weiner et al. | |
| 5,115,996 A | 5/1992 | Moller | |
| 5,123,613 A | 6/1992 | Piasecki | |
| 5,129,602 A | 7/1992 | Leonard | |
| 5,145,129 A | 9/1992 | Gebhard | |
| 5,149,012 A | 9/1992 | Valverde | |
| 5,152,478 A | 10/1992 | Cycon et al. | |
| 5,154,052 A | 10/1992 | Giffin et al. | |
| 5,158,251 A | 10/1992 | Taylor | |
| 5,161,953 A | 11/1992 | Burtis | |
| 5,170,963 A | 12/1992 | Beck | |
| 5,170,964 A | 12/1992 | Enderle et al. | |
| 5,174,523 A | 12/1992 | Balmford | |
| 5,178,344 A | 1/1993 | Dlouhy | |
| 5,201,478 A | 4/1993 | Wooley | |
| 5,209,428 A | 5/1993 | Bevilaqua et al. | |
| 5,240,206 A | 8/1993 | Omiya | |
| 5,242,132 A | 9/1993 | Wukowitz | |
| 5,244,167 A | 9/1993 | Turk et al. | |
| 5,246,188 A | 9/1993 | Koutsoupidis | |
| 5,251,846 A | 10/1993 | Rethorst | |
| 5,253,828 A | 10/1993 | Cox | |
| 5,267,626 A | 12/1993 | Tanfield | |
| 5,277,381 A | 1/1994 | Piasecki | |
| 5,280,863 A | 1/1994 | Schmittle | |
| 5,282,357 A | 2/1994 | Sackheim | |
| 5,295,643 A | 3/1994 | Ebbert et al. | |
| 5,312,069 A | 5/1994 | Bollinger et al. | |
| 5,320,306 A | 6/1994 | Gennaro | |
| 5,340,057 A | 8/1994 | Schmittle | |
| 5,351,911 A | 10/1994 | Neumayr | |
| 5,358,156 A | 10/1994 | Rethorst | |
| 5,390,877 A | 2/1995 | Nightingale | |
| 5,395,073 A | 3/1995 | Rutan et al. | |
| 5,407,150 A | 4/1995 | Sadleir | |
| 5,435,489 A | 7/1995 | Jenkins et al. | |
| 5,454,530 A | 10/1995 | Rutherford et al. | |
| 5,454,531 A | 10/1995 | Melkuti | |
| 5,503,351 A | 4/1996 | Vass | |
| 5,531,400 A | 7/1996 | Demidov et al. | |
| 5,560,568 A | 10/1996 | Schmittle | |
| RE35,387 E | 12/1996 | Strom | |
| 5,676,333 A | 10/1997 | Rethorst | |
| 5,687,934 A | 11/1997 | Owens | |
| 5,697,468 A * | 12/1997 | Russell, Jr. | B60V 1/22 180/116 |
| 5,713,537 A | 2/1998 | Tindell | |
| 5,727,754 A | 3/1998 | Carter | |
| 5,758,844 A | 6/1998 | Cummings | |
| 5,765,776 A | 6/1998 | Rogers et al. | |
| 5,765,777 A | 6/1998 | Schmittle | |
| 5,769,317 A | 6/1998 | Sokhey et al. | |
| 5,769,359 A | 6/1998 | Rutan et al. | |
| 5,779,188 A | 7/1998 | Frick | |
| 5,791,601 A | 8/1998 | Dancila et al. | |
| 5,791,875 A | 8/1998 | Ngo | |
| 5,803,199 A | 9/1998 | Walter | |
| 5,810,284 A | 9/1998 | Hibbs et al. | |
| 5,823,468 A | 10/1998 | Bothe | |
| 5,829,714 A | 11/1998 | Lechtenberg | |
| 5,836,542 A | 11/1998 | Burns | |
| 5,863,013 A | 1/1999 | Schmittle | |
| 5,881,970 A | 3/1999 | Whitesides | |
| 5,897,078 A | 4/1999 | Burnham et al. | |
| 5,904,320 A | 5/1999 | Tindell | |
| 5,934,873 A | 8/1999 | Greene | |
| 5,951,608 A | 9/1999 | Osder | |
| 5,971,320 A | 10/1999 | Jermyn et al. | |
| 5,975,462 A | 11/1999 | Platzer | |
| 5,984,229 A | 11/1999 | Hollowell et al. | |
| 5,992,792 A | 11/1999 | Arnason | |
| 5,996,933 A | 12/1999 | Schier | |
| 6,000,635 A | 12/1999 | Justice | |
| 6,015,115 A | 1/2000 | Dorsett et al. | |
| 6,016,996 A | 1/2000 | Angel | |
| 6,036,142 A | 3/2000 | Yates | |
| 6,073,881 A | 6/2000 | Chen | |
| 6,082,478 A | 7/2000 | Walter et al. | |
| 6,086,015 A | 7/2000 | Maccready | |
| 6,086,016 A | 7/2000 | Meek | |
| 6,105,901 A | 8/2000 | Ulanoski et al. | |
| 6,113,028 A | 9/2000 | Lohse et al. | |
| 6,113,029 A | 9/2000 | Salinas | |
| 6,135,393 A | 10/2000 | Sackheim et al. | |
| 6,142,425 A | 11/2000 | Armanios et al. | |
| 6,171,055 B1 | 1/2001 | Vos et al. | |
| 6,193,187 B1 | 2/2001 | Scott et al. | |
| 6,259,976 B1 | 7/2001 | Lemelson et al. | |
| 6,270,036 B1 | 8/2001 | Lowe | |
| 6,318,668 B1 | 11/2001 | Ulanoski et al. | |
| 6,336,319 B1 | 1/2002 | Koshoffer | |
| 6,340,289 B1 | 1/2002 | Vos et al. | |
| 6,352,219 B1 | 3/2002 | Zelic | |
| 6,367,243 B1 | 4/2002 | Schmidt | |
| 6,367,737 B1 | 4/2002 | Lohse et al. | |
| 6,382,559 B1 | 5/2002 | Sutterfield et al. | |
| 6,382,560 B1 | 5/2002 | Ow | |
| 6,398,157 B1 | 6/2002 | Ingram | |
| 6,415,597 B1 | 7/2002 | Futamura et al. | |
| 6,464,166 B1 | 10/2002 | Yoeli | |
| 6,471,158 B1 | 10/2002 | Davis | |
| 6,474,603 B1 | 11/2002 | Kinkead et al. | |
| 6,513,752 B2 | 2/2003 | Carter | |
| 6,561,456 B1 | 5/2003 | Devine | |
| 6,568,171 B2 | 5/2003 | Bulman | |

(56) References Cited

U.S. PATENT DOCUMENTS

| | | |
|---|---|---|
| 6,568,630 B2 | 5/2003 | Yoeli |
| 6,575,406 B2 | 6/2003 | Nelson |
| 6,592,071 B2 | 7/2003 | Kinkead et al. |
| 6,607,162 B2 | 8/2003 | Warsop et al. |
| 6,616,094 B2 | 9/2003 | Illingworth |
| 6,622,472 B2 | 9/2003 | Plumpe |
| 6,622,962 B1 | 9/2003 | White |
| 6,655,631 B2 | 12/2003 | Austen brown |
| 6,662,086 B2 | 12/2003 | Lemelson et al. |
| 6,691,949 B2 | 2/2004 | Plump et al. |
| 6,695,251 B2 | 2/2004 | Rodden et al. |
| 6,751,530 B2 | 6/2004 | Seifert et al. |
| 6,786,040 B2 | 9/2004 | Boehnlein et al. |
| 6,786,450 B1 | 9/2004 | Einstein |
| 6,793,172 B2 | 9/2004 | Liotta |
| 6,793,174 B2 | 9/2004 | Ouellette et al. |
| 6,808,140 B2 | 10/2004 | Moller |
| 6,817,570 B2 | 11/2004 | Yoeli |
| 6,824,095 B2 | 11/2004 | Mao |
| 6,824,097 B1 | 11/2004 | Ouellette et al. |
| 6,824,109 B2 | 11/2004 | Garver |
| 6,840,478 B2 | 1/2005 | Carr |
| 6,843,447 B2 | 1/2005 | Morgan |
| 6,848,647 B2 | 2/2005 | Albrecht |
| 6,848,649 B2 | 2/2005 | Churchman |
| 6,851,650 B2 | 2/2005 | Sankrithi |
| 6,854,686 B2 | 2/2005 | Perlo et al. |
| 6,860,449 B1 | 3/2005 | Chen |
| 6,863,241 B2 | 3/2005 | Sash |
| 6,880,784 B1 | 4/2005 | Wilkinson et al. |
| 6,883,748 B2 | 4/2005 | Yoeli |
| 6,885,917 B2 | 4/2005 | Osder et al. |
| 6,886,776 B2 | 5/2005 | Wagner et al. |
| 6,892,979 B2 | 5/2005 | Milde |
| 6,892,980 B2 | 5/2005 | Kawai |
| 6,918,244 B2 | 7/2005 | Dickau |
| 6,926,229 B2 | 8/2005 | Cummings et al. |
| 6,926,231 B2 | 8/2005 | Ouellette et al. |
| 6,938,854 B2 | 9/2005 | Nelson |
| 6,948,682 B1 | 9/2005 | Stephenson et al. |
| 6,974,106 B2 | 12/2005 | Churchman |
| 6,976,653 B2 | 12/2005 | Perlo et al. |
| 6,976,654 B2 | 12/2005 | Ouellette et al. |
| 6,983,587 B2 | 1/2006 | Shumate |
| 7,032,698 B2 | 4/2006 | Lee et al. |
| 7,032,861 B2 | 4/2006 | Sanders et al. |
| 7,040,574 B2 | 5/2006 | Richards |
| 7,104,498 B2 | 9/2006 | Englar et al. |
| 7,118,066 B2 | 10/2006 | Allen |
| 7,121,503 B2 | 10/2006 | Cordy |
| 7,137,592 B2 | 11/2006 | Barocela et al. |
| 7,143,973 B2 | 12/2006 | Ballew |
| 7,147,182 B1 | 12/2006 | Flanigan |
| 7,147,183 B1 | 12/2006 | Carr et al. |
| 7,150,432 B2 | 12/2006 | Ouellette et al. |
| 7,159,817 B2 | 1/2007 | Vandermey et al. |
| 7,188,802 B2 | 3/2007 | Magre |
| 7,201,346 B2 | 4/2007 | Hansen |
| 7,219,854 B2 | 5/2007 | Boschma et al. |
| 7,231,997 B2 | 6/2007 | De roche |
| 7,246,769 B2 | 7/2007 | Yoeli |
| 7,249,732 B2 | 7/2007 | Sanders et al. |
| 7,258,302 B2 | 8/2007 | Carr et al. |
| 7,275,711 B1 | 10/2007 | Flanigan |
| 7,275,712 B2 | 10/2007 | Yoeli |
| 7,281,683 B2 | 10/2007 | Delaplace et al. |
| 7,290,738 B1 | 11/2007 | Rogers et al. |
| 7,305,285 B2 | 12/2007 | Villaume et al. |
| 7,316,371 B2 | 1/2008 | Wyrembek et al. |
| 7,322,546 B2 | 1/2008 | Snow et al. |
| 7,410,122 B2 | 8/2008 | Robbins et al. |
| 7,427,048 B2 | 9/2008 | Ouellette |
| 7,438,259 B1 | 10/2008 | Piasecki et al. |
| 7,461,811 B2 | 12/2008 | Milde |
| 7,472,863 B2 | 1/2009 | Pak |
| 7,506,837 B2 | 3/2009 | Parks |
| 7,520,466 B2 | 4/2009 | Bostan |
| 7,555,893 B2 | 7/2009 | Okai et al. |
| 7,556,218 B2 | 7/2009 | Schlunke |
| 7,568,657 B2 | 8/2009 | Milde |
| 7,581,381 B2 | 9/2009 | Bryant |
| 7,581,383 B2 | 9/2009 | Ouellette |
| 7,581,696 B2 | 9/2009 | Morgan et al. |
| 7,584,923 B2 | 9/2009 | Burrage |
| 7,584,924 B2 | 9/2009 | Ow |
| 7,604,201 B2 | 10/2009 | Alecu |
| 7,607,606 B2 | 10/2009 | Milde |
| 7,654,486 B2 | 2/2010 | Milde |
| 7,654,489 B2 | 2/2010 | Stephenson |
| 7,665,689 B2 | 2/2010 | Mccomb |
| 7,677,502 B2 | 3/2010 | Lawson et al. |
| 7,717,368 B2 | 5/2010 | Yoeli |
| 7,753,309 B2 | 7/2010 | Garreau |
| 7,766,274 B1 | 8/2010 | Jameson et al. |
| 7,789,342 B2 | 9/2010 | Yoeli |
| 7,806,362 B2 | 10/2010 | Yoeli |
| 7,823,838 B1 | 11/2010 | Dedning et al. |
| 7,823,840 B2 | 11/2010 | Shmilovich et al. |
| 7,841,563 B2 | 11/2010 | Goossen et al. |
| 7,857,252 B2 | 12/2010 | Walliser et al. |
| 7,857,253 B2 | 12/2010 | Yoeli |
| 7,857,256 B2 | 12/2010 | Hatton |
| 7,866,601 B2 | 1/2011 | Balaskovic |
| 7,878,458 B2 | 2/2011 | Shmilovich et al. |
| 7,883,051 B2 | 2/2011 | Sammy |
| 7,891,603 B2 | 2/2011 | Voorhees |
| 7,908,044 B2 | 3/2011 | Piasecki et al. |
| 7,918,416 B2 | 4/2011 | Yoeli |
| 7,937,945 B2 | 5/2011 | Kinde |
| 7,946,528 B2 | 5/2011 | Yoeli |
| 7,988,101 B2 | 8/2011 | Osborne et al. |
| 8,014,910 B2 | 9/2011 | Mathieu et al. |
| 8,020,804 B2 | 9/2011 | Yoeli |
| 8,061,119 B2 | 11/2011 | Agrawal et al. |
| 8,074,925 B2 | 12/2011 | Morgan et al. |
| 8,087,618 B1 | 1/2012 | Shmilovich et al. |
| 8,109,462 B2 | 2/2012 | Balaskovic |
| 8,128,033 B2 | 3/2012 | Raposo |
| 8,157,520 B2 | 4/2012 | Kolacny et al. |
| 8,162,253 B2 | 4/2012 | Seiford |
| 8,167,233 B2 | 5/2012 | Brody et al. |
| 8,167,249 B1 | 5/2012 | Harrison et al. |
| 8,181,901 B2 | 5/2012 | Roesch |
| 8,181,902 B2 | 5/2012 | Schlunke |
| 8,181,903 B2 | 5/2012 | Posva |
| 8,186,617 B2 | 5/2012 | Llamas sandin |
| 8,191,820 B1 | 6/2012 | Westra et al. |
| 8,205,822 B1 | 6/2012 | Jameson et al. |
| 8,240,125 B2 | 8/2012 | Kawai |
| 8,251,306 B2 | 8/2012 | Dacre |
| 8,262,016 B2 | 9/2012 | Gosling |
| 8,262,031 B2 | 9/2012 | Zha et al. |
| 8,291,691 B2 | 10/2012 | Spear et al. |
| 8,292,220 B1 | 10/2012 | Westra et al. |
| 8,297,550 B2 | 10/2012 | Balaskovic |
| 8,302,903 B2 | 11/2012 | Morgan et al. |
| 8,317,126 B2 | 11/2012 | Harris et al. |
| 8,328,131 B2 | 12/2012 | Gosling |
| 8,336,810 B2 | 12/2012 | Brutoco |
| 8,337,156 B2 | 12/2012 | Khmel |
| 8,367,993 B2 | 2/2013 | Velez et al. |
| 8,387,360 B2 | 3/2013 | Kinsey et al. |
| 8,408,488 B2 | 4/2013 | Leaver |
| 8,408,489 B2 | 4/2013 | Gosling |
| 8,414,260 B2 | 4/2013 | Johnson |
| 8,418,952 B2 | 4/2013 | Balaskovic |
| 8,424,808 B2 | 4/2013 | Boelitz |
| 8,453,428 B1 | 6/2013 | Kinde |
| 8,464,977 B2 | 6/2013 | Suzuki |
| 8,485,476 B2 | 7/2013 | Zha et al. |
| 8,495,879 B2 | 7/2013 | Grace |
| 8,496,200 B2 | 7/2013 | Yoeli |
| 8,500,061 B2 | 8/2013 | Chen |
| 8,505,846 B1 | 8/2013 | Sanders |

(56) References Cited

U.S. PATENT DOCUMENTS

| | | |
|---|---|---|
| 8,544,797 B2 | 10/2013 | Kramer |
| 8,561,935 B2 | 10/2013 | Milde |
| 8,566,000 B2 | 10/2013 | Lickfold et al. |
| 8,572,947 B2 | 11/2013 | Khalid |
| 8,573,541 B2 | 11/2013 | Sullivan et al. |
| 8,579,573 B2 | 11/2013 | Kolacny |
| 8,602,348 B2 | 12/2013 | Bryant |
| 8,616,503 B2 | 12/2013 | Balaskovic |
| 8,622,335 B2 | 1/2014 | Yoeli |
| 8,646,251 B2 | 2/2014 | Rosenkrans et al. |
| 8,657,053 B2 | 2/2014 | Novikov-kopp |
| 8,661,983 B1 | 3/2014 | Scarr |
| 8,689,538 B2 | 4/2014 | Sankrithi et al. |
| 8,729,442 B2 | 5/2014 | Boelitz et al. |
| 8,746,613 B2 | 6/2014 | Suchezky et al. |
| 8,777,152 B2 | 7/2014 | Thomassey |
| 8,800,259 B2 | 8/2014 | Smith et al. |
| 8,807,484 B2 | 8/2014 | Raposeiro et al. |
| 8,833,692 B2 | 9/2014 | Yoeli |
| 8,844,264 B2 | 9/2014 | Khalid |
| 8,894,002 B2 | 11/2014 | Goelet |
| 8,899,513 B1 | 12/2014 | Jameson et al. |
| 8,899,514 B2 | 12/2014 | Goelet |
| 8,931,729 B2 | 1/2015 | Abde qader alzu'bi et al. |
| 8,936,212 B1 | 1/2015 | Fu et al. |
| 8,979,015 B2 | 3/2015 | Gaillard |
| 9,008,943 B2 | 4/2015 | Lickfold et al. |
| 9,016,616 B2 | 4/2015 | Kawaguchi |
| 9,033,281 B1 | 5/2015 | Adams |
| 9,079,661 B2 | 7/2015 | Prampolini et al. |
| 9,079,663 B2 | 7/2015 | Sommer et al. |
| 9,080,450 B2 | 7/2015 | Seifert |
| 9,085,355 B2 | 7/2015 | Delorean |
| 9,102,391 B2 | 8/2015 | Brutoco |
| 9,108,711 B2 | 8/2015 | Krueger |
| 9,108,725 B1 | 8/2015 | Shmilovich et al. |
| 9,120,559 B2 | 9/2015 | Danielson et al. |
| 9,132,915 B2 | 9/2015 | Zhu |
| 9,156,564 B2 | 10/2015 | Endres |
| 9,157,377 B2 | 10/2015 | Lickfold et al. |
| 9,162,764 B2 | 10/2015 | Babinsky et al. |
| 9,187,175 B1 | 11/2015 | Chen |
| 9,193,458 B2 | 11/2015 | Pongratz et al. |
| 9,212,625 B2 | 12/2015 | Shelley |
| 9,261,019 B2 | 2/2016 | Heathco |
| 9,266,609 B1 | 2/2016 | Kunz |
| 9,272,770 B2 | 3/2016 | Joalland et al. |
| 9,272,783 B2 | 3/2016 | Pearson |
| 9,315,264 B2 | 4/2016 | Zhu |
| 9,404,721 B2 | 8/2016 | Scarr |
| 9,428,257 B2 | 8/2016 | Nelson |
| 9,493,223 B2 | 11/2016 | Brutoco |
| 9,493,235 B2 | 11/2016 | Zhou et al. |
| 9,527,577 B2 | 12/2016 | Embacher |
| 9,527,596 B1 | 12/2016 | Adams |
| 9,533,768 B2 | 1/2017 | Barmichev et al. |
| 9,540,100 B2 | 1/2017 | Dekel et al. |
| 9,540,101 B2 | 1/2017 | Paduano et al. |
| 9,540,113 B2 | 1/2017 | Gukeisen |
| 9,541,924 B2 | 1/2017 | Frolov et al. |
| 9,567,062 B2 | 2/2017 | Chandler et al. |
| 9,573,680 B2 | 2/2017 | Shmilovich et al. |
| 9,580,183 B2 | 2/2017 | Agrawal et al. |
| 9,580,188 B2 | 2/2017 | Endres |
| 9,586,683 B1 | 3/2017 | Buchmueller et al. |
| 9,587,585 B1 | 3/2017 | Rolling et al. |
| 9,623,723 B2 | 4/2017 | Pomme |
| 9,637,218 B2 | 5/2017 | Suciu et al. |
| 9,656,748 B2 | 5/2017 | Jing |
| 9,663,219 B2 | 5/2017 | Carton et al. |
| 9,663,236 B1 | 5/2017 | Shiosaki et al. |
| 9,663,239 B2 | 5/2017 | Suciu et al. |
| 9,682,774 B2 | 6/2017 | Paduano et al. |
| 9,702,254 B2 | 7/2017 | Saiz |
| 9,714,082 B2 | 7/2017 | Shmilovich et al. |
| 9,714,090 B2 | 7/2017 | Frolov et al. |
| 9,731,818 B2 | 8/2017 | Dekel et al. |
| 9,751,597 B1 | 9/2017 | Low et al. |
| 9,751,614 B1 | 9/2017 | Nguyen et al. |
| 9,759,160 B2 | 9/2017 | Sankrithi et al. |
| 9,771,151 B2 | 9/2017 | White |
| 9,776,710 B2 | 10/2017 | Duke |
| 9,776,715 B2 | 10/2017 | Zhou et al. |
| 9,777,698 B2 | 10/2017 | Schlak |
| 9,789,768 B1 | 10/2017 | Meier |
| 9,815,552 B1 | 11/2017 | Welsh |
| 9,816,464 B2 | 11/2017 | Seifert |
| 9,828,082 B2 | 11/2017 | Goelet |
| 9,834,305 B2 | 12/2017 | Taylor et al. |
| 9,836,065 B2 | 12/2017 | Frolov et al. |
| 9,840,318 B2 | 12/2017 | Balaskovic |
| 9,840,324 B2 | 12/2017 | Shiosaki et al. |
| 9,840,339 B1 | 12/2017 | O'Brien et al. |
| 9,845,152 B2 | 12/2017 | Stan |
| 10,207,812 B2 * | 2/2019 | Evulet ................. B64D 27/18 |
| 10,464,668 B2 * | 11/2019 | Evulet ................. B64C 21/00 |
| D868,627 S * | 12/2019 | Evulet ................... D12/4 |
| 2002/0014555 A1 | 2/2002 | Smith |
| 2002/0092948 A1 | 7/2002 | Dugan |
| 2002/0096600 A1 | 7/2002 | Richards |
| 2002/0139894 A1 | 10/2002 | Sorensen |
| 2003/0062442 A1 | 4/2003 | Milde |
| 2003/0062443 A1 | 4/2003 | Wagner et al. |
| 2003/0175120 A1 | 9/2003 | St. clair |
| 2004/0004157 A1 | 1/2004 | Liotta |
| 2004/0061025 A1 | 4/2004 | Cordy |
| 2004/0094662 A1 | 5/2004 | Sanders et al. |
| 2004/0104303 A1 | 6/2004 | Mao |
| 2004/0164203 A1 | 8/2004 | Billiu |
| 2005/0116087 A1 | 6/2005 | Page |
| 2006/0006290 A1 | 1/2006 | Loth |
| 2006/0027704 A1 | 2/2006 | Dickau |
| 2006/0186261 A1 | 8/2006 | Unzicker |
| 2007/0018034 A1 | 1/2007 | Dickau |
| 2007/0102570 A1 | 5/2007 | Luffman |
| 2007/0158503 A1 | 7/2007 | Burg |
| 2007/0187547 A1 | 8/2007 | Kelly |
| 2007/0215746 A1 | 9/2007 | Rieken et al. |
| 2007/0246601 A1 | 10/2007 | Layton |
| 2008/0054121 A1 | 3/2008 | Yoeli |
| 2008/0191101 A1 | 8/2008 | Hatton et al. |
| 2008/0273961 A1 | 11/2008 | Rosenkrans et al. |
| 2008/0315042 A1 | 12/2008 | Evulet et al. |
| 2009/0008507 A1 | 1/2009 | Pearson |
| 2009/0014596 A1 | 1/2009 | Pearson et al. |
| 2009/0065631 A1 | 3/2009 | Zha |
| 2009/0065649 A1 | 3/2009 | Babinsky et al. |
| 2009/0159757 A1 | 6/2009 | Yoeli |
| 2009/0199536 A1 | 8/2009 | Bulin et al. |
| 2009/0214338 A1 | 8/2009 | Werle et al. |
| 2010/0012790 A1 | 1/2010 | Bostan |
| 2010/0019079 A1 | 1/2010 | Evulet et al. |
| 2010/0051755 A1 | 3/2010 | Nichols et al. |
| 2010/0120321 A1 | 5/2010 | Rehkemper et al. |
| 2010/0127129 A1 | 5/2010 | Zha et al. |
| 2010/0140416 A1 | 6/2010 | Ohanian et al. |
| 2010/0140417 A1 | 6/2010 | Bose et al. |
| 2010/0162680 A1 | 7/2010 | Khalid |
| 2010/0270419 A1 | 10/2010 | Yoeli |
| 2010/0270420 A1 | 10/2010 | Hansen |
| 2010/0310357 A1 | 12/2010 | Papageorgiou |
| 2011/0001000 A1 | 1/2011 | Zhu |
| 2011/0049307 A1 | 3/2011 | Yoeli |
| 2011/0139924 A1 | 6/2011 | Nakayama |
| 2011/0174920 A1 | 7/2011 | Yoeli |
| 2011/0215204 A1 | 9/2011 | Evulet |
| 2011/0240804 A1 | 10/2011 | Kehayas |
| 2011/0262275 A1 | 10/2011 | Kovalchuk et al. |
| 2011/0309202 A1 | 12/2011 | Smith |
| 2012/0080564 A1 | 4/2012 | Yoeli |
| 2012/0091257 A1 | 4/2012 | Wolff et al. |
| 2012/0096832 A1 | 4/2012 | Rosenkrans et al. |
| 2012/0128493 A1 | 5/2012 | Shelley |
| 2012/0280091 A1 | 11/2012 | Saiz |

(56) References Cited

U.S. PATENT DOCUMENTS

| | | |
|---|---|---|
| 2012/0304619 A1 | 12/2012 | Beachy head |
| 2013/0068879 A1 | 3/2013 | Colting |
| 2013/0105635 A1 | 5/2013 | Alzu'bi et al. |
| 2013/0134264 A1 | 5/2013 | Carter et al. |
| 2013/0186059 A1 | 7/2013 | Epstein et al. |
| 2013/0206921 A1 | 8/2013 | Paduano et al. |
| 2013/0298540 A1 | 11/2013 | Marcus |
| 2013/0327014 A1 | 12/2013 | Moulebhar |
| 2014/0084114 A1 | 3/2014 | Valentin |
| 2014/0103159 A1 | 4/2014 | Bert |
| 2014/0151494 A1 | 6/2014 | Cvrlje |
| 2014/0263831 A1 | 9/2014 | Mitchell |
| 2014/0290270 A1 | 10/2014 | Bodard et al. |
| 2014/0312177 A1 | 10/2014 | Gaonjur |
| 2015/0014475 A1 | 1/2015 | Taylor et al. |
| 2015/0021430 A1 | 1/2015 | Paduano et al. |
| 2015/0102155 A1 | 4/2015 | Krastev |
| 2015/0226086 A1 | 8/2015 | Samuelson |
| 2015/0274292 A1 | 10/2015 | Delorean |
| 2015/0314867 A1 | 11/2015 | Razroev |
| 2015/0315998 A1 | 11/2015 | Krueger |
| 2016/0001872 A1 | 1/2016 | Zhu |
| 2016/0010589 A1 | 1/2016 | Rolt |
| 2016/0061145 A1 | 3/2016 | Kumar et al. |
| 2016/0101852 A1 | 4/2016 | Jiang |
| 2016/0101853 A1 | 4/2016 | Toppenberg |
| 2016/0144966 A1 | 5/2016 | Trahmer et al. |
| 2016/0159476 A1 | 6/2016 | Shattuck et al. |
| 2016/0208742 A1 | 7/2016 | Pande |
| 2016/0221675 A1 | 8/2016 | Adam |
| 2016/0236774 A1 | 8/2016 | Niedzballa |
| 2016/0288903 A1 | 10/2016 | Rothhaar et al. |
| 2016/0332714 A1 | 11/2016 | Nelson |
| 2016/0332741 A1 | 11/2016 | Moxon |
| 2016/0342160 A1 | 11/2016 | Shepshelovich et al. |
| 2016/0347447 A1 | 12/2016 | Judas et al. |
| 2016/0376003 A1 | 12/2016 | Feldman |
| 2017/0008625 A1 | 1/2017 | Olm et al. |
| 2017/0029100 A1 | 2/2017 | Zhu |
| 2017/0057621 A1 | 3/2017 | Evulet |
| 2017/0057647 A1 | 3/2017 | Evulet |
| 2017/0057648 A1 | 3/2017 | Evulet |
| 2017/0060140 A1* | 3/2017 | Harrison .......... B64C 9/38 |
| 2017/0073070 A1 | 3/2017 | Xing |
| 2017/0073078 A1 | 3/2017 | Barmichev et al. |
| 2017/0089298 A1 | 3/2017 | Joshi et al. |
| 2017/0097644 A1 | 4/2017 | Fegely et al. |
| 2017/0107000 A1 | 4/2017 | Endres |
| 2017/0113793 A1 | 4/2017 | Toulmay |
| 2017/0152014 A1 | 6/2017 | Gould et al. |
| 2017/0159565 A1 | 6/2017 | Evulet |
| 2017/0183091 A1 | 6/2017 | Lauder |
| 2017/0190436 A1 | 7/2017 | Ullman et al. |
| 2017/0197700 A1 | 7/2017 | Wainfan |
| 2017/0203839 A1 | 7/2017 | Giannini et al. |
| 2017/0217575 A1 | 8/2017 | Welsh et al. |
| 2017/0217581 A1 | 8/2017 | Hunter et al. |
| 2017/0217582 A1 | 8/2017 | Bredenbeck et al. |
| 2017/0220048 A1 | 8/2017 | Eadie et al. |
| 2017/0225775 A1 | 8/2017 | Eadie et al. |
| 2017/0225797 A1 | 8/2017 | Bredenbeck et al. |
| 2017/0233055 A1 | 8/2017 | Brutoco |
| 2017/0233067 A1 | 8/2017 | Eller et al. |
| 2017/0233068 A1 | 8/2017 | Eller et al. |
| 2017/0233081 A1 | 8/2017 | Sautron et al. |
| 2017/0240275 A1 | 8/2017 | Evulet |
| 2017/0248125 A1 | 8/2017 | Luchsinger et al. |
| 2017/0263136 A1 | 9/2017 | Navot et al. |
| 2017/0267338 A1 | 9/2017 | Garcia et al. |
| 2017/0274981 A1 | 9/2017 | Shiosaki et al. |
| 2017/0274987 A1 | 9/2017 | Bredenbeck et al. |
| 2017/0274990 A1 | 9/2017 | Eadie et al. |
| 2017/0274994 A1 | 9/2017 | Eller et al. |
| 2017/0274996 A1 | 9/2017 | Frolov et al. |
| 2017/0275014 A1 | 9/2017 | Eadie et al. |
| 2017/0277201 A1 | 9/2017 | Bredenbeck et al. |
| 2017/0283045 A1 | 10/2017 | Garcia et al. |
| 2017/0283046 A1 | 10/2017 | Egoif et al. |
| 2017/0283047 A1 | 10/2017 | Weiner et al. |
| 2017/0283048 A1 | 10/2017 | Beckman et al. |
| 2017/0283049 A1 | 10/2017 | Weiner |
| 2017/0283055 A1 | 10/2017 | Aguilar |
| 2017/0283080 A1 | 10/2017 | Evulet |
| 2017/0291699 A1 | 10/2017 | Hunter et al. |
| 2017/0291702 A1 | 10/2017 | Eller et al. |
| 2017/0297690 A1 | 10/2017 | Weiner et al. |
| 2017/0297692 A1 | 10/2017 | Eadie et al. |
| 2017/0297696 A1 | 10/2017 | Weiner |
| 2017/0300051 A1 | 10/2017 | Zhou et al. |
| 2017/0305534 A1 | 10/2017 | Bredenbeck et al. |
| 2017/0305539 A1 | 10/2017 | Alber et al. |
| 2017/0305540 A1 | 10/2017 | Eller et al. |
| 2017/0305543 A1 | 10/2017 | Moffitt et al. |
| 2017/0305544 A1 | 10/2017 | Eadie et al. |
| 2017/0308101 A1 | 10/2017 | Luszcz et al. |
| 2017/0315563 A1 | 11/2017 | Wulff |
| 2017/0349275 A1 | 12/2017 | Eller et al. |
| 2017/0355455 A1 | 12/2017 | Taylor et al. |

FOREIGN PATENT DOCUMENTS

| | | |
|---|---|---|
| AU | 2015203190 A1 | 1/2016 |
| BG | 65742 B1 | 9/2009 |
| CA | 1310942 C | 12/1992 |
| CA | 2141481 A1 | 8/1996 |
| CA | 2338852 A1 | 9/2002 |
| CA | 2471887 A1 | 12/2005 |
| CA | 2543912 A1 | 10/2007 |
| CA | 2776121 A1 | 10/2013 |
| CN | 1204288 A | 1/1999 |
| CN | 1240745 A | 1/2000 |
| CN | 1074373 C | 11/2001 |
| CN | 1342589 A | 4/2002 |
| CN | 2542560 Y | 4/2003 |
| CN | 2542561 Y | 4/2003 |
| CN | 2753673 Y | 1/2006 |
| CN | 100354182 C | 12/2007 |
| CN | 101353084 A | 1/2009 |
| CN | 101503114 A | 8/2009 |
| CN | 201371937 Y | 12/2009 |
| CN | 102167163 A | 8/2011 |
| CN | 201923320 U | 8/2011 |
| CN | 102444500 A | 5/2012 |
| CN | 202499129 U | 10/2012 |
| CN | 202508281 U | 10/2012 |
| CN | 102765481 A | 11/2012 |
| CN | 103057694 A | 4/2013 |
| CN | 103057703 A | 4/2013 |
| CN | 103171764 A | 6/2013 |
| CN | 104129500 A | 11/2014 |
| CN | 102991669 B | 12/2014 |
| CN | 104401480 A | 3/2015 |
| CN | 104816823 A | 8/2015 |
| CN | 204623838 U | 9/2015 |
| CN | 105035306 A | 11/2015 |
| CN | 103395491 B | 12/2015 |
| CN | 103612751 B | 12/2015 |
| CN | 105460215 A | 4/2016 |
| CN | 105667781 A | 6/2016 |
| CN | 103192989 B | 8/2016 |
| CN | 106043685 A | 10/2016 |
| CN | 205633041 U | 10/2016 |
| CN | 105649775 B | 6/2017 |
| CN | 106828915 A | 6/2017 |
| CN | 106864746 A | 6/2017 |
| CN | 206265280 U | 6/2017 |
| CN | 106938701 A | 7/2017 |
| CN | 105059542 B | 9/2017 |
| CN | 107364571 A | 11/2017 |
| CN | 107401956 A | 11/2017 |
| DE | 4405975 A1 | 8/1995 |
| DE | 10126632 A1 | 9/2002 |
| DE | 102007048942 A1 | 4/2009 |
| DE | 102008044856 A1 | 3/2010 |

(56) References Cited

FOREIGN PATENT DOCUMENTS

| | | |
|---|---|---|
| EP | 327371 B1 | 5/1993 |
| EP | 796196 A1 | 9/1997 |
| EP | 797723 A1 | 10/1997 |
| EP | 960812 A1 | 12/1999 |
| EP | 999965 A1 | 5/2000 |
| EP | 1409875 A1 | 4/2004 |
| EP | 1574426 A1 | 9/2005 |
| EP | 1755945 A2 | 2/2007 |
| EP | 2527218 A1 | 11/2012 |
| EP | 2690012 A1 | 1/2014 |
| EP | 3007974 A1 | 4/2016 |
| EP | 3085619 A1 | 10/2016 |
| EP | 3162701 A1 | 5/2017 |
| EP | 3243745 A1 | 11/2017 |
| EP | 3243747 A1 | 11/2017 |
| EP | 3243750 A1 | 11/2017 |
| FR | 2880867 A1 | 7/2006 |
| FR | 3036140 A1 | 11/2016 |
| FR | 3036144 A1 | 11/2016 |
| GB | 2264907 A | 9/1993 |
| GB | 2249140 B | 12/1994 |
| GB | 2312709 A | 11/1997 |
| GB | 2342079 B | 10/2002 |
| GB | 2379483 A | 3/2003 |
| GB | 2390884 A | 1/2004 |
| GB | 2397809 A | 8/2004 |
| GB | 2398046 B | 7/2006 |
| GB | 2451347 B | 9/2009 |
| GB | 2461051 A | 12/2009 |
| GB | 2438848 B | 8/2011 |
| GB | 2478570 B | 2/2012 |
| IN | 201302310 P2 | 4/2014 |
| IN | 201500081 P3 | 7/2016 |
| JP | 6099899 A | 4/1994 |
| JP | 6329096 A | 11/1994 |
| JP | 7002188 A | 1/1995 |
| JP | 9011991 A | 1/1997 |
| JP | 11082173 A | 3/1999 |
| JP | 2006300040 A | 11/2006 |
| JP | 2006315647 A | 11/2006 |
| JP | 2006528583 A | 12/2006 |
| JP | 4081550 B2 | 4/2008 |
| JP | 2009029400 A | 2/2009 |
| JP | 2009083798 A | 4/2009 |
| JP | 2010111216 A | 5/2010 |
| JP | 4478509 B2 | 6/2010 |
| JP | 2010120420 A | 6/2010 |
| JP | 2016185740 A | 10/2016 |
| KR | 472560 B1 | 3/2005 |
| KR | 2005088032 A | 9/2005 |
| KR | 2015018018 A | 2/2015 |
| KR | 2015055202 A | 5/2015 |
| KR | 1646736 B1 | 8/2016 |
| KR | 1660759 B1 | 9/2016 |
| KR | 2017061259 A | 6/2017 |
| KR | 2017063027 A | 6/2017 |
| KR | 2017090936 A | 8/2017 |
| RO | 128282 A2 | 4/2013 |
| RO | 128283 A2 | 4/2013 |
| RO | 126028 B1 | 11/2013 |
| RU | 2123963 C1 | 12/1998 |
| RU | 2130863 C1 | 5/1999 |
| RU | 2151717 C1 | 6/2000 |
| RU | 2174484 C2 | 10/2001 |
| RU | 2205760 C1 | 6/2003 |
| RU | 2320518 C1 | 3/2008 |
| RU | 2325307 C1 | 5/2008 |
| RU | 2394723 C1 | 7/2010 |
| RU | 2401771 C2 | 10/2010 |
| RU | 2419557 C2 | 5/2011 |
| RU | 2500578 C1 | 12/2013 |
| RU | 2518143 C2 | 6/2014 |
| RU | 2531432 C2 | 10/2014 |
| RU | 2568234 C2 | 11/2015 |
| RU | 171505 U1 | 6/2017 |
| RU | 2627965 C1 | 8/2017 |
| RU | 2629475 C1 | 8/2017 |
| RU | 174731 U1 | 10/2017 |
| RU | 2636826 C1 | 11/2017 |
| RU | 2016117529 A | 11/2017 |
| SG | 130968 A1 | 4/2007 |
| UA | 94184 U | 11/2014 |
| WO | 1992021862 A1 | 12/1992 |
| WO | 1999033690 A1 | 7/1999 |
| WO | 1999054181 A2 | 10/1999 |
| WO | 2000001576 A2 | 1/2000 |
| WO | 2000002776 A1 | 1/2000 |
| WO | 2001051354 A1 | 7/2001 |
| WO | 2003016638 A1 | 2/2003 |
| WO | 2003020584 A1 | 3/2003 |
| WO | 2003076224 A2 | 9/2003 |
| WO | 2005007506 A2 | 1/2005 |
| WO | 2005067413 A2 | 7/2005 |
| WO | 2005085620 A1 | 9/2005 |
| WO | 2007022315 A2 | 2/2007 |
| WO | 2007043908 A1 | 4/2007 |
| WO | 2007108794 A1 | 9/2007 |
| WO | 2008044941 A2 | 4/2008 |
| WO | 2009027742 A1 | 3/2009 |
| WO | 2009068835 A1 | 6/2009 |
| WO | 2010024725 A1 | 3/2010 |
| WO | 2010132901 A1 | 11/2010 |
| WO | 2011004187 A2 | 1/2011 |
| WO | 2011010155 A2 | 1/2011 |
| WO | 2011041991 A2 | 4/2011 |
| WO | 2013012316 A1 | 1/2013 |
| WO | 2014058351 A2 | 4/2014 |
| WO | 2015030630 A1 | 3/2015 |
| WO | 2015133932 A2 | 9/2015 |
| WO | 2016110756 A1 | 7/2016 |
| WO | 2016124761 A1 | 8/2016 |
| WO | 2016126231 A1 | 8/2016 |
| WO | 2017105266 A1 | 6/2017 |
| WO | 2017132515 A2 | 8/2017 |
| WO | 2017153807 A1 | 9/2017 |
| WO | 2017158417 A1 | 9/2017 |
| WO | 2017178899 A2 | 10/2017 |
| WO | 2017180020 A1 | 10/2017 |
| WO | 2017209820 A2 | 12/2017 |
| WO | 2017210595 A2 | 12/2017 |

OTHER PUBLICATIONS

S L Williams, M E Franke, "Navier-Stokes Methods to Predict Circulation Control Airfoil Performance", Journal of aircraft, 1992, pp. 243-249, vol. 29, Issue No. 2, Ohio, USA.

Nark Tedc, "Design, development, and flight evaluation of the Boeing YC-14 USB powered lift aircraft", AGARD, High-Lift System Aerodynamics, 1993, pp. 1-30 Issue No. 515, Canada.

Robert J Englar, Marilyn J Smith, Sean M Kelley, Richard C Rover, "Development of circulation control technology for application to advanced subsonic transport aircraft", 31st Aerospace Sciences Meeting, 1993, pp. 1-14, Atlanta, USA.

Plaetschke E, Weiss S, "Identification of thrust vector effectiveness from X-31A flight test data", Zeitschrift fur flugwissenschaften und weltraumforschung, 1993, pp. 235-238, vol. 17, Issue No. 4, Germany.

All Zandieh, J Gordon Leishman, "Boundary Layer and Pressure Measurements on a Cylinder with Unsteady Circulation Control", AIAA Journal, 1993, pp. 1769-1776, vol. 31, Issue No. 10, USA.

Buffington JM, Sparks AG, Banda SS, "Robust longitudinal axis flight control for an aircraft with thrust vectoring", Automatica, 1994, pp. 1527-1540, vol. 30, Issue No. 10, USA.

Robert J Englar, Marilyn J Smith, Scan M Kelley, Richard C Rover, "Application of Circulation Control to Advanced Subsonic Transport Aircraft, Part I: Airfoil Development", Journal of aircraft, 1994, pp. 1160-1168, vol. 31, Issue No. 5, Atlanta, USA.

Robert J Englar, Marilyn J Smith, Scan M Kelley, Richard C Rover, "Application of Circulation Control to Advanced Subsonic Transport Aircraft, Part II: Transport Application", Journal of aircraft, 1994, pp. 1169-1177, vol. 31, Issue No. 5, Atlanta, USA.

(56) References Cited

OTHER PUBLICATIONS

Liu Jing Chang, Sun Mao, Wu Liyi, "Navier-stokes analysis of a circulation control airfoil", Acta Mechanica Sinica, 1995, pp. 137-143, vol. 11, Issue No. 2, Beijing, China.
J C Tai, D N Mavris, D P Schrage, "Application of a response surface method to the design of tip jet driven stopped rotorwing concepts", 1st AIAA Aircraft Engineering, Technology and Operations Congress, 1995, pp. 1-13, USA.
Galor B, "Thrust vector control eyed for passenger aircraft: A novel methodology to combine jet-engine tests with sub-scale proof-of-concept flight tests", International journal of turbo & jet-engines, 1995, pp. 241-251, vol. 12, Issue No. 4, Haifa, Israel.
Steen Toffner-Clausen, "u Control of an Ill-Conditioned Aircraft", System Identification and Robust Control, 1996, pp. 99-119, Denmark.
Holger Friehmelt, "Elements of Aerodynamic Model Validation for Delta-Canard Configured Aircraft with Thrust-Vectoring", IFAC Proceedings Volumes, 1997, pp. 395-400, vol. 30, Issue No. 11, Braunschweig, Germany.
John Pike, "Dragonfly Canard-Rotor-Wing UAV", Federation of American Scientists, 1997, pp. 1-2, USA.
Michiel J Van Nieuwstadt, Richard M Murray, "Rapid hover-to-forward-flight transitions for a thrust-vectored aircraft", Journal of guidance control and dynamics, 1998, pp. 93-100, vol. 21, Issue No. 1, Pasadena, California.
"Developing a thrust vectoring system for transport aircraft—A VSTOL transport aircraft provides many challenges in stability and control", Aerospace engineering—warrendale, 1998, pp. 16-25, vol. 18, Issue No. 1-2, USA.
Arkadi Lichtsinder, Eliezer Kreindler, Benjamin Gal-Or, "Minimum-time maneuvers of thrust-vectored aircraft", Journal of guidance control and dynamics, 1998, pp. 244-250, vol. 21, Issue No. 2, Haifa, Israel.
Liseitsev NK, Ardzhomandi M, "Influence of engine thrust vector turn on the transport aircraft takeoff distance length", International journal of turbo & jet-engines, 1999, pp. 3-5 Issue No. 2, Russia.
F S Alvi, P J Strykowski, "Forward Flight Effects on Counterflow Thrust Vector Control of a Supersonic Jet", AIAA Journal, 1999, pp. 279-281, vol. 37, Florida, USA.
Hollmeier S, Kopp S, Herrmann O, Rick H, "Propulsion / Aircraft Integration of Hypersonic Vehicles with Active Thrust-Vectoring and Real-Time Simulation of Dynamic Engine Behaviour", International journal of turbo & jet-engines, 1999, pp. 207-222, vol. 16, Issue No. 4, Germany.
R G Simpson, N A Ahmed, R D Archer, "Improvement of a wing's aerodynamic efficiency using coanda tip jets", Journal of aircraft, 2000, pp. 183-184, vol. 37, Australia.
H Kim, S Raghunathan, T Setoguchi, S Matsuo, "Experimental and numerical studies of supersonic coanda wall jets", 38th Aerospace Sciences Meeting and ExhibitA, 2000, pp. 1-8, USA.
S A Pandya, M J Aftosmis, "Computation of external aerodynamics for a canard rotor/wing aircraft", 39th AIAA Aerospace Sciences Meeting and Exhibit, 2000, pp. 1-9, California, USA.
J R Potts, W J Crowther, "Flight Control of a Spin Stabilised Axi-symmetric Disc-wing", 39th Aerospace Sciences Meeting & Exhibit, 2001, pp. 1-10, USA.
Alan Nurick, "Experimental Investigation of a Helicopter Circulation-Controlled Tail Boom", Journal of aircraft, 2001, pp. 528-535, vol. 38, South Africa.
E Stanewsky, "Adaptive wing and flow control technology", Progress in Aerospace Sciences, 2001, pp. 583-667, vol. 37, Issue No. 7, Germany.
Mark D Moore, "Personal Air Vehicle Exploration (PAVE)", NASA Langley Research Center, 2002, pp. 1-48, USA.
J F Slomski, J J Gorski, R W Miller, T A Marino, "Numerical Simulation of Circulation Control Airfoils as Affected by Different Turbulence Models", 40th AIAA Aerospace Sciences Meeting & Exhibit, 2002, pp. 1-11, Nevada, USA.

R J Collins, "Coanda—a new airspace platform for UAVs", International conference; 17th, UAVs; Unmanned air vehicle systems, 2002, pp. 1-10, Bristol, UK.
Mark S Mason, William J Crowther, "Fluidic thrust vectoring of low observable aircraft", CEAS Aerospace Aerodynamic Research Conference, 2002, pp. 1-7, Manchester, USA.
Nick Sellars, Andrew Kennaugh, Norman Wood, "Delta wing circulation control using the coanda effect", 1st Flow Control Conference, 2002, pp. 1-11, UK.
G S Jones, S A Viken, A E Washburn, L N Jenkins, C M Cagle, "An Active Flow Circulation Controlled Flap Concept for General Aviation Aircraft Applications", 1st Flow Control Conference, 2002, pp. 1-18, USA.
Robert J Englar, Bryan A Campbell, "Pneumatic channel wing powered-lift advanced superSTOL aircraft", 1st Flow Control Conference, 2002, pp. 1-10, Atlanta, USA.
Christopher Cagle, Gregory S Jones, "A Wind Tunnel Model to Explore Unsteady Circulation Control for General Aviation Applications", 22nd AIAA Aerodynamic Measurement Technology and Ground Testing Conference, 2002, pp. 1-12, Missouri, USA.
Gregory S Jones, Robert J Englar, "Advances in Pneumatic-Controlled High-Lift Systems Through Pulsed Blowing", AIAA Journal, 2003, pp. 1-14, USA.
Yi Liu, "Numerical simulations of the aerodynamic characteristics of circulation control wing sections", Georgia Institute of Technology, 2003, pp. 1-172, Atlanta, USA.
M Orchard, S Newman, "The fundamental configuration and design of the compound helicopter", Proceedings of the institution of mechanical engineers, part g: journal of aerospace engineering, 2003, pp. 297-315, vol. 217, Issue No. 6, UK.
Clark Mitchell, Barbara Vogel, "The Canard Rotor Wing (CRW) Aircraft—A New Way to Fly", AIAA International Air and Space Symposium and Exposition, 2003, pp. 1-11, USA.
Slomski J, Marino T A, "Low-speed maneuverability.", Military Engineer, 2003, pp. 1-37, vol. 95, Issue No. 624, Alexandria, USA.
Rogers Ernest O, Donnelly Martin J, "Characteristics of a Dual-Slotted Circulation Control Wing of Low Aspect Ratio Intended for Naval Hydrodynamic Applications", 42nd AIAA Aerospace Sciences Meeting and Exhibit, 2004, pp. 1-29, USA.
Yi Liu, Lakshmi N Sankar, Robert J Englar, Krishan K Ahuja, R Gaeta, "Computational Evaluation of the Steady and Pulsed Jet Effects on the Performance of a Circulation Control Wing Section", 42nd AIAA Aerospace Sciences Meeting and Exhibit, 2004, pp. 1-15, Atlanta, USA.
Jingshu Wu, Lakshmi Sankar, Shayne Kondor, "Numerical modeling of coanda jet controlled nacelle configurations", Aerospace Sciences Meetings, 2004, pp. 1-9, Nevada, USA.
Peter A Chang, Joseph Slomski, Thomas Marino, Michael P Ebert, "Numerical Simulation of Two- and Three-Dimensional Circulation Control Problems", 43rd AIAA Aerospace Sciences Meeting and Exhibit, 2004, pp. 1-25, Nevada, USA.
Abramson Jane, "Characteristics of a cambered circulation control airfoil having both upper and lower surface trailing edge slots", Defense technical information center, 2004, pp. 1-85, Maryland, USA.
Steven P Frith, Norman J Wood, "Investigation of Dual Circulation Control Surfaces for Flight Control", 2nd AIAA Flow Control Conference, 2004, pp. 1-8, Oregon, USA.
Cezar Dorin Galeriu, Adriana Sida Manea, "Numerical analysis of coanda airfoils in sub and transonic regime", The 6th international conference on hydraulic machinery and hydrodynamics, 2004, pp. 609-618, Timisoara, Romania.
Knepper, Angela Marie, "Examination of three candidate technologies for high-lift devices on an aircraft wing", Cranfield University, 2005, pp. 1-400, USA.
Robert J Englar, "Overview of Circulation Control Pneumatic Aerodynamics: Blown Force and Moment Augmentation and Modification as Applied Primarily to Fixed-Wing Aircraft", Progress in Astronautics and Aeronautics, 2005, pp. 23-68, Atlanta, USA.
Steven P Frith, Norman J Wood, "Use of Circulation Control for Flight Control", Astronautics and Aeronautics, 2005, pp. 337-356, UK.

(56) References Cited

OTHER PUBLICATIONS

Pierce Julia, "Blow for inefficient aerodynamics", Engineer, 2005, pp. 1-14, vol. 293, Issue No. 7666, London, UK.

Robert J Englar, Bryan A Campbell, "Experimental Development and Evaluation of Pneumatic Powered-Lift Super-STOL Aircraft", Astronautics and Aeronautics, 2005, pp. 315-336, Virginia, USA.

Jones Gregory S, "Pneumatic Flap Performance for a 2D Circulation Control Airfoil, Steady & Pulsed", Applications of Circulation Control Technology (Progress in Astronautics and Aeronauticse), 2005, pp. 845-888, USA.

E L Tu, "Numerical study of the close-coupled canard-wing-body aerodynamic interaction", Thirteenth International Conference on Numerical Methods in Fluid Dynamics, 2005, pp. 483-487, USA.

Kannan N, Bhat MS, "Longitudinal H-infinity stability augmentation system for a thrust-vectored unmanned aircraft", Journal of guidance control and dynamics, 2005, pp. 1240-1250, vol. 28, Issue No. 6, Bangalore, India.

A Buonanno, M V Cook, "Flight dynamic simulation of a flapless flight control UAV", 25th international congress of the aeronautical sciences, 2006, pp. 1-11, UK.

Fasel Hermann F, Gross Andreas, Wernz Stefan, "Investigation of Turbulent Coanda Wall Jets Using DNS and RANS", Applications of Circulation Control Technology, 2006, pp. 401-420, Arizona, USA.

Coppinger Rob, "UK MoD sees Coanda UAV flights", Flight International, 2006, pp. 1-25, vol. 169, Issue No. 5027, London, UK.

Geoffrey Lilley, "Circulation Control for Quiet Commercial Aircraft", 3rd AIAA Flow Control Conference, 2006, pp. 1-16, California, USA.

Gregory Jones, Chung-Sheng Yao, Brian Allan, "Experimental Investigation of a 2D Supercritical Circulation-Control Airfoil Using Particle Image Velocimetry", 3rd AIAA Flow Control Conference, 2006, pp. 1-20, Virginia, USA.

Keiichi Okai, Hiroshi Nomura, Takeshi Tagashira, Ryoji Yanagi, "Electromagnetic-Driving Fan for Aircraft-Propulsion Application", 4th International Energy Conversion Engineering Conference and Exhibit (IECEC), 2006, pp. 1-11, California, USA.

Messam Abbas Naqvi, "Prediction of Circulation Control Performance Characteristics for Super STOL & STOL Applications", In Partial Fulfillment of the Requirements for the Degree, 2006, pp. 1-249, USA.

Andreas Gross, Hermann Fasel, "Coanda Wall Jet Calculations Using One- and Two-Equation Turbulence Models", AIAA Journal, 2006, pp. 2095-2107, vol. 44, Issue No. 9, Arizona, USA.

M Mamou, M Khalid, "Steady and unsteady flow simulation of a combined jet flap and Coanda jet effects on a 2D airfoil aerodynamic performance", Revue des Energies Renouvelables, 2007, pp. 55-60, Ontario, Canada.

De La Montanya, Julianna B, Marshall, David D, "Circulation Control and Its Application to Extreme Short Take-Off and Landing Vehicles", 45th AIAA Aerospace Sciences Meeting and Exhibit, 2007, pp. 1-19, California, USA.

Ali T Kutay, John R Culp, Jonathan A Muse, Daniel P Brzozowski, Ari Glezer, Anthony J Calise, "A Closed-Loop Flight Control Experiment using Active Flow Control Actuators", 45th AIAA Aerospace Sciences Meeting and Exhibit, 2007, pp. 1-16, Atlanta, USA.

Hassan Nagib, John Kiedaisch, Paul Rienhard, Brian Demanett, "Active Flow Control for High Lift Airfoils: Separation Versus Circulation Control", 45th AIAA Aerospace Sciences Meeting and Exhibit, 2007, pp. 1-20, Nevada, USA.

Hugh Edward Hill, "2D CFD Simulation of a Circulation Control Inlet Guide Vane", ETDs: Virginia Tech Electronic Theses and Dissertations, 2007, pp. 1-100, Virginia, USA.

H E Hill, W F Ng, P P Vlachos, S A Guillot, D Car, "2D Parametric Study Using CFD of a Circulation Control Inlet Guide Vane", ASME Turbo Expo 2007: Power for Land, Sea and Air, 2007, pp. 1405-1413, vol. 6, Montreal, Canada.

Ralf Petz, Wolfgang Nitsche, "Active Separation Control on the Flap of a Two-Dimensional Generic High-Lift Configuration", Journal of aircraft, 2007, pp. 865-874, vol. 44, Issue No. 3, Germany.

K C Pfingsten, C Jensch, K W Korber, R Radespie, "Numerical simulation of the flow around circulation control airfoils", First CEAS European Air and Space Conference, 2007, pp. 1-15, Braunschweig, Germany.

K C Pfingsten, R Radespiel, "Numerical simulation of a wing with a gapless high-lift system using circulation control", New Results in Numerical and Experimental Fluid Mechanics, 2007, pp. 71-79, Braunschweig, Germany.

Nikolaos Kehayas, "Aeronautical technology for future subsonic civil transport aircraft", Aircraft Engineering and Aerospace Technology, 2007, pp. 600-610, vol. 79, Issue No. 6, Greece.

D-W Gu, K Natesan, I Postlethwaite, "Modelling and robust control of fluidic thrust vectoring and circulation control for unmanned air vehicles", Proceedings of the institution of mechanical engineers part i-journal of systems and control engineering, 2007, pp. 333-345, vol. 222, Issue No. 5, Leicester, UK.

Tyler Ball, Scott Turner, David D Marshall, "Short Takeoff Performance using Circulation Control", 46th AIAA Aerospace Sciences Meeting and Exhibit, 2008, pp. 1-21, USA.

Landolfo, Giuseppe, "Aerodynamic and structural design of a small nonplanar wing UAV", 47th AIAA Aerospace Sciences Meeting Including The New Horizons Forum and Aerospace Exposition, 2008, pp. 1-147, Ohio, USA.

Gerald Angle, Jonathan Kweder, Meagan Hubbell, Jay Wilhelm, James E Smith, "Experimental Investigation into a 10:1 Elliptical Airfoil with Circulation Control Augmentation for Rotorcraft Use", 4th Flow Control Conference, 2008, pp. 1-7, Seattle, USA.

M V Cook, A Buonanno, S D Erbsloh, "A circulation control actuator for flapless flight control", The Aeronautical Journal, 2008, pp. 483-489, vol. 112, Issue No. 1134, Cranfield, UK.

P I A Wilde, W J Crowther, A Buonanno, A Savvaris, "Aircraft Control Using Fluidic Maneuver Effectors", 26th AIAA Applied Aerodynamics Conference, 2008, pp. 1-12, Hawaii, USA.

Coppinger Rob, "Autonomous coanda-effect UAV flight due by year-end", Flight International, 2008, p. 26, vol. 174, Issue No. 5154, Salisbury, UK.

Sang Hoon Kim, Chongam Kim, "Separation control on NACA23012 using synthetic jet", Aerospace science and technology, 2008, pp. 172-182, vol. 13, Issue No. 4-5, South Korea.

Brendan A Blake, "Numerical investigation of Fluidic Injection as a means of Thrust Modulation", Final Thesis Report 2009, 2009, pp. 1-29, Australia.

R Radespiel, K C Pfingsten, C Jensch, "Flow analysis of augmented high-lift system", Hermann Schlichting—100 Years pp. 168-189, 2009, pp. 168-189, Braunschweig, Germany.

C Jensch, K C Pfingsten, R Radespiel, M Schuermann, M Haupt, S Bauss, "Design aspects of a gapless high-lift system with active blowing", Proceedings German Aerospace Congress, 2009, pp. 1-8, Germany.

Brendan A Blake, "Numerical investigation of Fluidic Injection as a means of thrust control", Initial Thesis Report 2009, ACME, UNSW@ADFA, 2009, pp. 1-10, vol. 2, USA.

Bill Gunston, The Cambridge Aerospace Dictionary, 2009, pp. 1-818, New York.

Gaurav Agarwal, Othon Rediniotis, Yogesh Babbar, "Effectiveness of Trailing Edge Active Flow Control on Pitch Control of an Unmanned Aerial Vehicle", 47th AIAA Aerospace Sciences Meeting Including The New Horizons Forum and Aerospace Exposition, 2009, pp. 1-14, Orlando, USA.

Mark Waters, Cassy Anthony, Gregory Mckenzie, David D Marshall, "Propulsion System Modeling and Takeoff Distance Calculations for a Powered-LiftAircraft with Circulation-Control Wing Aerodynamics", 47th AIAA Aerospace Sciences Meeting Including The New Horizons Forum and Aerospace Exposition, 2009, pp. 1-22, Orlando, USA.

G Zha, J J Dussling, S Aspe, N R Heinz, D J Martinez, "Quiet Ultra-Efficient Integrated Aircraft Using Co-Flow Jet Flow Con-

(56) References Cited

OTHER PUBLICATIONS trol", 47th AIAA Aerospace Sciences Meeting Including The New Horizons Forum and Aerospace Exposition, 2009, pp. 1-15, Orlando, USA.
Robert Englar, Gregory Jones, Brian Allan, John Lin, "2-D Circulation Control Airfoil Benchmark Experiments Intended for CFD Code Validation", 47th AIAA Aerospace Sciences Meeting including The New Horizons Forum and Aerospace Exposition, 2009, pp. 1-27, Orlando, USA.
Thong Q Dang, Peter R Bushnell, "Aerodynamics of cross-flow fans and their application to aircraft propulsion and flow control", Progress in Aerospace Sciences, 2009, pp. 1-29, vol. 45, Issue No. 1-3, USA.
Sandra L Gunter, Stephen A Guillot, Wing F Ng, S Todd Bailie, "A three-dimensional CFD design study of a circulation control inlet guide vane for a transonic compressor", Proceedings of ASME Turbo Expo 2009: Power for Land, Sea and Air, 2009, pp. 91-101, vol. 7, Florida, USA.
D Mueller, H A Bruck, S K Gupta, "Measurement of Thrust and Lift Forces Associated With Drag of Compliant Flapping Wing for Micro Air Vehicles Using a New Test Stand Design", Experimental Mechanics, 2009, pp. 725-735, vol. 50, Issue No. 6, USA.
Marcel Schroijen, Michel Van Tooren, "Mav propulsion system using the coanda effect", 45th AIAA/ASME/SAE/ASEE Joint Propulsion Conference & Exhibit, 2009, pp. 1-10, Denver, Colorado.
"Aesir unveils Hoder for resupply duties", Flight International, 2009, p. 22, vol. 176, Issue No. 5200, USA.
Corin Gologan, Sebastian Mores, Hans-Jorg Steiner, Arne Seitz, "Potential of the Cross-Flow Fan for Powered-Lift Regional Aircraft Applications", 9th AIAA Aviation Technology, Integration, and Operations Conference (ATIO), 2009, pp. 1-10, South Carolina, USA.
K B Lim, W B Tay, "Numerical analysis of the s1020 airfoils in tandem under different flapping configurations", Acta Mechanica Sinica, 2009, pp. 191-207, vol. 26, Issue No. 2, Singapore.
C Barlow, D Lewis, S D Prior, S Odedra, M Erbil, M Karamanoglu, R Collins, "Investigating the use of the Coanda Effect to create novel unmanned aerial vehicles", International Conference on Manufacturing and Engineering Systems, 2009, pp. 386-391, London, UK.
Kan Xie, Yu Liu, Jianren Xin, "Controlled canard configuration study for a solid rocket motor based unmanned air vehicle", Journal of mechanical science and technology, 2009, pp. 3271-3280, vol. 23, Issue No. 12, Beijing, China.
Corneliu Berbente, "Scientific personality of Henri Coanda", Anniversary Session Celebrating 100 year of the first jet aircraft invented by Henri Coanda, 2010, pp. 3-10, vol. 2, Bucharest, Romania.
George T K Woo, Ari Glezer, "Transitory control of dynamic stall on a pitching airfoil", Active Flow Control, 2010, pp. 3-18, Atlanta, USA.
C Jensch, K C Pfingsten, R Radespiel, "Numerical investigation of leading edge blowing and optimization of the slot geometry for a circulation control airfoil", New Results in Numerical and Experimental Fluid Mechanics, 2010, pp. 183-190, Braunschweig, Germany.
Kunihiko Taira, Clarence W Rowley, Tim Colonius, "Lock-on to a high-lift state with oscillatory forcing in a three-dimensional wake flow", Active Flow Control, 2010, pp. 81-93, Princeton, USA.
Jonathan Kweder, Chad C Panther, James E Smith, "Applications of Circulation Control, Yesterday and Today", International Journal of Engineering, 2010, pp. 411-429, vol. 4, Issue No. 5, USA.
Michael Pott-Pollenske, Kai-Christoph Pfingsten, "Aeroacoustic Performance of an Airfoil with Circulation Control", 16th AIAA/CEAS Aeroacoustics Conference, 2010, pp. 1-22, Germany.
Richard Gaeta, Russell Young, "Development of a Noise Prediction Model for a Cruise Friendly Circulation Control Wing", 16th AIAA/CEAS Aeroacoustics Conference, 2010, pp. 1-14, Atlanta, USA.

Sorin Dinea, Ioan Vasile Buiu, Dan Antoniu, Paul Sandachi, Tiberiu Constantinescu, "coanda 1910 jet aircraft—the first jet aircraft of the world", Review of the Air Force Academy, 2010, pp. 7-13, Romania.
Rory M Golden, David D Marshall, "Design and Performance of Circulation Control Flap Systems", 48th AIAA Aerospace Sciences Meeting Including the New Horizons Forum and Aerospace Exposition, 2010, pp. 1-27, San Luis Obispo, California.
Robert Englar, Graham Blaylock, Richard Gaeta, Gregory Jones "Recent Experimental Development of Circulation Control Airfoils and Pneumatic Powered-Lift Systems", 48th AIAA Aerospace Sciences Meeting Including the New Horizons Forum and Aerospace Exposition, 2010, pp. 1-32, Orlando, USA.
Yang Zhigang, Yang Wei, "Complex flow for wing-in-ground effect craft with power augmented ram engine in cruise", Chinese Journal of Aeronautics, 2010, pp. 1-8, vol. 23, Issue No. 1, China.
Kunihiko Taira, Clarence W Rowley, Tim Colonius, David R Williams, "Lift Enhancement for Low-Aspect-Ratio Wings with Periodic Excitation", AIAA Journal, 2010, pp. 1785-1790, vol. 48, Pasadena, California.
Wilde Pia, Crowther WJ, Harley CD, "Application of circulation control for three-axis control of a tailless flight vehicle", Proceedings of the institution of mechanical engineers, part g: journal of aerospace engineering, 2010, pp. 373-386, vol. 224, Issue No. 4, Manchester, UK.
Buonanno A, Drikakis D, Papachristou C, Savvaris A, Vamvakoulas C, Warsop C, "Computational investigation of the DEMON unmanned air vehicle thrust vectoring system", Proceedings of the institution of mechanical engineers, part g: journal of aerospace engineering, 2010, pp. 387-394, vol. 224, Issue No. 4, UK.
Travis Marshall Storm, "Assessing the v2-f turbulence models for circulation control applications", Unpublished master's thesis, 2010, pp. 1-82, San Luis Obispo, USA.
N R Alley, J Steele, J C Neidhoefer, J Englar, G Blaylock, "Development of a Cruise-Efficient Extreme-STOL-Capable Demonstrator UAV", AIAA Infotech—Aerospace, 2010, pp. 1-14, Atlanta, USA.
Florin Nedelcut, "Towards a new class of aerial vehicles using the coanda effect", 12th International Conference of Scientific Papers, Scientific Research and Education in the Air Force, 2010, pp. 1-8, Romania.
Zhang Guoqing, Yang Shuxing, Xu Yong, "Investigation of Vortex Interaction in Canard-FSW Configurations Based on the Numerical Wind Tunnel Method", Chinese Journal of Aeronautics, 2010, pp. 312-319, vol. 23, Issue No. 3, China.
Florescu Daniela, Florescu Iulian, Nedelcut Florin, Nedelcu Iulian, "Fuselage airstream simulation for a coanda UAV", Review of the Air Force Academy, 2010, pp. 83-87, vol. 17, Issue No. 2, USA.
Takafumi Nishino, Seonghyeon Hahn, Karim Shariff, "LES of high-Reynolds-number Coanda flow separating from a rounded trailing edge of a circulation control airfoil", 8th International ERCOFTAC Symposium on Engineering Turbulence Modelling and Measurements, 2010, pp. 1-27, USA.
Julian Tan Kok Ping, Saukeong Ban, Chingseong Tan, Thomas Ting Shee Peng, Ng Chin Soon, "Preliminary design of vertical take-off and landing (vtol) uav with steerable vertical thrust effect", Robotics Automation and Mechatronics, 2010, pp. 275-279, Kuala Lumpur, Malaysia.
Buck James K, "About Canard Airplanes", Brighthub, 2010, p. 1, USA.
Song Yan-Ping, Yang Xiao-Guang, Li Ya-Chao, Chen Fu, "Numerical simulation of coanda effect in circulation control airfoil", Journal of Engineering Thermophysics, 2010, vol. 271, Harbin, China.
Guido A I Monterzino, Craig P Lawson, John P Fielding, "A methodology for low-cost, rapidimplementation solutions for airframe systems of UAV prototypes", 10th AIAA Aviation Technology, Integration, and Operations (ATIO) Conference, 2010, pp. 1-14, Texas, USA.
P F Zhang, B Yan, A B Liu, J J Wang, "Numerical Simulation on Plasma Circulation Control Airfoil", AIAA Journal, 2010, pp. 2213-2226, vol. 48, China.

(56) References Cited

OTHER PUBLICATIONS

Alan M Didion, Jonathan Kweder, Mary Ann Clarke, James E Smith, "Circulation control span-wise blowing location optimization for a helicopter rotor blade", ASME 2010 International Mechanical Engineering Congress and Exposition, 2010, pp. 123-126, USA.
Jonathan Kweder, Mary Ann Clarke, James E Smith, "Investigation into the Feasibility of an Augmented Propeller Design with the Use of a Passive Circulation Control System", ASME 2010 International Mechanical Engineering Congress and Exposition, 2010, pp. 127-135, vol. 1, British Columbia, Canada.
Jonathan Kweder, Mary Ann Clarke, James E Smith, "Elliptic airfoil stall analysis with trailing edge slots", ASME 2010 International Mechanical Engineering Congress and Exposition, 2010, pp. 145-151, vol. 1, British Columbia, Canada.
Caroline Lubert, "On Some Recent Applications of the Coanda Effect to Acoustics", 160th Meeting Acoustical Society of America Cancun, 2010, pp. 1-17, vol. 11, Cancun, Mexico.
Takafumi Nishino, Karim Shariff, "Large-eddy simulations of a turbulent Coanda jet on a circulation control airfoil", Physics of Fluids, 2010, pp. 1-56, vol. 22, Issue No. 12, California, USA.
Circiu, Ionica, Nedelcut Florin, Dinea Sorin, "Coanda effect used to improve the efficiency of a rotary wing aircraft", The annals of dunarea de jos, 2010, pp. 61-66, Brasov, Romania.
Dragan, Valeriu, "Numerical investigations of Coanda lift on a double curvature super circulated ramp", International Journal of Civil and Structural Engineering, 2011, pp. 241-248, vol. 2, Bucharest, Romania.
Guo B D, Liu P Q, Qu Q L, "Blowing Circulation Control on a Seaplane Airfoil", AIP conference proceedings, 2011, pp. 228-231, vol. 1376, China.
Hdjojodihardjo, Mfabdulhamid, S Basri, F I Romli, D L A Abdul Majid, "Numerical simulation and analysis of coanda effect circulation control for wind-turbine application considerations", IIUM Engineering Journal, Special Issue, Mechanical Engineering, 2011, pp. 19-42, vol. 12, Malaysia.
Errikos Levis, "Design Synthesis of Advanced Technology, Flying Wing Seaplanes", Imperial College London, 2011, pp. 1-222, USA.
Yang Wei, Yang Zhigang, "Schemed power-augmented flow for wing-in-ground effect craft in cruise", Chinese Journal of Aeronautics, 2011, pp. 119-126, vol. 24, Issue No. 2, China.
Fan Yong, Meng Xianyu, Yang Xili, Liu Kai, Zhu Jihong, "Control allocation for a V/STOL aircraft based on robust fuzzy control", Science china information sciences, 2011, pp. 1321-1326, vol. 54, Issue No. 6, Beijing, China.
B Saeed, G Gratton, "Exploring the aerodynamic characteristics of a blown annular wing for vertical/short take-off and landing applications", Proceedings of the institution of mechanical engineers, part g: journal of aerospace engineering, 2011, pp. 689-707, vol. 225, Issue No. 6, UK.
George Balan, Sorin-Gabriel Constantinescu, Bogdan Ciobanu, "The coanda vtol-UAV aeromechanical aspects", International conference of scientific paper afases, 2011, pp. 1205-1210, Romania.
B Saeed, G B Gratton, "An approach to evaluate lift generated by an annular-Coanda-wing for vertical/short take-off and landing applications", Proceedings of the institution of mechanical engineers, part g: journal of aerospace engineering, 2011, pp. 1298-1314, vol. 226, Issue No. 10, UK.
X Zhang, P Chen, X Luo, "Airfoil flow control using plasma actuation and coanda effect", 29th AIAA Applied Aerodynamics Conference, 2011, pp. 1-14, Hawaii, USA.
A D Gardner, K Richter, H Rosemann, "Numerical investigation of air jets for dynamic stall control on the oa209 airfoil", CEAS Aeronautical Journal, 2011, pp. 1-10, Gottingen, Germany.
Tengfei Guo, Honglun Wang, Wendong Gai, "Transition flight control for Canard Rotor/Wing rotorcraft", Artificial Intelligence, Management Science and Electronic Commerce (AIMSEC), 2011, pp. 875-880, China.
Wendong Gai, Honglun Wang, Tengfei Guo, Dawei Li, "Modeling and LPV flight control of the Canard Rotor/ Wing unmanned aerial vehicle", Artificial Intelligence, Management Science and Electronic Commerce (AIMSEC), 2011, pp. 2187-2191, China.
Julian Tan Kok Ping, Chingseong Tan, Vincent Ong Teng Tat, "Coanda effect test bench (coetb)—design enhancement of the coandajlt craft", Sustainable Utilization and Development in Engineering and Technology, 2011, pp. 25-30, Malaysia.
Russo Enrico, Notarstefano Giuseppe, Hauser John, "Dynamics exploration and aggressive maneuvering of a Longitudinal Vectored Thrust VTOL aircraft", 2011 50th IEEE conference on decision and control and european control conference (CDC-ECC), 2011, pp. 8106-8111, Orlando, USA.
A Dumitrache, F Frunzulica and TC Ionescu, "Mathematical Modelling and Numerical Investigations on the Coanda Effect", Non-linearity, Bifurcation and Chaos—Theory and Applications, 2012, pp. 101-132, USA.
Nikola Mirkov, Bosko Rasuo, "Maneuverability of an UAV with coanda effect based lift production", 28th International Congress of the Aeronautical Science, 2012, pp. 1-6, Belgrade, Serbia.
Mackenzie Carter, "Stol 'n' Lift",Canadian young scientist journal, 2012, pp. 31-35, Ontario, Canada.
H Djojodihardjo, M F Abdul Hamid, "Computational study on the influence of coanda jet on airfoils: two-dimensional case", 28th International Congress of the Aeronautical Sciences, 2012, pp. 1-13, Malaysia.
Valeriu Dragan, "Development of a coanda effect lift-thrust integrated system: celtis", International conference of scientific paper afases, 2012, pp. 1-5, Bucharest, Romania.
A V Petrov, "Aerodynamics of stol airplanes with powered high-lift systems", 28th international congress of the aeronautical sciences, 2012, pp. 1-9, Russia.
R J Huyssen, G R Spedding, E H Mathews, L Liebenberg, "Wing-Body Circulation Control by Means of a Fuselage Trailing Edge", Journal of aircraft, 2012, pp. 1279-1289, vol. 49, South Africa.
Hongjun Ran, Dimitri N Mavris, Michelle Kirby, "Rapid-Prototyping Method for Modeling a Circulation-Control Wing at Low Speeds", Journal of aircraft, 2012, pp. 1480-1484, vol. 49, Issue No. 5, Atlanta, USA.
Asha J Hall, Jaret C Riddick, "Micro-electro mechanical Flapping Wing Technology for Micro Air Vehicles", Proceedings vol. 8339, bioinspiration, biomimetics, and bioreplication, 2012, pp. 1-9, vol. 8339, USA.
Rizal E M Nasir, Zurriati Ali, "Investigation on Aerodynamic Characteristics of Baseline-II E-2 Blended Wing-Body Aircraft with Canard via Computational Simulation", AIP conference proceedings, 2012, pp. 700-706, vol. 1440, Issue No. 1, Malaysia.
Carsten Lenfers, "Propeller Design for a future QESTOL Aircraft in the BNF Project", 30th AIAA Applied Aerodynamics Conference, 2012, pp. 1-18, Braunschweig, Germany.
T Beutel, M Leester-Schadel, S Buttgenbach, "Design and evaluation process of a robust pressure sensor for measurements in boundary layers of liquid fluids", Microsystem Technologies, 2012, pp. 1-12, Braunschweig, Germany.
Nicolas Binder, Xavier Carbonneau, "Performance of a Thrust-Vectoring Solution for Unmanned Air Vehicles", Journal of propulsion and power, 2012, pp. 1125-1129, vol. 28, France.
Panfeng Zhang,Bo Yan, Chenfeng Dai, "Lift enhancement method by synthetic jet circulation control", Science china technological sciences, 2012, pp. 2585-2592, vol. 55, Issue No. 9, China.
Doig Graham, Barber Tracie J, Neely Andrew J, "Aerodynamic Characteristics of a Swept Wing in Close Ground Proximity at High Subsonic Mach Numbers", Journal of aerospace engineering, 2012, pp. 600-612, vol. 25, Issue No. 4, Sydney, Australia.
Antonio Dumas, Jose Pascoa, Michele Trancossi, Alessandro Tacchini, Galina Ilieva, Mauro Madonia, "Acheon project: a novel vectoring jet concept", Proceedings of the ASME 2012 International Mechanical Engineering Congress & Exposition, 2012, pp. 1-10, Texas, USA.
Brech Dale E, ST Amand Joseph D, Hoover Randy C, McGough Jeff S, Bedillion Mark, "Design and Development of a Vector Thrusting Quadrotor for Minimally Induced Pitch and Roll Motions", International mechanical engineering congress and exposition, 2012, pp. 193-201, vol. 4, Texas, USA.

(56) References Cited

OTHER PUBLICATIONS

Christian Werner-Spatz, Wolfgang Heinze, Peter Horst, Rolf Radespiel, "Multidisciplinary conceptual design for aircraft with circulation control high-lift systems", CEAS Aeronautical Journal, 2012, pp. 145-164, vol. 3, Issue No. 2-4, Braunschweig, Germany.
Rory Martin Golden, "Design and Performance of Circulation Control Geometries", Master's Theses and Project Reports, 2013, pp. 1-192, San Luis Obispo, USA.
Bob Collins, "Engineering Investigation Report", The Coanda disk aircraft development program, 2013, pp. 1-23, UK.
Ovidiu Crivoi, Ioan Doroftei, Florentina Adascalitei, "A survey on unmanned aerial vehicles based on coanda effect", Tehnomus, 2013, pp. 338-344, Romania.
Patrick Clayton, "Development of high-lift laminar wing using steady active flow control", Aerospace Engineering Commons, 2013, pp. 1-64, Ames, Iowa.
Relly Victoria Petrescu, Florian Ion Petrescu, "The aviation history or new aircraft i color", Create Space USA, 2013, pp. 1-292, USA.
Pascual Marques, "Emerging Technologies in UAV Aerodynamics", International Journal of Unmanned Systems Engineering, 2013, pp. 3-4, vol. 1, Southport, UK.
Valeriu Dragan, "A new mathematical model for high thickness coanda effect wall jets", Review of the Air Force Academy, 2013, pp. 23-28, vol. 1, Issue No. 23, Romania.
Sommerwerk Kay,Haupt Matthias C, Horst Peter, "FSI of high performance high-lift devices with circulation control via conditioned coanda-jets", Computational methods for coupled problems in science and engineering, 2013, Germany.
Marco Burnazzi, Rolf Radespiel, "Design of a droopnose configuration for a coanda active flap application", 51st AIAA Aerospace Sciences Meeting including the New Horizons Forum and Aerospace Exposition, 2013, pp. 1-14, Braunschweig, Germany.
Vlad Ciobaca, Timo Kuhn, Ralf Rudnik, Matthias Bauer, Burkhard Golling, Wiebke Breitenstein, "Active Flow-Separation Control on a High-Lift Wing-Body Configuration", Journal of aircraft, 2013, pp. 56-72, vol. 50, Issue No. 1, Germany.
Laliberte Jeremy F, Kraemer Kurtis L, Dawson Jeff W, Miyata David, "Design and Manufacturing of Biologically Inspired Micro Aerial Vehicle Wings Using Rapid Prototyping", International journal of micro air vehicles, 2013, pp. 15-38, vol. 5, Issue No. 1, Ottawa, Canada.
Hamamoto Masaki, Ohta Yoshiji, Hara Keita, Hisada Toshiaki, "Free-flight analysis of dragonfly hovering by fluid-structure interaction analysis based on an arbitrary lagrangian-eulerian method", Advanced Robotics, 2013, pp. 657-666, Japan.
Kay Sommerwerk, Matthias Haupt, Peter Horst, "Aeroelastic performance assessment of a wing with coanda effect circulation control via fluid-structure interaction", 31st AIAA Applied Aerodynamics Conference, 2013, pp. 1-13, California, USA.
Hang Yin, Jihong Zhu, Xiaming Yuan, Chao Zhang, "Robust Hover Control of Thrust-vectored Unmanned Tail-sitter Aircraft Against Gust Load", 2013 10th IEEE international conference on control and automation (ICCA), 2013, pp. 735-738, China.
Wang Xiangyang, Zhu Jihong, Zhang Yijun, "Dynamics Modeling and Analysis of Thrust-Vectored V/STOL Aircraft", 2013 32nd chinese control conference (CCC), 2013, China.
Dos Santos Davi Antonio, Saotome Osamu, Cela Arben, "Trajectory Control of Multirotor Helicopters with Thrust Vector Constraints", 2013 21st mediterranean conference on control and automation (MED), 2013, pp. 375-379, Brazil.
A Abbas, J De Vicente, E Valero, "Aerodynamic technologies to improve aircraft performance", Aerospace science and technology, 2013, pp. 100-132, vol. 28, Issue No. 1, Spain.
Yuan Wei, Katupitiya Jay, "Dynamic Modelling and Control of a Vectored Thrust Aerial Vehicle", 2013 IEEE/asme international conference on advanced intelligent mechatronics (AIM), 2013, pp. 1361-1366, Australia.
A Savvaris, A Buonanno, A Tsourdos, "Design and Development of the DEMON UAV Fluidic Flight Control System", Guidance, Navigation, and Control and Co-located Conferences, 2013, pp. 1-10, Munich, Germany.
Jose C Pascoa, Antonio Dumas, Michele Trancossi, Paul Stewart, Dean Vucinic, "A review of thrust-vectoring in support of a v/stol non-moving mechanical propulsion system", Central European Journal of Engineering, 2013, pp. 374-388, vol. 3, Issue No. 3, Portugal.
Harijono Djojodihardjo, "Progress and development of coanda jet and vortex cell for aerodynamic surface circulation control—an overview", The SIJ Transactions on Advances in Space Research & Earth Exploration, 2013, pp. 32-42, vol. 1, Selangor, Malaysia.
S G Constantinescu, Mihai Niculescu, "Experimental and Numerical Research of Lift Force Produced by Coanda Effect", AIP conference proceedings, 2013, pp. 152-155, vol. 1558, Issue No. 1, Romania.
Witold Mielniczek, Stephen D Prior, Mehmet Ali Erbil, Mantas Brazinskas, "Investigating novel applications of the coanda effect for small morphing unmanned aircraft", 2013 Internatiomal Conference on Innovation, Communication, and Engineering, 2013, China.
Jeon Jaehyeok, Lee Hyoju, Han Seonhye, Lee Hyunyong, Lee Choonghan, Kim Yong Bum, Choi Hyouk Ryeol, "Design and Control of an Unmanned Aerial Vehicle (UAV) Based on the Coanda Effect", 2013 10th international conference on ubiquitous robots and ambient intelligence (URAI), 2013, pp. 129-129, Korea.
Farzad Banazadeh, Saeid Niazi, Afshin Banazadeh, "Computational investigation of fluidic counter flow thrust vectoring applied to small engine exhaust jet", 15th Conference on Fluid Dynamics, 2013, pp. 1-10, Iran.
Vom Fachbereich Maschinenbau, "Unmanned Aerial Vehicle for Flow Control Experiments with Dielectric Barrier Discharge Plasma Actuators"2014, pp. 1-183, Germany.
Nikola Mirkov, Bosko Rasuo, "Numerical simulation of air jet attachment to convex walls and application to uav", Boundary and Interior Layers, Computational and Asymptotic Methods, 2014, pp. 197-207, Belgrade, Serbia.
Shyam S Dasa, M Abdollahzadeha, Jose C Pascoaa, A Dumasb, M Trancoss, "Numerical modeling of coanda effect in a novel propulsive system", Int. Jnl. of Multiphysics, 2014, pp. 181-201, vol. 8, Covilha, Portugal.
Jared Carr, Rafael Ferraz, Songqi Gao, Aaron Jameson, Chang Yul Lee, Daniel Lu, Aaron Wienkers, Cheng Hao Yuan, "Investigation of the Effect of Tubercles on Airfoil Performance", University of California at Berkeley Spring 2014, 2014, pp. 1-19, Berkeley, California.
Ibraheem Alqadi, Mahmood Khalid, Salah Hafez, "Airfoil performance studies with a trailing edge jet flap", Canadian Aeronautics and Space Journal, 2014, pp. 23-35, vol. 60, Issue No. 2, Saudi Arabia.
Rolf Radespiel, Marco Burnazzi, "Fundamentals in coanda flap design", Active Flow and Combustion Control, 2014, pp. 1-15, USA.
Michael Sinapiusa, Hans Peter Monnera, Markus Kintschera, Johannes Riemenschneider, "Dlr's morphing wing activities within the european network", Procedia IUTAM, 2014, pp. 416-426, vol. 10, Braunschweig, Germany.
Rizal E M Nasir, Wahyu Kuntjoro,Wirachman Wisnoe, "Aerodynamic, Stability and Flying Quality Evaluation on a Small Blended Wing-body Aircraft with Canard Foreplanes", Procedia technology, 2014, pp. 783-791, vol. 15, Malaysia.
Baramee Wessapakdee, Pranchalee Makarasut, Chinnapat Thipyopas, "An Experimental and Computational Fluid Dynamic Study of Axis-Symmetric Coanda Configuration for VTOL MAV Application", Applied Mechanics and Materials, 2014, pp. 42-47, vol. 629, Switzerland.
Angel Huminic, Gabriela Huminic, "Automotive wing with active control of flow", University Politehnica Bucharest—Scientific Bulletin, Series D, 2014, pp. 231-238, vol. 76, Issue No. 4, Romania.
Carsten Lenfers, Ruud F Jansseny, Nils Beckz, Jens Friedrichs, Alireza Rezaeian, "Experimental Investigation of the Propeller Design for future QESTOL Aircraft in the BNF Project", AIAA SciTech Forum, 2014, pp. 1-13, USA.

(56) References Cited

OTHER PUBLICATIONS

Jonathan Kweder, Cale H Zeune, Jon Geiger, Andrew D Lowery, James E Smith, "Experimental Evaluation of an Internally Passively Pressurized Circulation Control Propeller", Journal of Aerodynamics, 2014, pp. 1-11, vol. 2014, USA.

K Sommerwer, M C Haupt, "Design analysis and sizing of a circulation controlled cfrp wing with coand-flaps via cfd-csm coupling", CEAS Aeronautical Journal, 2014, pp. 95-108, vol. 5, Issue No. 1, Braunschweig, Germany.

S V Vorob'ev, E V Myshenkov, E V Myshenkova, E Yu Shelgunov, "Rotation of the thrust vector of a two-dimensional nozzle by means of displacing the critical surface", Fluid Dynamics, 2014, pp. 288-297, vol. 49, Issue No. 2, Moscow, Russia.

Konstantinos Kanistras, Matthew J Rutherford, Kimon P Valavanis, "Development of a circulation control wing for uavs", Aerospace Conference, 2014, pp. 1-8, USA.

Sagar Bose, Rohan Verma, Kriti Garuda, Aditya Tripathi, Shibu Clement, "Modeling, analysis and fabrication of a thrust vectoring spherical VTOL aerial vehicle", 2014 IEEE aerospace conference, 2014, pp. 1-6, Goa, India.

Marco Burnazzi, Rolf Radespiel, "Design and analysis of a droop nose for coanda flap applications", Design and Analysis of a Droop Nose for Coanda Flap Applications, 2014, pp. 1567-1579, vol. 51, Issue No. 5, Brunswick, Germany.

Zhaohui Cen, Tim Smith, Paul Stewart, Jill Stewart, "Integrated flight/thrust vectoring control for jet-powered unmanned aerial vehicles with ACHEON propulsion", journal of aerospace engineering, 2014, pp. 1057-1075, vol. 229, Issue No. 6, UK.

Adeel Khalid, Parth Kumar, "Aerodynamic Optimization of Box Wing—A Case Study", International Journal of Aviation, Aeronautics, and Aerospace, 2014, pp. 1-45, vol. 1, Issue No. 4, USA.

Aditi Kajale, Neha Joshi, Shraddha Borase, Manisha Mhetre, "Coanda effect flow meter", 2nd International Conference on Emerging Trends in Engineering & Techno-Sciences, 2014, pp. 44-49, India.

Marco Petrolo, Erasmo Carrera, Michele D'Ottavio, Coen De Visser, Zdenek Patek, Zdenek Janda 6E, "On the development of the Anuloid, a disk-shaped VTOL aircraft for urban areas", Advances in Aircraft and Spacecraft Science, 2014, pp. 353-378, vol. 1, Issue No. 3, Australia.

Galina Ilieva, Jose Pascoa, Antonio Dumas, Michele Trancossi, "Maat—promising innovative design and green propulsive concept for future airship's transport", Aerospace science and technology, 2014, pp. 1-14, vol. 35, Italy.

K C Pfingsten, R D Cecora, R Radespiel, "An experimental investigation of a gapless high-lift system using circulation control", Katenet II Conference, 2014, pp. 1-17, Germany.

Aditi Kajale, Neha Joshi, Shraddha Borase, Manisha Mhetre, "Micrcontroller based coanda effect flow meter", International Journal of Advances in Applied Science and Engineering, 2014, pp. 125-130, vol. 1, Issue No. 3, Pune, India.

Rinie A Akkermans, Michael Pott-Pollenske, Heino Buchholz, Jan Delfs, Daniela Almoneit, "Installation Effects of a Propeller Mounted on a High-Lift Wing with a Coanda Flap. Part I: Aeroacoustic Experiments", AIAA Aviation Forum, 2014, pp. 1-14, Braunschweig, Germany.

Pradeep Kumar, Yosef M El Sayed, Richard Semaan, "Optimized sensor placement using stochastic estimation for a flow over a 2d airfoil with coanda blowing", 7th AIAA Flow Control Conference, 2014, pp. 1-11, Braunschweig, Germany.

Juergen Dierke, Rinie A Akkermans, Jan Delfs, "Installation effects of a propeller mounted on a wing with coanda flap. part ii: numerical investigation and experimental validation", 20th AIAA/CEAS Aeroacoustics Conference, 2014, pp. 1-23, Braunschweig, Germany.

Gai Wendong, Zhang Jing, Huang Liangsong, Li Yuxia, "Transition Flight Control Using Adaptive Neutral Network Dynamic inversion for Canard Rotor/Wing UAV", 26th chinese control and decision conference (2014 CCDC), 2014, pp. 4210-4214, Qingdao, China.

Han Seonhye, Lee Hyunyong, Lee Hyoju, Jeon Jaehyeok, Lee Choonghan, Kim Yong Bum, Choi Hyouk Ryeol, "A Flying Saucer Lifted with Coanda Effect", 2014 IEEE international conference on robotics and automation (ICRA), 2014, p. 2561, Hong Kong, China.

Papachristos Christos, Alexis Kostas, Tzes Anthony, "Efficient Force Exertion for Aerial Robotic Manipulation: Exploiting the Thrust-Vectoring Authority of a Tri-TiltRotor UAV", 2014 IEEE international conference on robotics and automation (ICRA), 2014, pp. 4500-4505, China.

A Sunol, D Vucinic, "Numerical analysis and UAV application of the ACHEON thrust vectoring nozzle", AIAA Aviation, 2014, pp. 1-12, Atlanta, USA.

Konstantinos Kanistras, Matthew J Rutherford, Nikolaos Vitzilaios, "Experimental Study of Circulation Control Wings at Low Reynolds Numbers", 32nd AIAA Applied Aerodynamics Conference, 2014, pp. 1-17, USA.

Aleks Udris, "What Are Canards, and Why Don't More Aircraft Have Them?", Boldmethod Llc, 2014, pp. 1-11, USA.

Ahmed Riyadh Ibraheem, Djojodihardjo Harijono, Abu Talib Abd Rahim, Mohd Rafie, Azmin Shakrine, "Application of Coanda Jet for Generating Lift of Micro Air Vehicles—Preliminary Design Considerations", Mechanics and Materials, 2014, pp. 139-144, vol. 629, Switzerland.

Martin Schwerter, Monika Leester-Schadel, Stephanus Buttgenbach, Andreas Dietzel, Christian Behr, Michael Sinapius, Peter Wierach, "Mems pressure sensors embedded into fiber composite airfoils", Sensors, 2014, pp. 531-534, Braunschweig, Germany.

Harijono Djojodihardjo, Riyadh Ibraheem Ahmed, Ali Yousefian, "An analysis on the lift generation for coanda micro air vehicles", Aerospace Electronics and Remote Sensing Technology, 2014, pp. 164-169, Malaysia.

Jose C Pascoa, Frederico F Rodrigues, Shyam S Das, M Abdollahzadeh, A Dumas, Michele Trancossi, Maharshi Subhash, "Exit flow vector control on a coanda nozzle using dielectric barrier discharge actuator", Proceedings of the ASME 2014 International Mechanical Engineering Congress and Exposition, 2014, pp. 1-8, Portugal.

J Delfs, B Fabmann, N Lippitz, M Lummer, M Mobner, L Muller, K Rurkowska, S Uphoff, "SFB 880: aeroacoustic research for low noise take-off and landing", CEAS Aeronautical Journal, 2014, pp. 403-417, Braunschweig, Germany.

M Burnazzi, R Radespiel, "Assessment of leading-edge devices for stall delay on an airfoil with active circulation control", CEAS Aeronautical Journal, 2014, pp. 359-385, vol. 5, Issue No. 4, Germany.

Nedelcut Florin, "Aspects regarding concept, design, development and use of a coanda effect unmanned aerial vehicle", The annals of dunarea de jos, 2014, pp. 35-40, Romania.

Rasuo, Bosko, Mirkov Nikola, "On the possibility of using coanda effect for unmanned aerial vehicles—a numerical investigation", PAMM: Proceedings in Applied Mathematics & Mechanics, 2014, pp. 627-628, Belgrade, Serbia.

Gongjun Li, Bin Meng, "Actuators Coupled Design Based Adaptive Backstepping Control of Air-breathing Hypersonic Vehicle", IFAC-PapersOnLine, 2015, pp. 508-513, vol. 48, Issue No. 28, China.

M Forster, M Biava, R Steijl, "Optimisation of Coanda Surfaces for Transonic Circulation Control", 6th European Conference for Aerospace Sciences, 2015, pp. 1-14, UK.

Harijono Djojodihardjo, Riyadh I Ahmed, A R Abu-Talib, A S Mohd-Rafie, "Analyical and CFD visualization studies of coanda MAV", 13th Asian Symposium on Visualization, 2015, pp. 1-10, vol. 13, Novosibirsk, Russia.

Enamul Haque, Shafayate Hossain, Assad-Uz-Zaman, Mohammad Mashud, "Design and construction of an unmanned aerial vehicle based on coanda effect", Proceedings of the International Conference on Mechanical Engineering and Renewable Energy, 2015, pp. 1-6, Khulna, Bangladesh.

Dennis Keller, Ralf Rudnik, "Numerical Investigation of Engine Effects on a Transport Aircraft with Circulation Control", Journal of aircraft, 2015, pp. 421-438, vol. 52, Issue No. 2, Braunschweig, Germany.

Yosef El Sayed Mohamed, Richard Semaan, "Progress toward closed loop control of a flow around an airfoil with coanda blowing", Instability and Control of Massively Separated Flows, 2015, pp. 71-76, Braunschweig, Germany.

(56) References Cited

OTHER PUBLICATIONS

Yifei Zhang, Lijun Xu, Haixin Chen, "Numerical Research on Aerodynamic Efficiency of GFS UAV", AIAA SciTech Forum, 2015, pp. 1-13, Florida, USA.

Alexis Lefebvre, G C Zha, Coral Gables, "Design of High Wing Loading Compact Electric Airplane Utilizing Co-Flow Jet Flow Control", 53rd AIAA Aerospace Sciences Meeting, 2015, pp. 1-23, Florida, USA.

M Abdollahzadeh, F Rodrigues, J C Pascoa, P J Oliveira, "Numerical design and analysis of a multi-dbd actuator configuration for the experimental testing of acheon nozzle model", Aerospace science and technology, 2015, pp. 259-273, vol. 41, Covilha, Portugal.

S H Teichel, M Dorbaum, O Misir, A Merkert, A Mertens, J R Seume, B Ponick, "Design considerations for the components of electrically powered active high-lift systems in civil aircraft", CEAS Aeronautical Journal, 2015, pp. 49-67, vol. 6, Issue No. 1, Hannover, Germany.

Jobst Henning Diekmann, "Analysis of trimmable conditions for a civil aircraft with active high-lift system", CEAS Aeronautical Journal, 2015, pp. 109-120, vol. 6, Issue No. 1, Germany.

Konstantinos Kanistras, Pranith Chander Saka, Kimon P Valavanis, "Design and development of an air supply unit for circulation control wing-based uavs", Aerospace Conference, 2015, pp. 1-10, USA.

Drew James, Perry Dominic, Stevenson Beth, Trimble Stephen, "Coanda effect makes flying saucer", Flight International, 2015, p. 25, vol. 187, Issue No. 5488, USA.

Milosz J Kalinowski, "Structural Optimization of Box Wing Aircraft", Archive of mechanical engineering, 2015, pp. 45-60, vol. 62, Warsaw, Poland.

Jobst Henning Diekmann, Klaus-Uwe Hahn, "Effect of an active high-lift system failure during landing approaches", CEAS Aeronautical Journal, 2015, pp. 181-196, vol. 6, Issue No. 2, Braunschweig, Germany.

M Burnazzi, R Radespiel, "Synergies between suction and blowing for active high-lift flaps", CEAS Aeronautical Journal, 2015, pp. 305-318, vol. 6, Issue No. 2, Braunschweig, Germany.

Kuang Minchi, Zhu Jihong, "Hover control of a thrust-vectoring aircraft", Science china information sciences, 2015, pp. 1-5, vol. 58, Issue No. 7, Beijing, China.

Konstantinos Kanistras, Pranith Chander Saka, Kimon P Valavanis, Nikolaos I Vitzilaios, Matthew J Rutherford, "Low Speed Wind Tunnel Investigation of a Circulation Control Wing for Enhanced Lift", 33rd AIAA Applied Aerodynamics Conference, 2015, pp. 1-17, Denver, US.

Gan Caiyin, Sahari Khairul, Tan Chingseong, "Numerical investigation on Coanda flow over a logarithmic surface", Journal of Mechanical Science & Technology, 2015, pp. 2863-2869, vol. 29, Issue No. 7, Kajang, Malaysia.

Hiranya Jayakody, Jay Katupitiya, "An Adaptive Variable Structure Control Methodology for Attitude and Position Control of a Vectored Thrust Aerial Vehicle", 2015 IEEE international conference on advanced intelligent mechatronics (AIM), 2015, pp. 1014-1019, Busan, Korea.

Martin Krosche, Wolfgang Heinze, "Robustness Analysis of an Aircraft Design for Short Takeoff and Landing", Journal of aircraft, 2015, pp. 1235-1246, vol. 52, Issue No. 4, Braunschweig, Germany.

\* cited by examiner

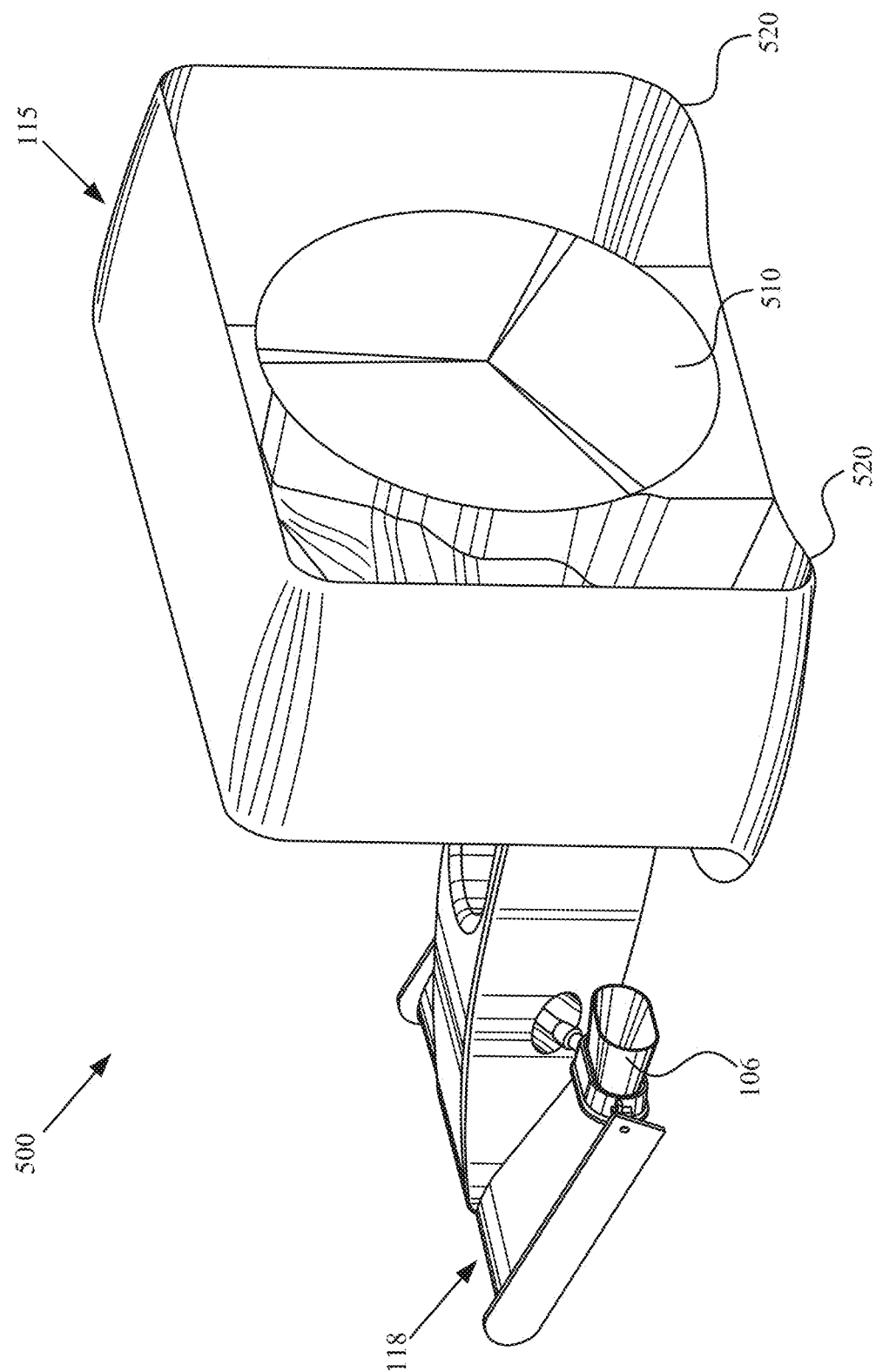

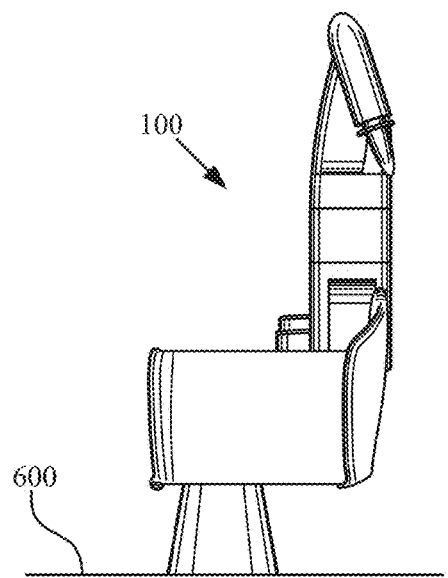
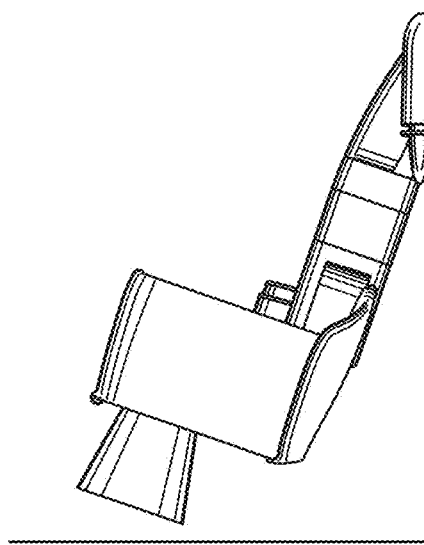
*Fig. 6A*  *Fig. 6B*
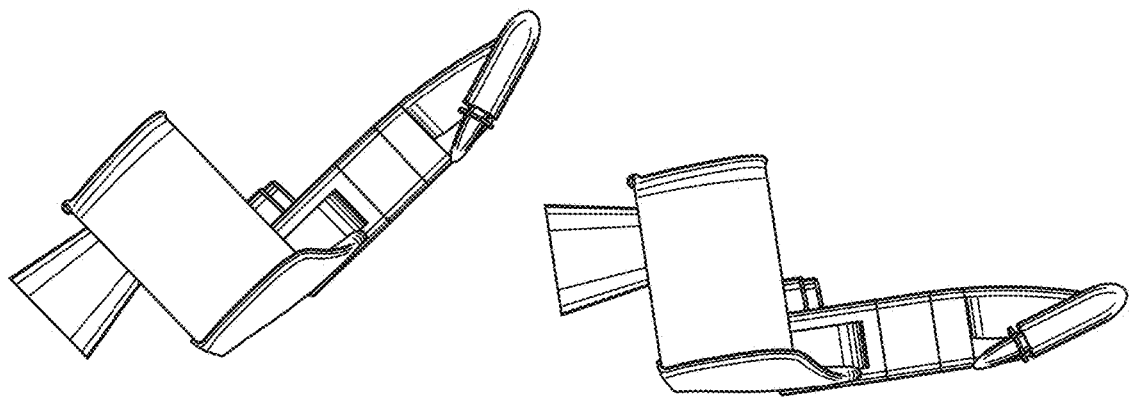
*Fig. 6C*  *Fig. 6D*

CONFIGURATION FOR VERTICAL TAKE-OFF AND LANDING SYSTEM FOR AERIAL VEHICLES

PRIORITY CLAIM AND CROSS-REFERENCE TO RELATED APPLICATIONS

This application claims the benefit of Provisional Application No. 62/525,592 filed Jun. 27, 2017.

This application is a continuation-in-part of Application No. PCT/US2018/037902, filed Jun. 15, 2018.

This application claims the benefit of Provisional Application No. 62/677,419, filed May 29, 2018.

This application claims the benefit of Provisional Application No. 62/673,094, filed May 17, 2018.

This application is a continuation-in-part of application Ser. No. 15/670,947, filed Aug. 7, 2017, which claims the benefit of Provisional Application No. 62/371,926, filed Aug. 8, 2016.

This application claims the benefit of Provisional Application No. 62/531,817, filed Jul. 12, 2017.

This application is a continuation-in-part of Design application No. 29/645,616 filed Apr. 27, 2018.

This application claims the benefit of Provisional Application No. 62/629,626, filed Feb. 12, 2018.

This application is a continuation-in-part of Design application Nos. 29/625,627; 29/625,625; 29/625,624 and 29/625,614; all filed Nov. 10, 2017.

This application is a continuation-in-part of Application No. PCT/US2017/048479, filed Aug. 24, 2017; which claims the benefit of Provisional Application Nos. 62/380,108, filed Aug. 26, 2016; and 62/379,711, filed Aug. 25, 2016.

This application is a continuation-in-part of application Ser. No. 15/685,975, filed Aug. 24, 2017; which claims the benefit of Provisional Application Nos. 62/380,108, filed Aug. 26, 2016; and 62/379,711, filed Aug. 25, 2016.

This application is a continuation-in-part of application Ser. No. 15/686,052, filed Aug. 24, 2017; which claims the benefit of Provisional Application Nos. 62/379,711, filed Aug. 25, 2016, and 62/380,108 filed Aug. 26, 2016; application Ser. No. 15/686,052 is also a continuation-in part of application Ser. No. 15/670,943, filed Aug. 7, 2017; which claims the benefit of Provisional Application Nos. 62/371,612, filed Aug. 5, 2016; 62/379,711 filed Aug. 25, 2016; 62/380,108, filed Aug. 26, 2016; and 62/525,592, filed Jun. 27, 2017; application Ser. No. 15/686,052 is also a continuation-in-part of application Ser. No. 15/654,621 filed Jul. 19, 2017; which claims the benefit of Provisional Application No. 62/371,612 filed Aug. 5, 2016; 62/371,926 filed Aug. 8, 2016; 62/380,108, filed Aug. 26, 2016, 62/525,592, filed Jun. 27, 2017; and 62/531,817, filed Jul. 12, 2017; Ser. No. 15/686,052 is also a continuation-in-part of application Ser. No. 15/368,428, filed Dec. 2, 2016; which claims the benefit of Provisional Application No. 62/263,407, filed Dec. 4, 2015; application Ser. No. 15/686,052 is also a continuation-in-part of Application No. PCT/US2016/064827, filed Dec. 2, 2016; which claims the benefit of Provisional Application No. 62/263,407, filed Dec. 4, 2015; application Ser. No. 15/686,052 is also a continuation-in-part of application Ser. No. 15/456,450 filed Mar. 10, 2017; which claims the benefit of Provisional Application No. 62/307,318, filed Mar. 11, 2016; application Ser. No. 15/456,450 is also a continuation-in-part of application Ser. No. 15/256,178 filed Sep. 2, 2016; which claims the benefit of Provisional Application No. 62/213,465, filed Sep. 2, 2015; application Ser. No. 15/686, 052 is also a continuation-in-part of Application No. PCT/US2017/021975, filed Mar. 10, 2017; which claims the benefit of Provisional Application No. 62/307,318, filed Mar. 11, 2016; application Ser. No. 15/686,052 is also a continuation-in-part of application Ser. No. 15/221,389, filed Jul. 27, 2016; which claims the benefit of Provisional Application No. 62/213,465, filed Sep. 2, 2015; application Ser. No. 15/686,052 is also a continuation-in-part of Application No. PCT/US2016/044327, filed Jul. 27, 2016; which claims the benefit of Provisional Application No. 62/213, 465, filed Sep. 2, 2015; application Ser. No. 15/686,052 is also a continuation-in-part of application Ser. No. 15/625, 907, filed Jun. 16, 2017; which is a continuation-in-part of application Ser. No. 15/221,389, filed Jul. 27, 2016; which claims the benefit of Provisional Application No. 62/213, 465, filed Sep. 2, 2015; application Ser. No. 15/686,052 is also a continuation-in-part of application Ser. No. 15/221, 439, filed Jul. 27, 2016, which claims the benefit of Provisional Application No. 62/213,465, filed Sep. 2, 2015; application Ser. No. 15/686,052 is also a continuation-in-part of Application No. PCT/US2016/044326, filed Jul. 27, 2016; which claims the benefit of Provisional Application No. 62/213,465, filed Sep. 2, 2015; application Ser. No. 15/686,052 is also a continuation-in-part of application Ser. No. 15/256,178, filed Sep. 2, 2016; which claims the benefit of 62/213,465, filed Sep. 2, 2015; application Ser. No. 15/686,052 is also a continuation-in-part of Application No. PCT/US2016/050236, filed Sep. 2, 2016; which claims the benefit of Provisional Application No. 62/213,465, filed Sep. 2, 2015.

This application is a continuation-in-part of Application No. PCT/US2017/045784, filed Aug. 7, 2017; which claims the benefit of Provisional Application No. 62/371,926, filed Aug. 8, 2016.

This application is a continuation-in-part of Application No. PCT/US2017/042919, filed Jul. 19, 2017; which claims the benefit of Provisional Application No. 62/371,612, filed Aug. 5, 2016.

This application is a continuation-in-part of application Ser. No. 15/654,630, filed Jul. 19, 2017, which claims the benefit of Provisional Application No. 62/371,612, filed Aug. 5, 2016.

This Application is a continuation-in-part of application Ser. No. 15/670,943 filed Aug. 7, 2017, which claims the benefit of Provisional Application Nos. 62/371,612, filed Aug. 5, 2016; 62/371,926 filed Aug. 8, 2016; 62/379,711 filed Aug. 25, 2016; 62/380,108 filed Aug. 26, 2016; 62/525, 592 filed Jun. 27, 2017; and 62/531,817, filed Jul. 12, 2017; application Ser. No. 15/670,943 is also a continuation-in-part of application Ser. No. 15/368,428, filed Dec. 2, 2016; which claims the benefit of Provisional Application No. 62/263,407, filed Dec. 4, 2015; application Ser. No. 15/670, 943 is also a continuation-in-part of Application No. PCT/US2016/064827 filed Dec. 2, 2016; which claims the benefit of Provisional Application No. 62/263,407 filed Dec. 4, 2015; application Ser. No. 15/670,943 is also a continuation-in-part of application Ser. No. 15/456,450, filed Mar. 10, 2017; which claims the benefit of Provisional Application No. 62/307,318, filed Mar. 11, 2016; application Ser. No. 15/456,450 is also a continuation-in-part of Ser. No. 15/256, 178, filed Sep. 2, 2016; which claims the benefit of Provisional Application No. 62/213,465, filed Sep. 2, 2015; application Ser. No. 15/670,943 is also a continuation-in-part of Application No. PCT/US2017/021975, filed Mar. 10, 2017; which claims the benefit of Provisional Application No. 62/307,318, filed Mar. 11, 2016; application Ser. No. 15/670,943 is also a continuation-in-part of application Ser. No. 15/221,389, filed Jul. 27, 2016; which claims the benefit of Provisional Application No. 62/213,465, filed Sep. 2, 2015; application Ser. No. 15/670,943 is also a continuation-in-part of Application No. PCT/US2016/044327, filed Jul. 27, 2016; which claims the benefit of Provisional Application No. 62/213,465, filed Sep. 2, 2015; application Ser. No. 15/670,943 is also a continuation-in-part of application Ser. No. 15/221,389 filed Jul. 27, 2016; which claims the benefit of Provisional Application No. 62/213,465 filed Sep. 2, 2015; application Ser. No. 15/670,943 is also a continuation-in-part of application Ser. No. 15/221,439, filed Jul. 27, 2016, which claims the benefit of Provisional Application No. 62/213,465, filed Sep. 2, 2015; application Ser. No. 15/670,943 is also a continuation-in-part of Application No. PCT/US2016/044326, filed Jul. 27, 2016; which claims the benefit of Provisional Application No. 62/213,465, filed Sep. 2, 2015; application Ser. No. 15/670,943 is also a continuation-in-part of application Ser. No. 15/256,178, filed Sep. 2, 2016; which claims the benefit of Provisional Application No. 62/213,465, filed Sep. 2, 2015; application Ser. No. 15/670,943 is also a continuation-in-part of Application No. PCT/US2016/050236, filed Sep. 2, 2016; which claims the benefit of Provisional Application No. 62/213,465, filed Sep. 2, 2015.

This Application is a continuation-in-part of application Ser. No. 15/654,621, filed Jul. 19, 2017; which claims the benefit of Provisional Application Nos. 62/371,612, filed Aug. 5, 2016; 62/371,926, filed Aug. 8, 2016; 62/380,108, filed Aug. 26, 2016; 62/525,592, filed Jun. 27, 2017; and 62/531,817 filed Jul. 12, 2017.

This Application is a continuation-in-part of application Ser. No. 15/368,428 filed Dec. 2, 2016; which claims the benefit of Application No. 62/263,407, filed Dec. 4, 2015.

This Application is a continuation-in-part of application Ser. No. 15/456,450 filed Mar. 10, 2017; which claims the benefit of Application No. 62/307,318 filed Mar. 11, 2016; and is a continuation-in-part of application Ser. No. 15/256,178 filed Sep. 2, 2016; which claims the benefit of Application No. 62/213,465 filed Sep. 2, 2015.

This Application is a continuation-in-part of application Ser. No. 15/221,389 filed Jul. 27, 2016; which claims the benefit of Application No. 62/213,465 filed Sep. 2, 2015.

This Application is a continuation-in-part of application Ser. No. 15/625,907 filed Jun. 16, 2017; which is a continuation-in-part of application Ser. No. 15/221,389 filed Jul. 27, 2016; which claims the benefit of 62/213,465 filed Sep. 2, 2015.

This Application is a continuation-in-part of application Ser. No. 15/221,439 filed Jul. 27, 2016; which claims the benefit of Application No. 62/213,465 filed Sep. 2, 2015.

This Application is a continuation-in-part of Application No. PCT/US2016/044326 filed Jul. 27, 2016; which claims the benefit of Application No. 62/213,465 filed Sep. 2, 2015.

This Application is a continuation-in-part of application Ser. No. 15/256,178 filed Sep. 2, 2016; which claims the benefit of Application No. 62/213,465 filed Sep. 2, 2015.

All of the aforementioned applications are hereby incorporated by reference as if fully set forth herein.

COPYRIGHT NOTICE

This disclosure is protected under United States and/or International Copyright Laws. © 2018 Jetoptera, Inc. All Rights Reserved. A portion of the disclosure of this patent document contains material which is subject to copyright protection. The copyright owner has no objection to the facsimile reproduction by anyone of the patent document or the patent disclosure, as it appears in the Patent and/or Trademark Office patent file or records, but otherwise reserves all copyrights whatsoever.

BACKGROUND

Every VTOL aircraft faces the challenges of sizing of the engine(s) and the balance of forces. See Daniel Raymer, *Aircraft Design: A Conceptual Approach* (*AIAA Education Series*), page 754 (5th ed. 2012).

Vertical take-off can be achieved with a high thrust-to-weight ratio. In contrast, during horizontal flight (cruise), lift forces contribute to the aircraft, and the thrust requirements are much smaller. However, if the intent is to design an aircraft that flies horizontally for a period of time, the VTOL requirement would make the engine requirements too limiting, adding a lot of weight that is then carried around in cruise conditions without functionality. Therefore, the sizing of the engine and thrust matching for a cruise-dominated VTOL aircraft becomes a major issue.

Balance is one of the most important drivers for the design of a VTOL aircraft. During the take-off phase, the thrust has to be distributed around the aircraft, and moments are balanced around the center of mass, in order for the aircraft to remain balanced. The aircraft cannot be balanced if the source of the thrust is in only one location. For example, even when a horizontal aircraft such as the Harrier is balanced in air, the aircraft needs to employ several thrust generating elements in locations specifically chosen in order to cancel out the moments at all times (calculated as force (thrust)×moment arm around the center of the aircraft mass). This is difficult to achieve if the majority of the thrust is located, for instance, in the rear portion of the aircraft (as typically found in a VTOL aircraft).

BRIEF DESCRIPTION OF THE DRAWING FIGURES

Figure 4:
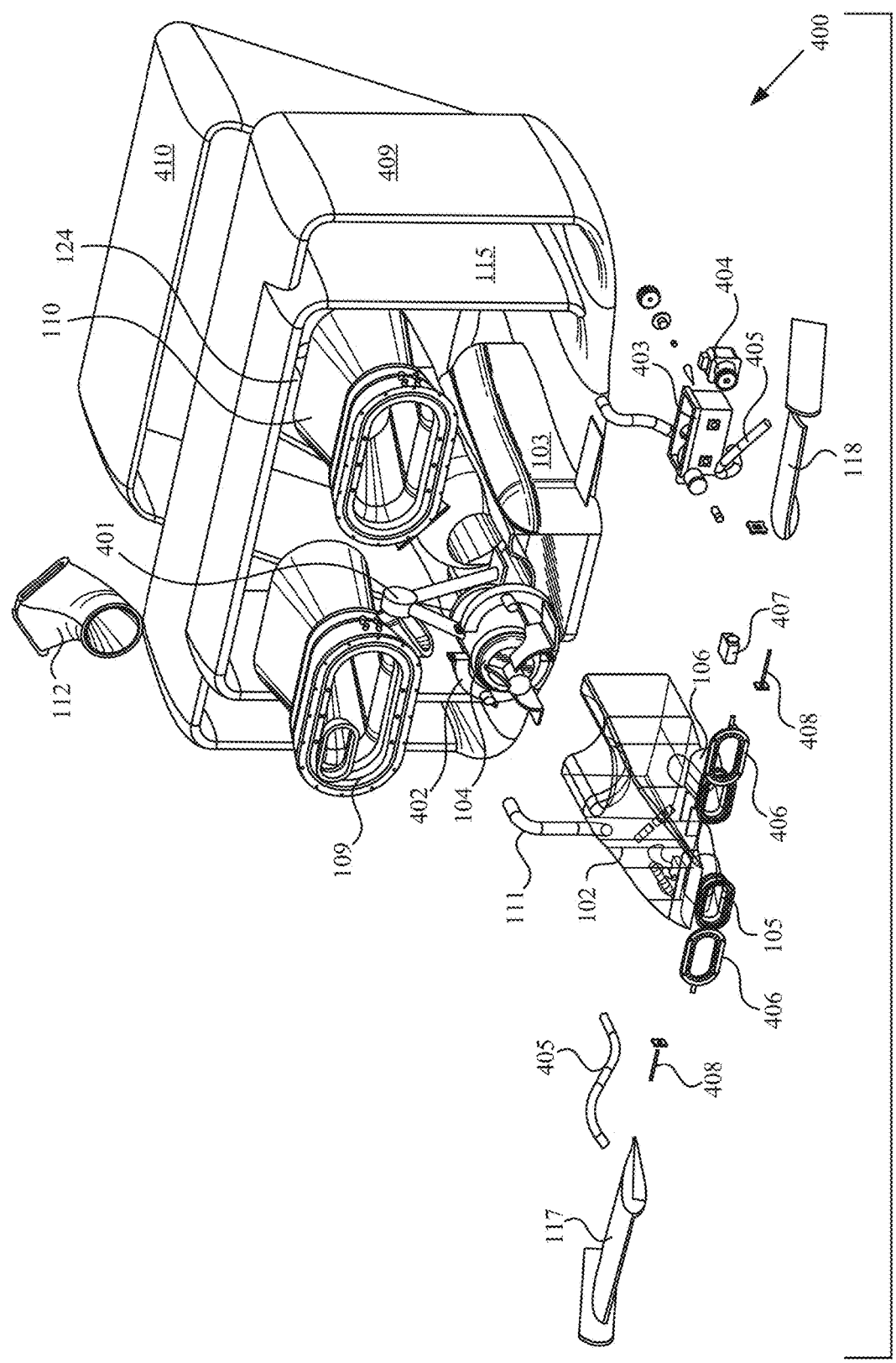
Figure 7:
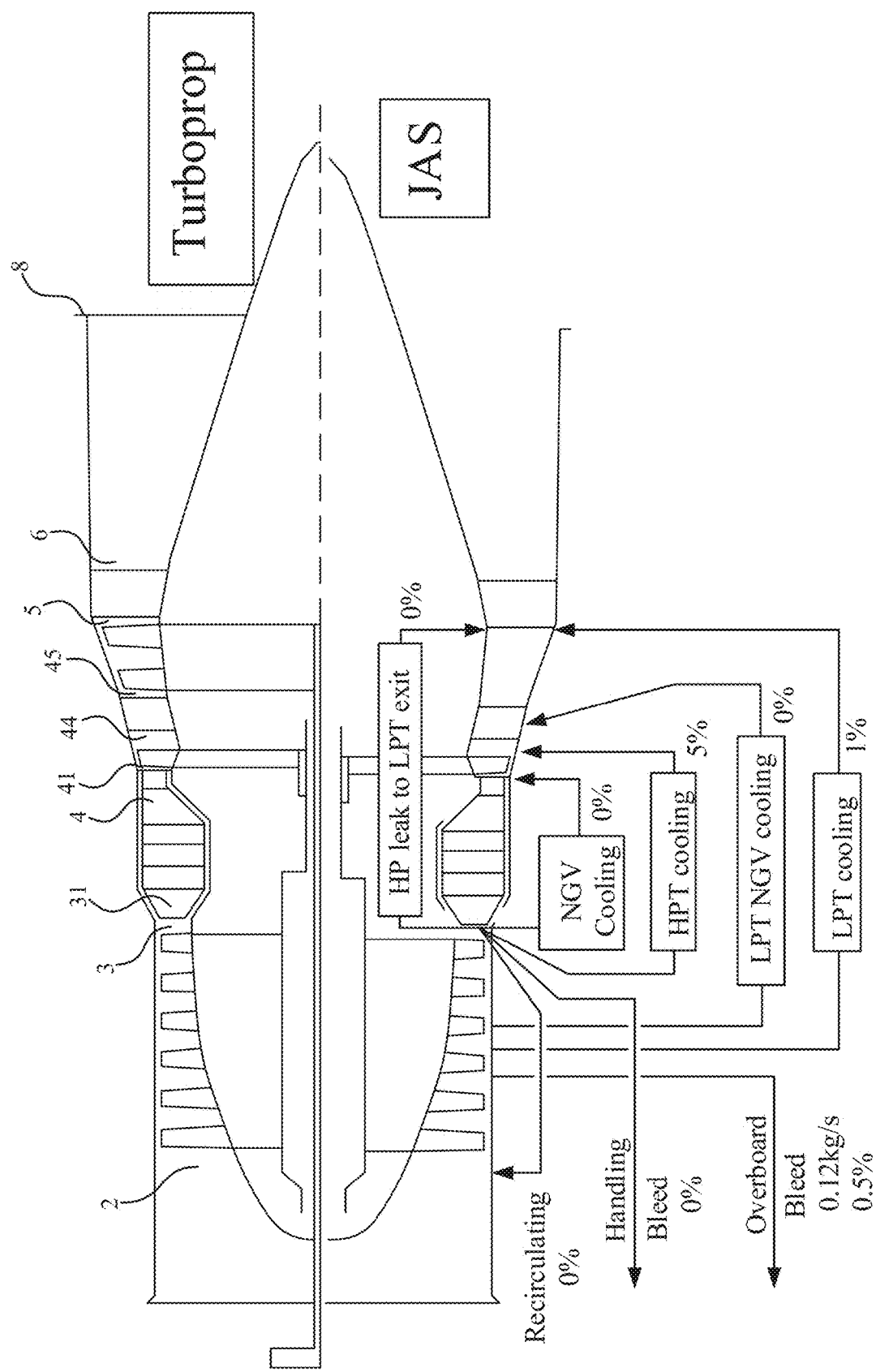
Figure 8:
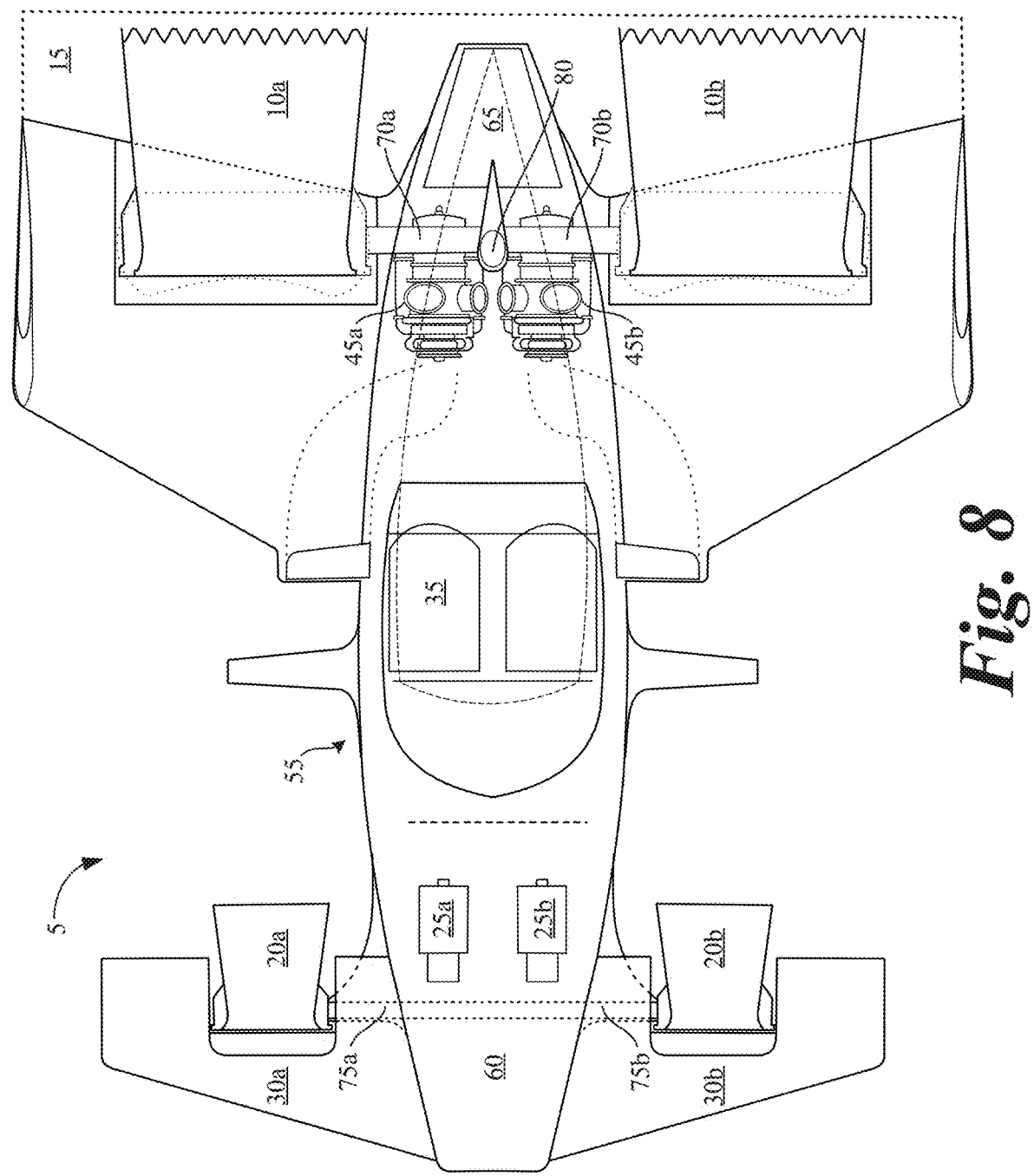

FIG. 4. illustrates an alternative embodiment of the present invention in an exploded isometric view;

FIG. 5 illustrates an alternative embodiment of the present invention in rear perspective view;

FIGS. 6A-6D illustrate the progression of an embodiment of the present invention from take-off to level flight relative to a landing/takeoff surface; and FIG. 7 illustrates the upper half of a turboshaft/turboprop engine with highlights of the stations of the flow according to an embodiment of the present invention FIG. 8 illustrates one embodiment of the present invention in a top view.

Figure 9:
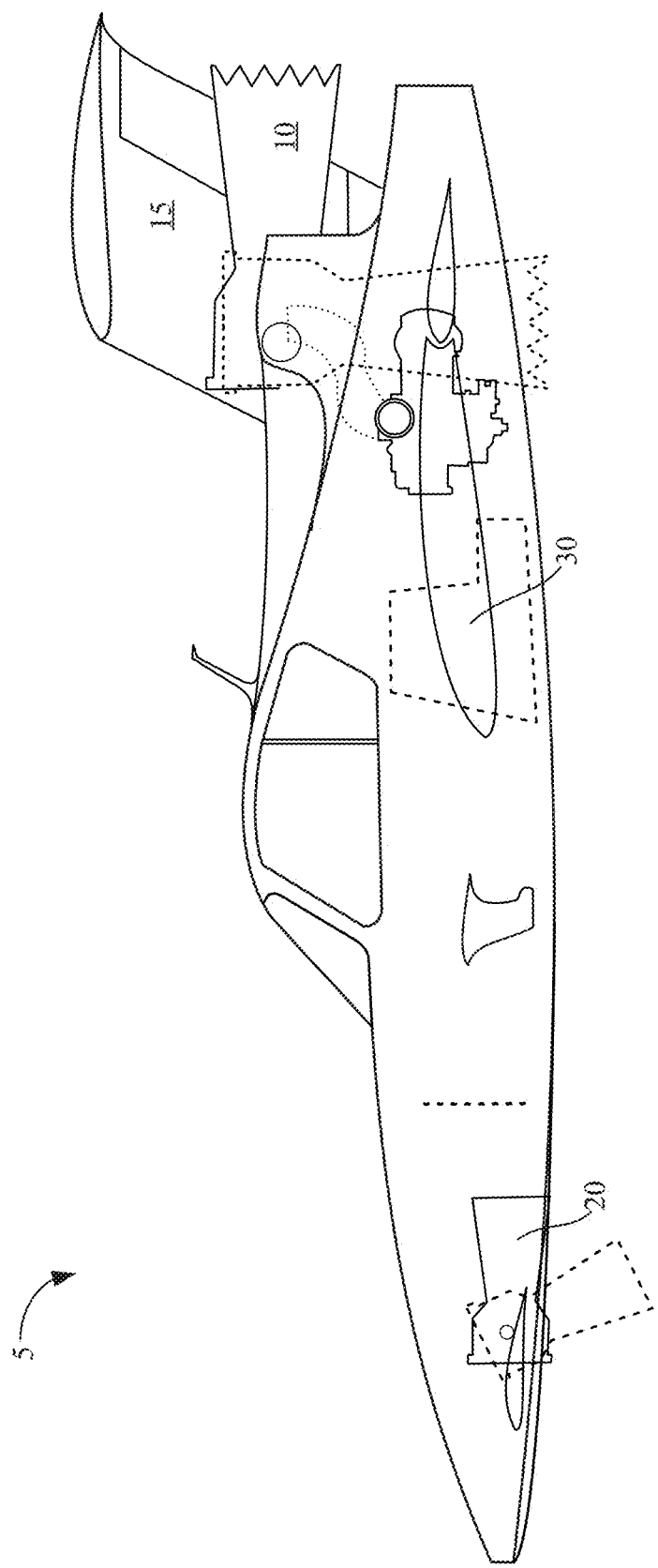

FIG. 9 is a side cross-sectional view of the embodiment shown in FIG. 8.

Figure 10:
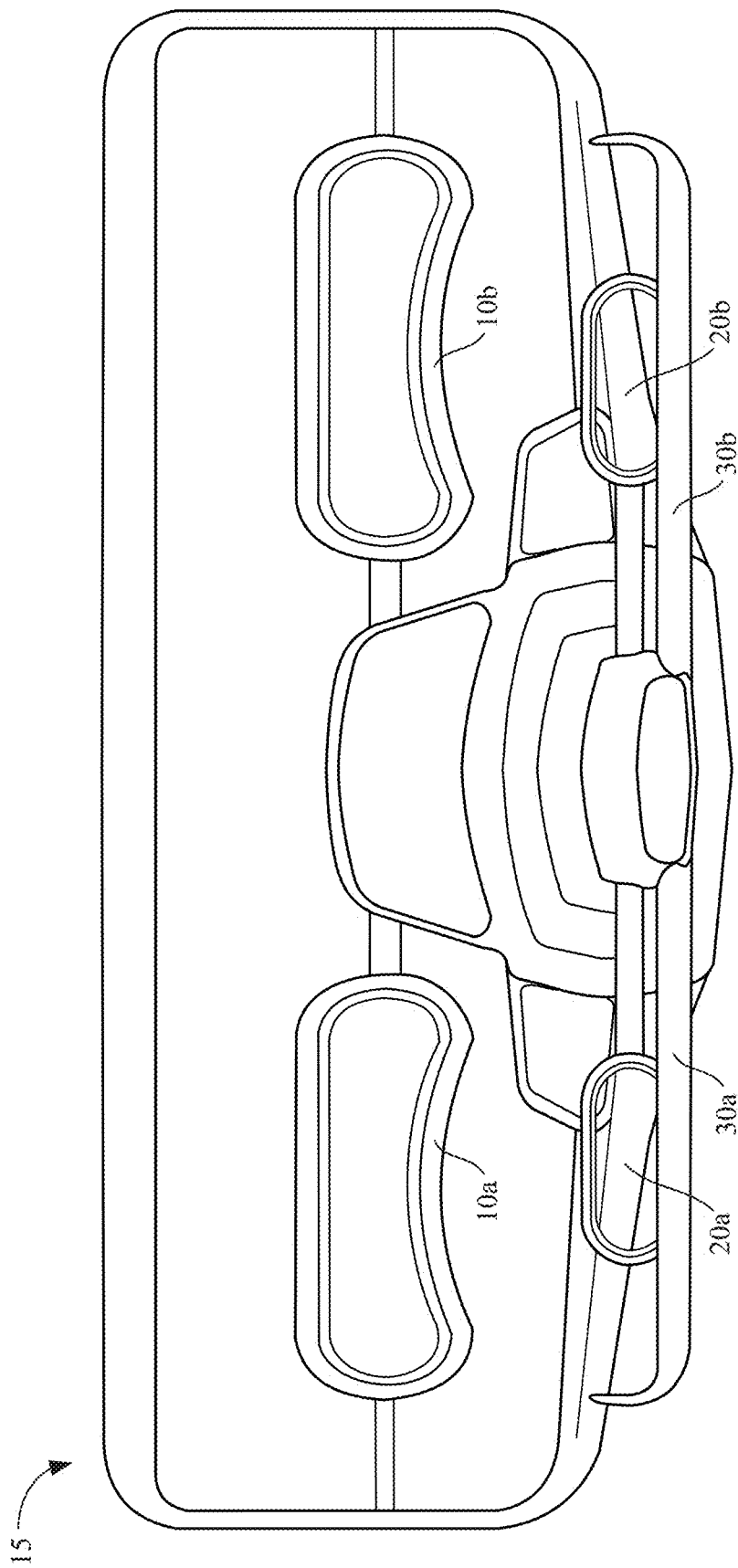

FIG. 10 is a front view of the embodiment shown in FIG. 8.

Figure 11:
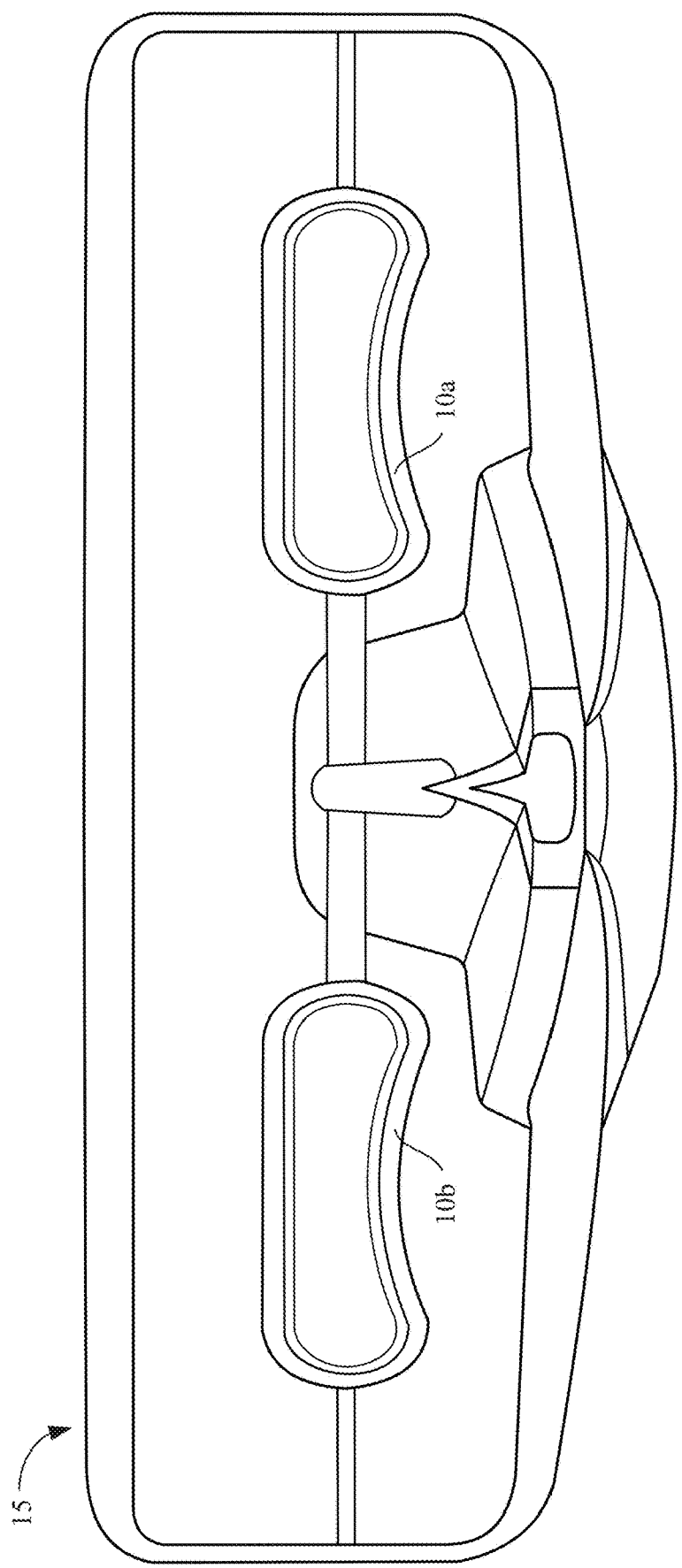

FIG. 11 is a rear view of the embodiment shown in FIG. 8.

Figure 12:
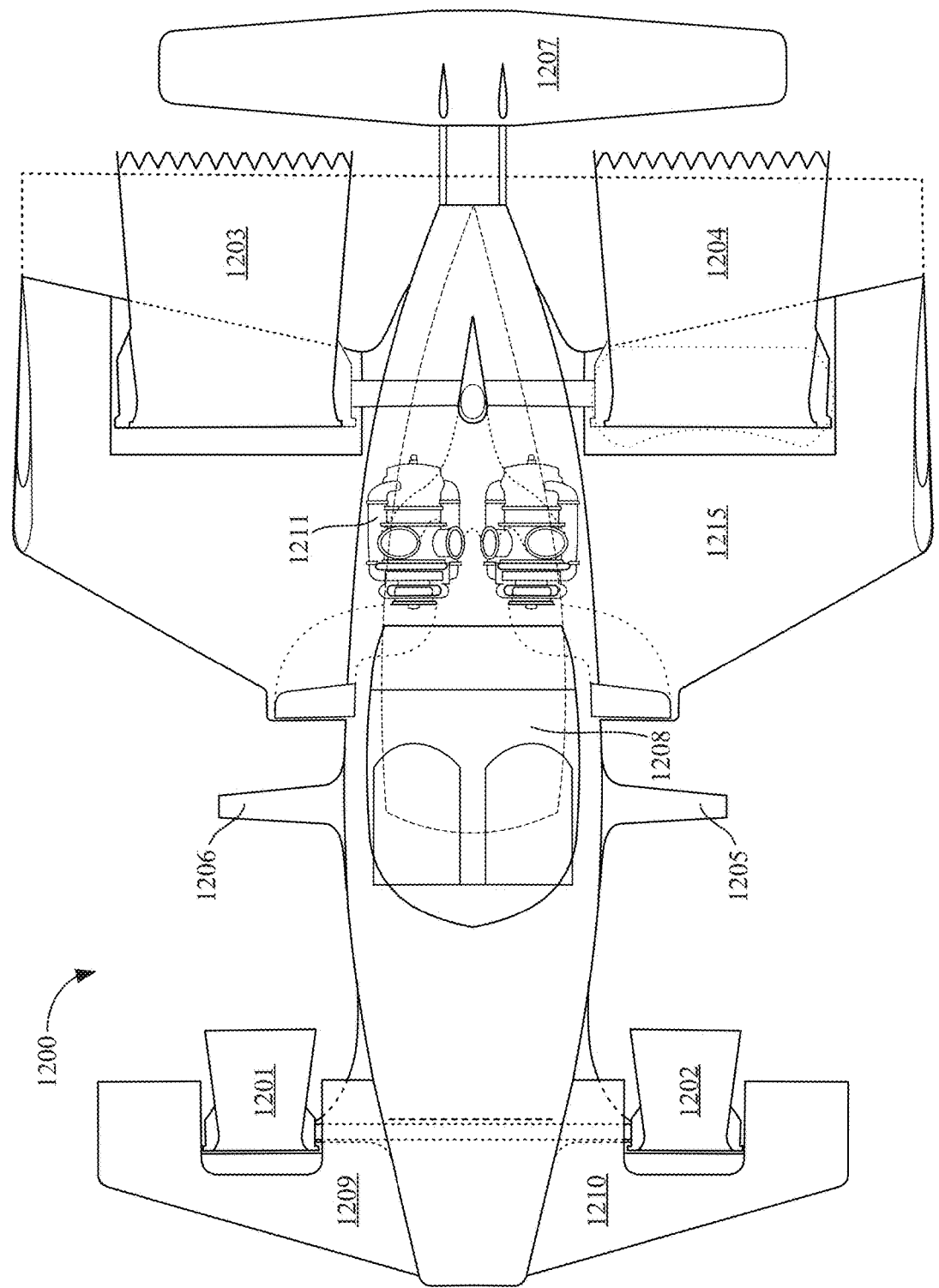

FIG. 12 is a top view of an alternative embodiment of the present invention.

Figure 13:
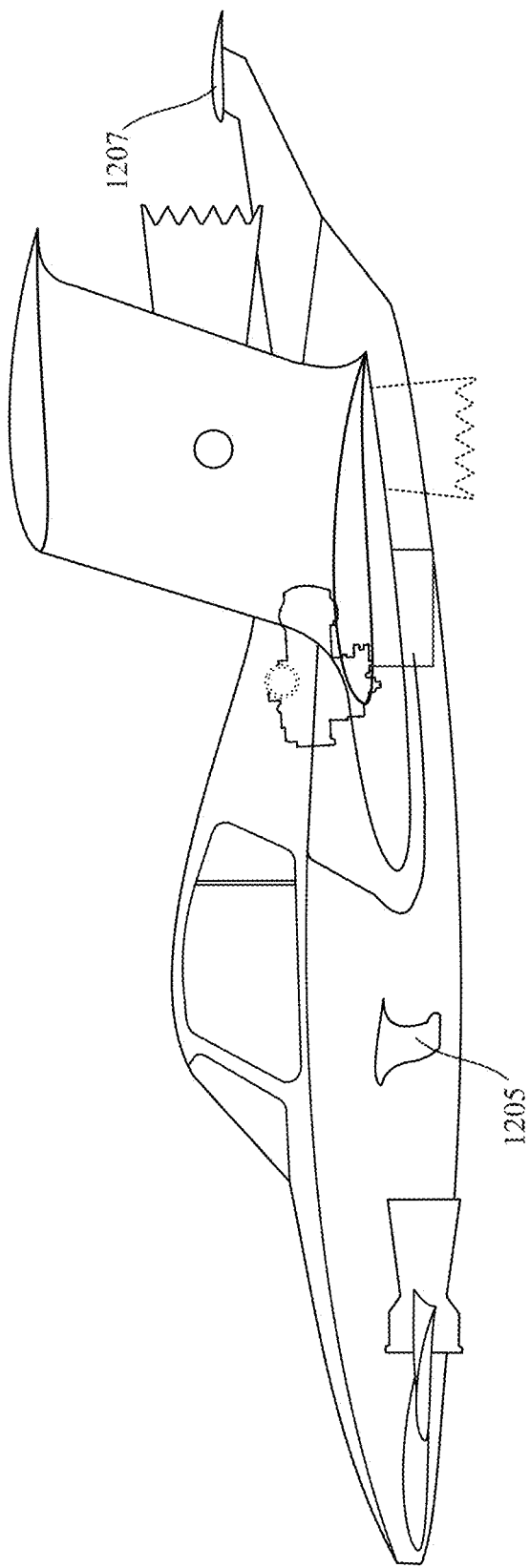

FIG. 13 is a side cross-sectional view of the embodiment shown in FIG. 12.

Figure 14:
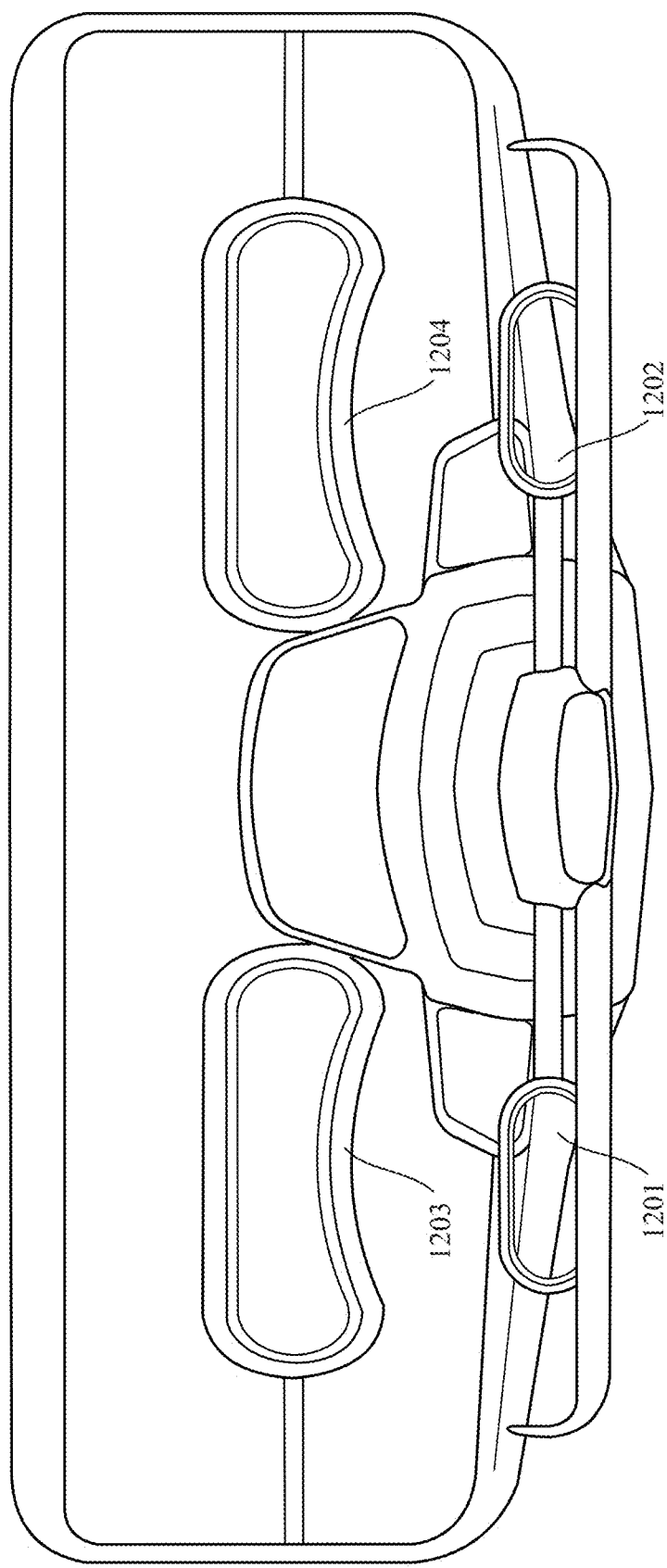

FIG. 14 is a front view of the embodiment shown in FIG. 12.

Figure 15:
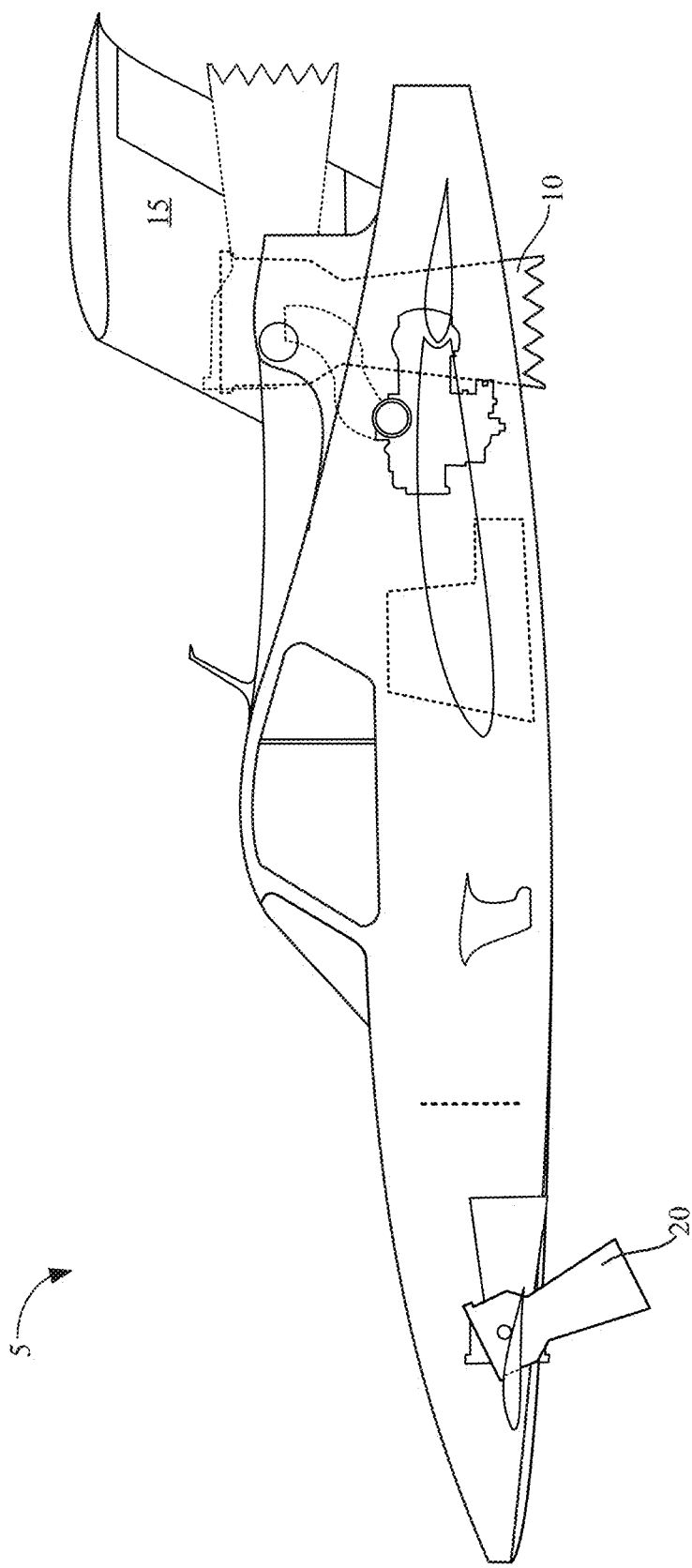

FIG. 15 is a side cross-sectional view of the embodiment shown in FIG. 8 during the take off to cruise transition.

Figure 16:
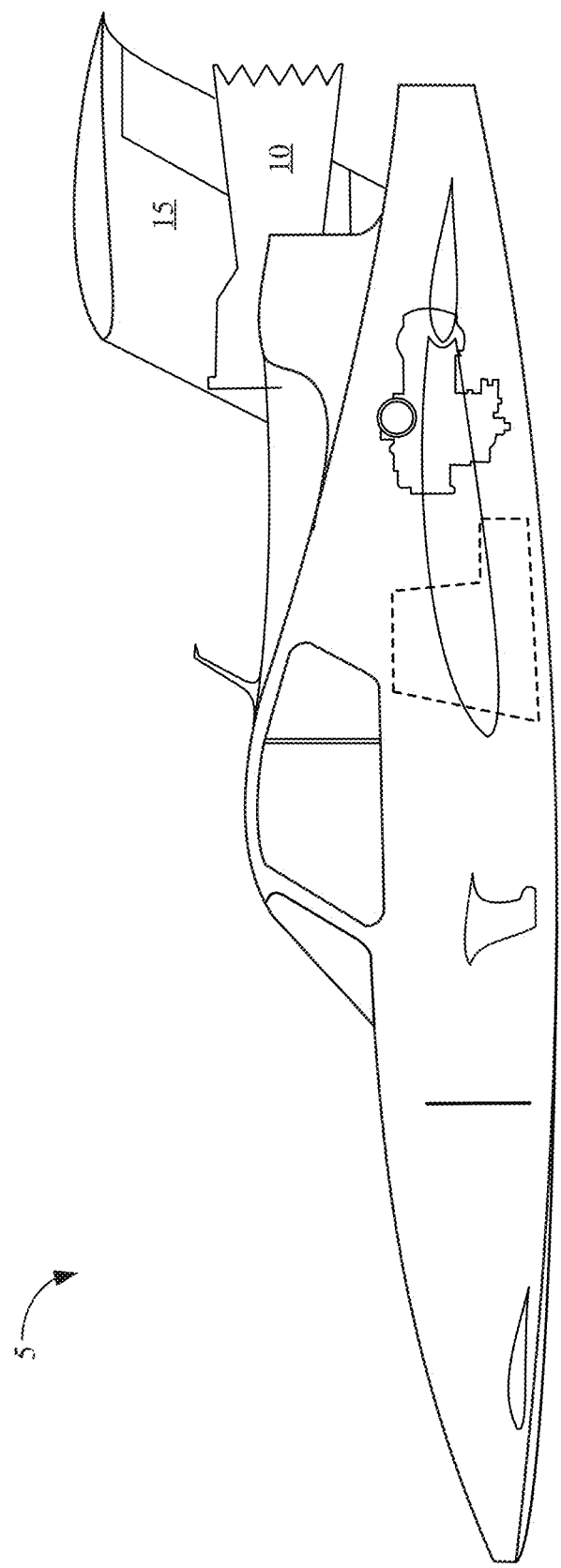

FIG. 16 illustrates the cruise position of the embodiment shown in FIG. 8.

DETAILED DESCRIPTION OF THE PREFERRED EMBODIMENT

This application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms. In addition, the headings in this application are for reference purposes only and shall not in any way affect the meaning or interpretation of the present invention.

The present application relates generally to thrust augmentation for unmanned aerial vehicles. In particular, one or more embodiments of the present invention disclosed in this application provide unique solutions to the challenges of vertical take-off and landing (VTOL) and short take-off and landing (STOL) aircrafts. As used herein, the terms "Tailsitter" and "Flying Vehicle" may refer to one or more embodiments of the present invention.

An embodiment of the present invention addresses the issue of thrust-to-weight ratio and sizing of the engine through enhancing and augmenting the thrust. In a preferred embodiment of the present invention, the ejectors/thrusters themselves are designed to allow for augmentation exceeding 2:1 and close to 3:1. This means that these thrusters are designed to produce a thrust that is 2-3 times greater than the thrust produced by a conventional turbojet. Thrust augmentation designs are disclosed in U.S. patent application Ser. No. 15/221,389, entitled FLUIDIC PROPULSIVE SYSTEM, filed Jul. 27, 2016 ("the '389 application") and U.S. patent application Ser. No. 15/256,178 filed Sep. 2, 2016 ("the '178 application"), each application of which is hereby incorporated by reference as if fully set forth herein. As used herein, "thrusters" shall refer to such ejectors/thrusters with significant augmentation that are described in the '389 application as well as any subsequent versions or improvements thereof.

In a preferred embodiment of the present invention, the Thruster is used with a gas generator as a source for primary flows. While it is not necessary to utilize such a Thruster with a gas generator that supplies the primary flow in the present invention, utilizing such a Thruster can enhance the effects of thrust augmentation.

Further augmentation can be achieved through a secondary, major ejector that can be formed by using the exhaust from the Thrusters in conjunction with, for example, a closed/box wing of the Tailsitter acting as a shroud. The wings may also take any other shape that is designed in such a way to allow the high-speed exhaust of the Thrusters to serve as primary nozzle for the ejector formed by the wing ("shroud") and Thrusters. The effects of the shroud can further augment the thrust by at least 10-25%. In effect, the Thrusters and the shroud can have a combined effect of thrust augmentation of, for example, 1.1 (from shrouded thrusters) times 2.5 (from Thrusters) augmentation, which results in a total augmentation of 2.75. Therefore, such a system can produce a thrust that is equal to the weight of the aircraft at takeoff by augmenting an otherwise ~2.75 thrust generated by a simple turbojet.

In any aircraft which takes off vertically on its tail, the aircraft would naturally need to adjust its attitude to level off at the acceptable attitude and reduce its thrust in order to keep the aircraft flying forward at a constant cruise speed. Thrust reduction via throttle reduction may adjust the power needed to overcome the drag of the aircraft, which may also mean a lesser augmentation of the entire system and sufficient to propel the aircraft forward and maintain its speed.

In one embodiment of the present invention, a 150-lbs aircraft may employ a 75-lbf turbojet adapted to become a gas generator. This concept is disclosed in U.S. Provisional Patent Application 62/263,407, entitled MICRO-TURBINE GAS GENERATOR AND PROPULSIVE SYSTEM, filed Dec. 4, 2015 ("the '407 Provisional Application) and U.S. patent application Ser. No. 15/368,428 filed Dec. 2, 2016 ("the '428 application"). The '407 Provisional Application and '428 application are herein incorporated by reference in their entireties. In this embodiment, these thrust augmenting ejectors can produce an augmentation of, for example, 1.75 times the original, which means 75 multiplied by 1.75, which results in 131.25 lbf augmented thrust. Without a shroud around the Thruster, the thrust may be limited to this value and may not allow the thrust to lift the aircraft off the ground. However, with a wing such as a boxed structure around the main Thruster(s) to shroud these Thrusters, the overall augmentation of the thrust becomes, for example, e.g., 1.15 multiplied by 131.25, resulting in 150.94 lbf, and hence exceeds the weight of the aircraft and allows for the take-off.

As the fuel is consumed on board the Tailsitter, the weight of the vehicle becomes lighter and the acceleration of the vehicle becomes larger, so the take-off happens at increasing speed and acceleration. Because the vehicle may not be inhabited, the accelerations may exceed the current human-limited accelerations that are restricted for human safety and non-life threatening standards. In one embodiment, the accelerations may exceed 20 times the gravitational acceleration. As such, after a short time, the vehicle may have the ability to change its attitude and achieve level flight by throttle and control surface changes. Lift increases as the vehicle changes its attitude, while the combined augmentation also diminishes in value due to the throttle pull back. The Tailsitter may then achieve level flight by concomitantly reducing the engine load (ergo gas generator primary stream) to the thrusters in the first level and allowing the boxed wing to produce the proper lift to maintain the attitude, while the thrusters produce enough thrust to overcome drag.

Conversely, on approach to the destination, the attitude of the aircraft can be adjusted with an increase angle of attack and the thrust augmentation again displaces the need for lift, as the forward speed reduces and the aircraft eventually can land vertically, on its tail portion, balanced by the thrusters and its combined augmentation effect.

One or more embodiments of the present invention are able to overcome the issue of balancing the forces and moments by having smaller moment arms than are needed to balance them around the center of mass, which is achieved by having a distribution of thrust across various locations in the aircraft. This, in turn, allows these embodiments to have more control and makes it easier to maintain a hover/upright position.

As discussed in the '389 and '407 applications, the unique technology allows for the distribution of thrust across various locations of the aircraft, with augmentation levels achieved in various thrusters (e.g., in front, "fore ejectors" behind canard wings, employed at hovering phases take-off and landing and turned off at level flight, and in the back the "tail ejectors" that generate the bulk of the thrust).

A conventional small (<250 lbf thrust) mini jet engine usually provides thrust at a single location, typically at the center of the exhaust section. Some small turbofans also provide the thrust in a concentrated point on the aircraft. One or more embodiments of the present invention allow the distribution of the thrust in a nearly linear and/or non-circular manner, as opposed to a circular manner, and thus distribute the thrust per the length of a wing or other airfoils and/or control surfaces of an aircraft. In the Tailsitter, both the main, hot stream and the bleed air portion of the stream from the compressor are used as motive fluids for the augmenting thrusters. Because this embodiment allows the distribution of the thrust in a linear, mainly non-circular and distributed, not at a concentrated point, it achieves better propulsive efficiency of the aircraft. In addition, there is the optionally advantageous feature of molding and shaping the thruster according to the shape of the airfoils to obtain better performance (e.g., increasing the stall margin of a given canard wing if thruster is placed downstream of it, or augmenting the lift on a main wing if the thruster is placed at an optimal location upstream of said main wing). The distributed thrust therefore improves the performance of the aircraft by distributing an otherwise 75 lbf turbojet hot and fast stream from a concentrated location at the back of the turbojet engine to, for example, at least four locations on the aircraft. In this example, thrusters are mounted at these four locations on the vehicle in an optimal manner, such that they are (i) receiving the pressurized air or gas stream from the compressor bleed system and exhaust of the gas generator respectively and (ii) augmenting each of the four thrust forces that would otherwise result from the simple isentropic expansion of the four primary streams by 1.5-3 times. This also results in an advantageous distributed flow and thrust from the four locations, thus enhancing the aircraft maneuverability and propulsive efficiency.

An embodiment (a turboprop STOL version) of the present invention includes augmentation of thrust based on motive fluid provided by a bleed system of a gas generator. The bleed system provides the port and starboard front thrusters with the motive air from the bleed. The front thrusters provide an augmentation corresponding to specific thrust of 100-300 lbf for each lb/sec of motive air provided by the bleed system. This value exceeds by far the typical 50-65 lbf/lb/sec specific thrust obtained with small turbojet engines, due to limited efficiencies of the components and lack of advanced technologies. When turned into a gas generator, the value of the compressed air is utilized by employing the thrusters in front and back of the system resulting in augmentation ratios of over 2:1. As such, more thrust can be obtained from the same energy input.

In such an embodiment, a control valve is employed to provide the balance of flow between the port and starboard thrusters. The modulation of the air can be obtained with valves placed between the engine bleed and the control valve box. The valves allow for control of the flow on each thruster and/or balance of the flow of the motive air between the two front thrusters by opening or closing a passage to one or both of the front thrusters and changing the motive fluid supply. This, in turn, generates an imbalance in thrust, and the imbalance results in the change in the aircraft attitude. The thrusters can also be swiveled around their main axis, while being modulated for primary flow (motive fluid flow) at the same time. This allows for control on the pitch and roll as well as some limited control on the yaw, and combinations thereof.

In an embodiment, thrusters are supplied a high pressure hot stream of exhaust gas delivered by the generator (minus the bleed air) via a transition piece or conduit. The transition piece connects the exhaust of the gas generator to the said rear thrusters. Thrusters use this delivery as a motive air to augment the thrust. This jet augmenting system is specifically designed to allow fast movement of the vehicle at the cost of additional fuel consumption, resulting in airspeeds of the vehicle exceeding 200 MPH and propulsive efficiencies of close to 80-90%. The system results in a typical specific fuel consumption of 0.8-1.1 lb/hr of fuel per lbf generated, which is typical of the low by-pass fans, but without a fan or turbine driving the fan. These levels are much more performant than the typical 1.5 lb/hr per lbf usually obtained with small turbojets, the majority of the current markets for drones. The system can also achieve the performance of specific fuel consumption of a low-bypass turbofan at much smaller scale and without employing a free turbine and a fan, per se, reducing thus the weight and complexity of the entire propulsion system and eliminating a large, moving assembly such as the fan/free turbine assembly.

In an embodiment, if the mission of the aircraft is longer duration/range and slower airspeeds at higher propulsive efficiencies, then the rear section of the propulsive system can be made flexible enough to be replaced by a turbine/propeller system while keeping the common, identical gas generator (front of the propulsive system) and augmenting "cold" thrusters. The turbine will receive the same flow as in the case of the jet augmenting system, but can extract the energy from the gas generator exhaust flow and turn it into mechanical work used to rotate the propeller rather than fluidically augment the flow in an ejector type thruster. The interfaces are very similar, the replacement consisting of the removal of the transition piece conduit with a conduit that guides the hot, pressurized gases towards the free turbine driving the propeller, after which the exhaust gases are expelled in the downstream direction and into the wash of the propeller. The advantage of such a flexible system is that with the similar arrangement, a turbopropeller pusher or a jet augmenting system can be interchangeable, allowing the user to choose the system based on the mission at hand. As such, a turbopropeller pusher system as described can achieve a specific fuel consumption level of below 0.6 lb/h per each horsepower or equivalent thrust lbf achieved. In one embodiment of the present invention, the UAV may be able to deliver a parcel as far as 200 miles away moving at an average cruise speed of 150 mph.

Furthermore, the propeller can be perfectly contained by, for example, the box wing system described herein, and thus the noise generated by the turboprop can be significantly reduced by direct (box wing) and indirect means (noise abatement materials inside the wing). In addition, the turboprop still benefits from the presence of the front thrusters and the use of bleed air to power them, allowing not only VTOL but where appropriate and VTOL not necessary, short take-off and landing.

In one or more embodiments of the present invention, the short take-off and landing (STOL) concept can be achieved by the employment of the front thrusters, significantly lowering the runway length required for take-off. By swiveling the thrusters, additional vectored thrust can be oriented to increase pitch during take-off and reduce the length needed as compared to a conventional aircraft. The front thrusters may be shut off during cruise or loitering, or re-activated at various stages of the flight, to augment lift, or thrust or both. The augmentation of the thrust can be accomplished through the very design of the thrusters. The augmentation of the lift can be accomplished by the placement of the front thrusters in relation to both the canard (front wings) and the main box wing. The downstream location of the front thrusters delays stall of the canard wings, allowing operation at higher angles of attack and higher lift coefficients before stall occurs. This is due to the lower pressure created in front of the thrusters, delaying the separation on the top of the wing, the main cause of stall on most wings at high angles of attack. The lift augmentation due to the main wing is mainly due to the increased flow resulting from the front thrusters, locally higher than the airspeed of the vehicle, which said flow is guided over the bottom part of the box wing and, as known to those familiar with the matter, augmenting the lift of the main wing.

Figure 1:
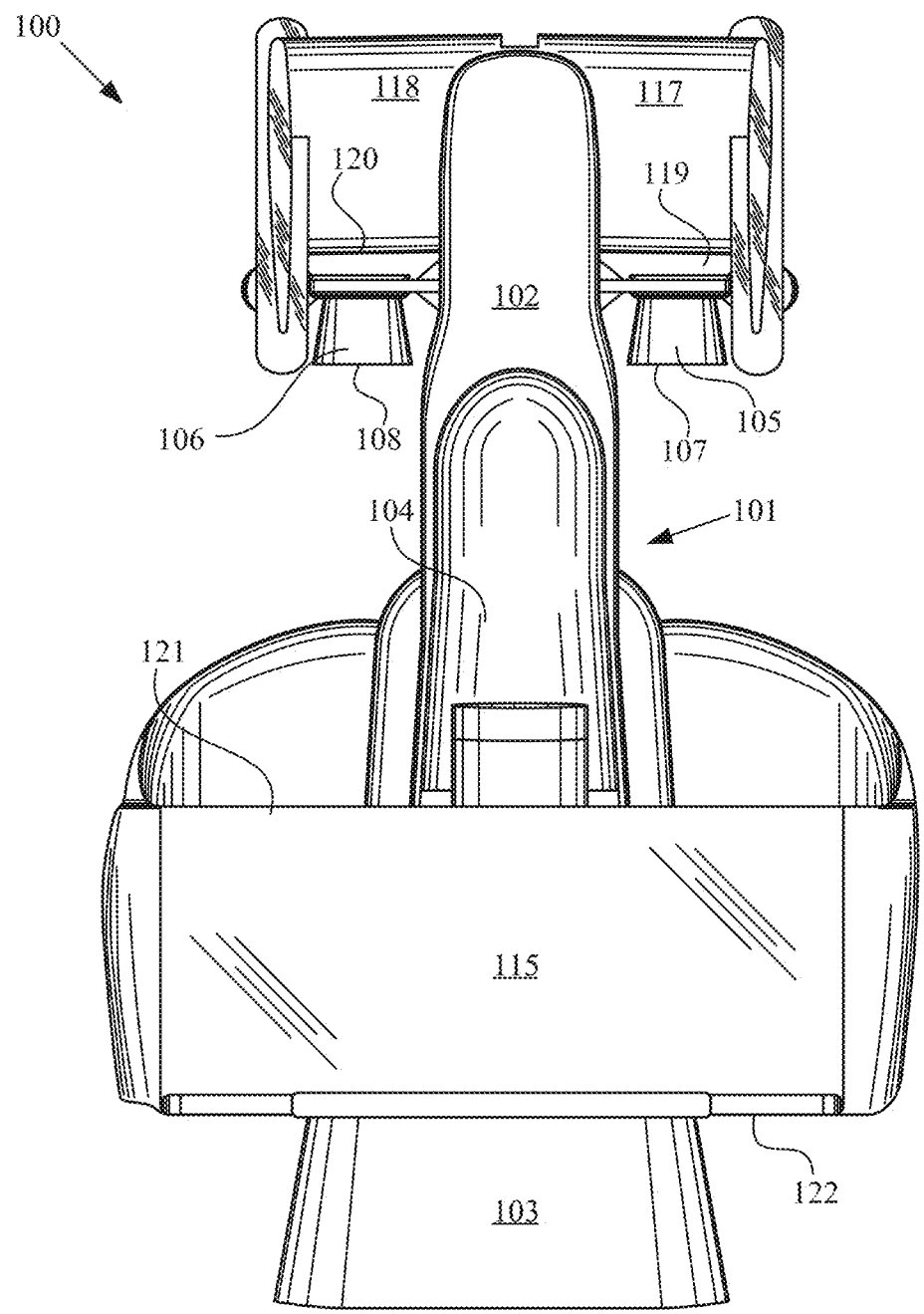
FIG. 1 illustrates a top view of an embodiment of the present invention.
Figure 2:
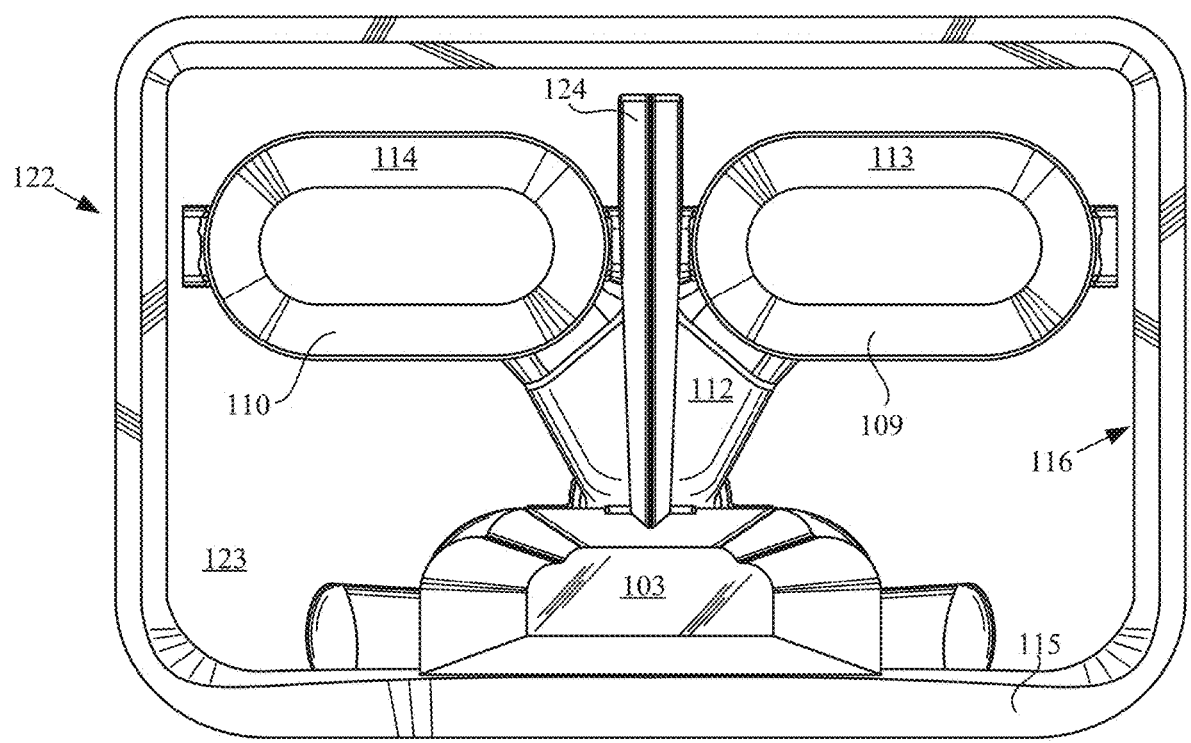
FIG. 2 is a rear view of the embodiment of the present invention shown in FIG. 1.
Figure 3:
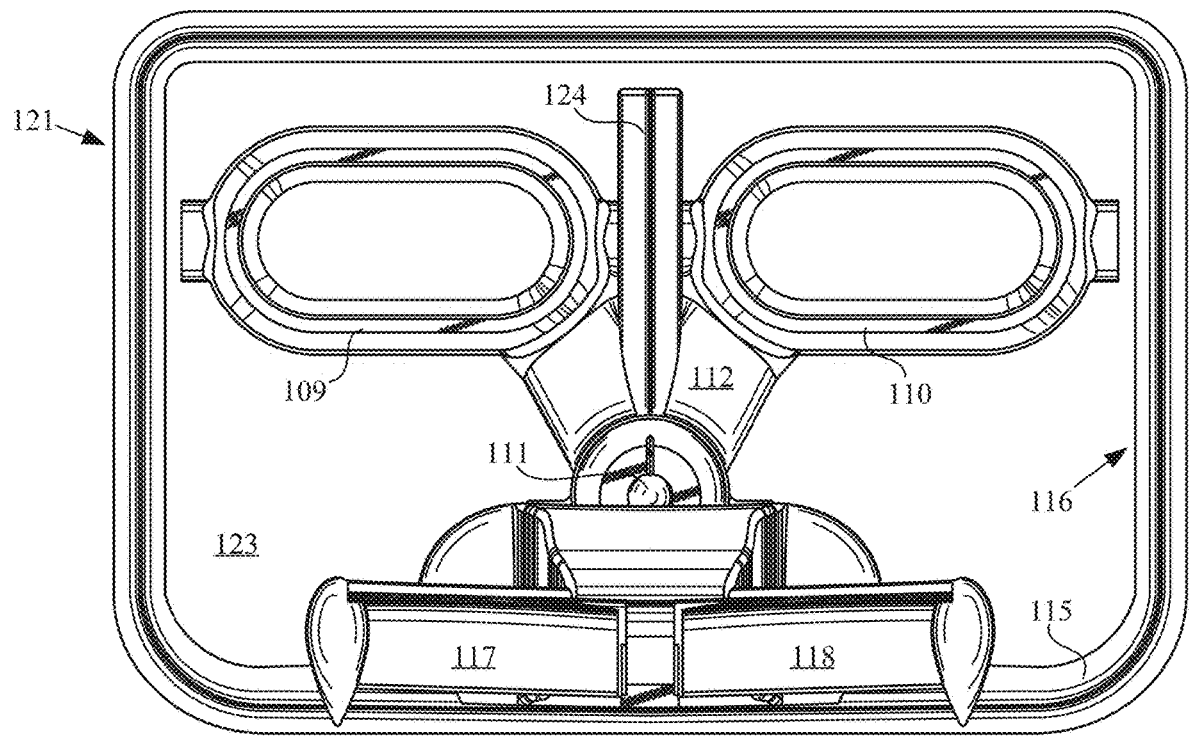
FIG. 3 is a front view of the embodiment of the present invention shown in FIG. 1.

FIGS. 1-3 illustrate a vehicle 100 according to an embodiment of the invention from different perspective views. In FIGS. 1-3, the vehicle 100 has a jet augmenting propulsive system with particular emphasis on VTOL capabilities. More specifically, vehicle 100 includes a main body 101 having a fore portion 102 and a tail portion 103. Main body 101 may include a cockpit portion (not shown) configured to enable manned operation of the vehicle 100. As with all flying/sailing craft, vehicle 100 has a starboard side and a port side. A fluid generator 104 is coupled to the main body 101 and produces a fluid stream. In an embodiment, the fluid generator 104 is disposed in the main body 101. At least one fore conduit (111 in FIG. 3) and at least one tail conduit 112 are fluidly coupled to the generator 104.

First and second fore ejectors 105, 106 are fluidly coupled to the at least one fore conduit 111, coupled to the fore portion 102 and respectively coupled to the starboard side and port side. The fore ejectors 105, 106 respectively include outlet structure 107, 108 out of which fluid from the at least one fore conduit 111 flows at a predetermined adjustable velocity. Additionally, the entirety of each of the fore ejectors 105, 106 is rotatable about an axis oriented parallel to the leading edges of the fore ejectors (i.e., transverse axis) to provide thrust orientation with both forward and upward components, for example, allowing the vehicle 100 to take off and continue climbing at much steeper angles of attack and hence reducing the runway length needed. At the end of the climb or during the climb, the fore ejectors 105, 106 can be realigned to the main direction of flight or shut off completely by turning off the bleed valves of the engine/gas generator 104 and adapting the speed and operation of the gas generator accordingly, driving the rear propulsion system (e.g., tail ejectors 109, 110). After landing, the fore ejectors 105, 106 can be swiveled 180 degrees to provide a thrust reverse against the direction of the landing, shortening the landing length. In an embodiment, the entirety of each of the fore ejectors 105, 106 is rotatable about an axis oriented perpendicular to the leading edges of the fore ejectors.

First and second tail ejectors 109, 110 is fluidly coupled to the at least one tail conduit 112 and coupled to the tail portion 103. The tail ejectors 109, 110 include outlet structure 113, 114 out of which fluid from the at least one tail conduit 112 flows at a predetermined adjustable velocity. Additionally, the entirety of each of the tail ejectors 109, 110 is rotatable about an axis oriented parallel to the leading edges of the tail ejectors (i.e., transverse axis). In an embodiment, the entirety of each of the tail ejectors 109, 110 is rotatable about an axis oriented perpendicular to the leading edges of the tail ejectors.

In an embodiment, the fluid generator 104 includes a first region in which the fluid stream is at a low temperature and a second region in which the fluid stream is at a high temperature. The at least one fore conduit 111 provides fluid from the first region to the fore ejectors 105, 106, and the at least one tail conduit 112 provides fluid from the second region to the tail ejectors 109, 110.

A primary airfoil element 115 is coupled to the tail portion 103. Element 115 is located directly downstream of the fore ejectors 105, 106 such that the fluid from the fore ejectors flows over at least one aerodynamic surface of the primary airfoil element. In an embodiment, the primary airfoil element 115 is a closed wing having a leading edge 121 and a trailing edge 122, the leading and trailing edges of the closed wing defining an interior region 123. Tail ejectors 109, 110 are at least partially disposed within the interior region 123 (i.e., between leading edge 121 and trailing edge 122) and are controllably movable (e.g., advancement, retraction, etc.) within the interior region relative to the airfoil element 115. As such, a shroud is formed by primary airfoil element 115 around the tail ejectors 109, 110, thereby forming a macro-ejector.

The vehicle 100 further includes first and second canard wings 117, 118 coupled to the fore portion 102 and respectively coupled to the starboard side and port side. The canard wings 117, 118 are configured to develop boundary layers of ambient air flowing over the canard wings when the vehicle 100 is in motion. The canard wings 117, 118 are respectively located directly upstream of the fore ejectors 105, 106 such that the fore ejectors are fluidly coupled to the boundary layers. The fore ejectors 105, 106 respectively include inlet portions (i.e., leading edges) 119, 120, and the fore ejectors are positioned such that the boundary layers are ingested by the inlet portions.

FIG. 4 illustrates in exploded view a vehicle 400 according to an alternative embodiment. For the sake of brevity, elements illustrated in FIG. 4 having characteristics identical to their counterparts illustrated in FIGS. 1-3 are denoted using the same reference numeral. Vehicle 400 includes a fluid generator 104, tail ejectors 109, 110, a tail conduit 112 to guide hot pressurized exhaust gas to the tail ejectors, and a rear thruster support strut 401. Vehicle 400 further includes canard wings 117, 118, a bleed air manifold 402 and a fore conduit 111 linking the bleed air manifold to a control valve box 403 having a motor control valve 404 that modulates both fluid flow to fore ejectors 105, 106 and balance of the primary flow supply between the fore ejectors. Flexible lines 405 guide compressed bleed air from control valve box 403 to fore ejectors 105, 106. Each of fore ejectors 105, 106 includes a flange 406 and a motor 407 for swiveling the fore ejectors about shaft 408.

Vehicle 400 further includes primary airfoil element 115 with control surfaces such as rudders, elevons, elevators, etc., an additional closed-wing airfoil element 409, and a secondary closed-wing airfoil element 410. The secondary airfoil element 410 has a leading edge located directly downstream of the outlet structure 113, 114 of tail ejectors 109, 110 such that the fluid from the tail ejectors flow over a surface of the at least one secondary airfoil element. Vehicle 400 further includes a central fin and rudder 124, tail portion 103 carrying tank, fluid generator 104, and controls, and fore portion 102.

FIG. 5 illustrates a vehicle 500 according to an alternative embodiment. For the sake of brevity, elements illustrated in FIG. 5 having characteristics identical to their counterparts illustrated in FIGS. 1-3 are denoted using the same reference numeral. Vehicle 500 includes a turbo-propeller propulsive system with particular emphasis on short take-off and landing (STOL) capabilities. Vehicle 500 includes all of the features of vehicle 100 except for tail ejectors 109, 110. Instead, vehicle 500 includes a propeller 510 driven by a turbine (not shown), which is in turn powered by fluid generator 104. An embodiment can include a support assembly 520, such as legs or other appropriate device, that provide support to vehicle 500 such that there is enough space and/or offset between the propeller 510 and a landing/takeoff surface when the vehicle 500 is at rest. Support assembly 520 preferably extends from the tail portion 103 and is substantially parallel to the main body 101.

FIGS. 6A-6D illustrate the progression from take-off to level flight relative to a landing/takeoff surface 600 of vehicle 100. The moveable fore ejectors 105, 106 may be responsible for the fine tuning of the vehicle 100 attitude in-flight up to level flight (cruise). One aspect of this embodiment is that the tail ejectors 109, 110, being larger and employing hot gases as primary fluid, do not necessarily need to swivel to control the attitude, while the fore ejectors 105, 106, being smaller and operating with colder gas from the compressor discharge or bleeds, can be swiveled to maintain the altitude and attitude of the vehicle 100 and drive its orientation in flight to the desired position and attitude. The fore ejectors 105, 106 could then be shut down from a central control valve that closes the bleed port, and/or retracted inside the fore portion 102, allowing the fluid generator 104 to operate at throttle pulled condition (less than 100% speed) and still generate hot gases in the back to supply the tail ejectors 109, 110 with primary fluid, bleed valve closed. An augmentation of 2:1 is still possible in level flight, with minor or no contribution from the boxed wing acting as shroud for the larger or macro-ejector formed by the tail ejectors 109, 110 and airfoil element 115 itself.

The advantageous effect of combining the tail ejectors 109, 110, which produce high-speed airflow, with the primary airfoil element 115 to generate additional thrust augmentation is particularly useful when taking-off in a tailsitter configuration. The tail ejectors 109, 110 become the primary nozzle of a classical ejector. Then the primary airfoil element 115, together with the tail ejectors 109, 110 to form a macro-ejector, generates a thrust augmentation of roughly 1.1-1.2 compared to simple thrusters without the shroud. The tail ejectors 109, 110 themselves can also produce a thrust augmentation of above 2, perhaps close to 3:1. As such, instead of obtaining a unit of thrust by simply using two turbojets, a total thrust augmentation of minimum 2*1.1=2.2 and up to a maximum of 3*1.2=3.6 augmentation factor is obtained, allowing the take-off of a heavier vehicle. As it levels off to cruise conditions, the engines can be throttled back, and the augmentation also decreases to match and overcome drag and propel the vehicle forward in level flight.

FIG. 7 illustrates the upper half a turboshaft/turboprop engine with highlights of the stations of the flow. The bottom half contains the same engine stripped of the shaft and turbine driving the shaft (free turbine driving the propeller, in this case) and using the gas generator to drive a jet augmenting system of the preferred embodiment of the present invention. FIG. 7 shows the changes that would be optionally advantageous for transforming a turboshaft designed engine into a gas generator for the jet augmenting system and highlights the interchangeability of the disclosed system.

In FIG. 7, a puller propeller configuration is shown in the upper half. In contrast, one embodiment of the present invention has the shaft pointing to the right, where the pusher propeller is located. The top half contains a compressor, a combustor and two turbines, one connected to the compressor and one connected to the propeller via a shaft. Station 2 represents a compressor inlet; a compressor outlet station 3; a combustor inlet 31; a combustor outlet 4; a first turbine (connected to and driving the compressor) inlet 41; a first turbine outlet 44; an inlet 45 to the free turbine; an exit 5 from the free turbine, an outlet 6 from the turbine and exhaust; and exhaust (from the overall system) 8. The bleed system from station 3 is used in this embodiment as motive fluid for the front thrusters of the system. The remainder of the working fluid is used by the gas generator to drive the free turbine, which is extracting power to drive the propeller. In the lower half, the system is stripped off the free turbine and the shaft (and implicitly the propeller), but all the other elements remain the same. The system is similar, with the first turbine driving the compressor, except the free turbine is eliminated, allowing the system to become a gas generator that produces at the station 44 a pressure a total pressure of 202.514 kiloPascals at a total temperature of 1248.65 Kelvin. This energy carrying flow can now be used as motive fluid for the tail ejectors 109, 110 of the jet augmenting system of the preferred embodiment of the present invention.

Other gas generators can be designed to produce, at normal operating conditions, a pressure ratio of around 2. An embodiment of the present invention can result in augmentation ratios exceeding 1.5 and various designs of the thrusters can reach up to and including 2.75:1 augmentation ratio. As such, a jet augmenting system of this embodiment operating in these conditions can increase the thrust by 1.4-3 times. Conversely, the specific fuel consumption is reduced as the same amount of fuel is used to produce the conditions at station 44, and 1.4 times more thrust is obtained from the exhaust gas at that condition, used as motive fluid in the rear and front thrusters. When compared to the fuel consumption of conventional small turbojets, typically at 1.5 lb/hr per lbf, the specific fuel consumption with the disclosed jet augmenting system is lowered by 1.4 times, to around 1.07 lb/hr fuel per each lbf produced. One or more embodiments show a reduction of up to 2.0 times compared to the original 1.5 lb/hr of fuel per lbf produced, bringing the system to a highly performant 0.75 lb/hr fuel per each lbf thrust produced, without the use of a free turbine.

An embodiment of the present invention includes two rear gas generators; a first rear large, moveable thruster; a second rear, large, moveable thruster; transition piece to guide hot pressurized exhaust gas to rear thrusters from each rear gas generator; support thrusters; manifold, compressor bleed air; pipe linking bleeds manifold to control valve box; control valve that modulates both flow to front thrusters as additional motive fluid and balance between front thrusters primary flow supply; motor control valve; flexible line guiding compressed bleed air from control valve box to front thrusters; front thruster main body; front thruster flange; motor for swiveling the front thruster; shaft; end panel/winglet canard wing; front moveable canard; a first design box wing and control surfaces (rudder, elevons, elevator); a second design box wing; a design sweptback box wing; central fin and rudder; main box of fuselage carrying tank, gas generator, controls; and front fuselage; and front gas generators for the front thrusters.

FIGS. 8-11 illustrate different perspective views of one embodiment of the invention having a jet-augmenting propulsive system with particular emphasis on VTOL capabilities. FIGS. 12-14 illustrate different perspective views of another embodiment including control airfoils. In FIGS. 15 and 16, the flying vehicle is illustrated in a position of transition from vertical takeoff to cruise condition.

An embodiment of the present invention addresses the first issue of thrust-to-weight ratio and sizing of the engine through enhancing and augmenting the thrust and using several gas generators distributed throughout the flying vehicle. In a preferred embodiment of the present invention, the thrusters themselves are designed to allow for augmentation exceeding 2:1 and close to 3:1. This means that these thrusters are designed to produce a thrust that is 2-3 times greater than the thrust produced by a conventional turbojet. Thrust augmentation designs are disclosed in the '389 application.

In a preferred embodiment of the present invention, the thruster is used with a gas generator as a source for primary flows. FIGS. 8-11 illustrate a vehicle 5 according to an embodiment of the invention from different perspective views. In FIGS. 8-11, the vehicle 5 has a jet augmenting propulsive system with particular emphasis on VTOL capabilities. More specifically, vehicle 5 includes a main body 55 having a fore portion 60 and a tail portion 65. Main body 55 may include a cockpit portion 35 configured to enable manned operation of the vehicle 5. As with all flying/sailing craft, vehicle 5 has a starboard side and a port side. Fluid generators 45a, 45b are coupled to the main body 55 and produce fluid streams. In an embodiment, the fluid generators 45a, 45b are disposed in the main body 55. Tail conduits 70a, 70b are fluidly coupled to the generators 45a, 45b.

Fore fluid generators 25a, 25b are coupled to the main body 55 toward the fore portion 60. First and second fore ejectors 20a, 20b are fluidly coupled to the fore fluid generators 25a, 25b by first and second fore conduits 75a, 75b, coupled to the fore portion 60 and respectively coupled to the starboard side and port side. The fore ejectors 20a, 20b respectively include outlet structure (not shown, but similar to outlet structures 107, 108 illustrated in FIG. 1) out of which fluid from the fore fluid generators 25a, 25b flows at a predetermined adjustable velocity. Additionally, the entirety of each of the fore ejectors 20a, 20b is rotatable about an axis oriented parallel to the leading edges of the fore ejectors (i.e., transverse axis) to provide thrust orientation with both forward and upward components, for example, allowing the vehicle 5 to take off and continue climbing at much steeper angles of attack and hence reducing the runway length needed.

At the end of the climb or during the climb, the fore ejectors 20a, 20b can be realigned to the main direction of flight or shut off completely by turning off the fore fluid generators 25a, 25b, retracting the fore ejectors into the main body 55, and adapting the speed and operation of the gas generator accordingly, driving the rear propulsion system (e.g., tail ejectors 10a, 10b). At landing, the fore ejectors 20a, 20b can be swiveled 180 degrees to provide a thrust reverse against the direction of the landing, shortening the landing length. In an embodiment, the entirety of each of the fore ejectors 20a, 20b is rotatable about an axis oriented perpendicular to the leading edges of the fore ejectors.

First and second tail ejectors 10a, 10b are fluidly coupled to the tail conduits 70a, 70b and coupled to the tail portion 65. The tail ejectors 10a, 10b include outlet structure (not shown, but similar to outlet structures 113, 114 illustrated in FIG. 1) out of which fluid from the tail conduits 70a, 70b flows at a predetermined adjustable velocity. Additionally, the entirety of each of the tail ejectors 10a, 10b is rotatable about an axis oriented parallel to the leading edges of the tail ejectors (i.e., transverse axis). In an embodiment, the entirety of each of the tail ejectors 10a, 10b is rotatable about an axis oriented perpendicular to the leading edges of the tail ejectors.

A primary airfoil element 15 is coupled to the tail portion 65. Element 15 is located directly downstream of the fore ejectors 20a, 20b such that the fluid from the fore ejectors flows over at least one aerodynamic surface of the primary airfoil element. In an embodiment, the primary airfoil element 15 is a closed wing having (similar to elements 121, 122 and 123 illustrated in and discussed with reference to FIG. 1) a leading edge and a trailing edge, the leading and trailing edges of the closed wing defining an interior region. Tail ejectors 10a, 10b are at least partially disposed within the interior region (i.e., between the leading edge and trailing edge) and are controllably movable (e.g., advancement, retraction, etc.) within the interior region relative to the airfoil element 15. As such, a shroud is formed by primary airfoil element 15 around the tail ejectors 10a, 10b, thereby forming a macro-ejector.

The vehicle 100 further includes first and second canard wings 30a, 30b coupled to the fore portion 60 and respectively coupled to the starboard side and port side. The canard wings 30a, 30b are configured to develop boundary layers of ambient air flowing over the canard wings when the vehicle 5 is in motion. The canard wings 30a, 30b are respectively located directly upstream of the fore ejectors 20a, 20b such that the fore ejectors are fluidly coupled to the boundary layers. The fore ejectors 20a, 20b respectively include inlet portions (i.e., similar to inlet portions 119, 120 illustrated in and discussed with reference to FIG. 1), and the fore ejectors are positioned such that the boundary layers are ingested by the inlet portions. The first and second canard wings 30a, 30b each have a leading edge, and the entirety of each of the first and second canard wings is rotatable about an axis oriented parallel to the leading edge.

During level flight, further augmentation can be achieved through a secondary, major ejector that can be formed by using the exhaust from the thrusters 10a, 10b in conjunction with, for example, the boxed wing 15 of the vehicle 5 acting as a shroud. The wings may also take any other shape that is designed in such a way to allow the high-speed exhaust of the thrusters 10a, 10b to serve as primary nozzle for the ejector formed by the wing 15 ("shroud") and thrusters. The effects of the shroud can further augment the thrust by at least 10-25%. In effect, the thrusters 10a, 10b and the shroud can have a combined effect of thrust augmentation of, for example, 1.1 (from shrouded thrusters) times 2.5 (from Thrusters) augmentation, which results in a total augmentation of 2.75. Therefore, one skilled in the art would appreciate that such a system would produce a thrust that defeats the drag of the vehicle moving at speed, by augmenting an otherwise ~2.75 thrust generated by a simple turbojet.

The thrusters 10a, 10b combined with the box wing 15 generate additional thrust augmentation. This effect is particularly useful when taking-off. The thrusters 10a, 10b become the primary nozzle of a classical ejector. Then the shroud (together with the thrusters 10a, 10b to form a macro-ejector) generates a thrust augmentation of roughly 1.1-1.2 compared to the simple thrusters without the shroud. The thrusters 10 themselves can also produce a thrust augmentation of above 2, close to 3:1 if thrusters according to an embodiment are used. As such, instead of obtaining a unit of thrust by simply using the two turbojets, a total thrust augmentation of minimum 2*1.1=2.2 and up to a maximum of 3*1.2=3.6 augmentation factor is obtained, allowing the take-off of a heavier vehicle. As it levels off to cruise conditions, the engines are throttled back, and the augmentation also decreases to match and overcome drag and propel the vehicle 5 forward in level flight.

In any aircraft which takes off vertically, the aircraft would naturally need to adjust its attitude to level off at the acceptable attitude and reduce its thrust in order to keep the aircraft flying forward at a constant cruise speed. Thrust reduction via throttle reduction may adjust the power needed to overcome the drag of the aircraft only, which may also mean a lesser augmentation of the entire system and sufficient to propel the aircraft forward and maintain its speed.

In one embodiment of the present invention, a 1500-lbs aircraft may employ two 300-lbf turbojets adapted to become a gas generator in the rear of the aircraft (Rear Gas Generators) and another two 150 lbf class turbojets adapted to become a gas generator in the nose of the aircraft (Forward Gas Generators). In this embodiment, these thrust augmenting ejectors can produce an augmentation of, for example, 1.75 times the original, which means 300 multiplied by 1.75, which results in 525 lbf augmented thrust for each thruster, therefore a total of 1050 lbf in the rear of the aircraft. The thrusters 10 may be swiveled to point downwards by rotation of the thrusters or by rotation of the entire gas generator and thruster assembly. As the flying vehicle 5 gains altitude, the thrusters 10 or entire assembly gas generator-thrusters rotate in the forward moving, level flight position, with the thrusters' hot gases oriented through the box wing 15 forming a shroud, at final level flight position. With a wing such as a boxed structure around the main thrusters 10a, 10b to shroud these thrusters in level flight, the overall augmentation of the thrust becomes, for example, e.g., 1.15 multiplied by 525 lbf, resulting in 603.75 lbf, and hence rapidly accelerating the vehicle forward.

The forward generators 25a, 25b would similarly augment the thrust to obtain ~525 lbf combined in the forward area of the aircraft 5, balancing the vehicle and providing a safe takeoff and landing attitude. Once the vehicle 5 is at safe altitude and forward speed, the forward generators 25a, 25b may be shut down and their associated forward thrusters 20 may be retracted inside the fuselage to reduce drag. The forward thrusters 20 may be extended again when close to landing or transitioning to hover, concomitantly with the forward gas generator restart. It should be noted that thrusters 10, 20 can include or consist of turbojets and/or turbopropellers.

As the fuel is consumed on board the vehicle 5, the weight of the vehicle becomes lighter and the acceleration of the vehicle becomes larger, hence increasing speed and acceleration. Because the vehicle 5 is inhabited, the accelerations need not exceed the current human-limited accelerations that are restricted for human safety and non-life-threatening standards. As such, after a short time, the vehicle 5 may have the ability to change its attitude and achieve level flight by throttle and control surface changes. Lift increases as the vehicle 5 changes its attitude, while the combined augmentation also diminishes in value due to the throttle pull back. The vehicle 5 may then achieve level flight by concomitantly reducing the engine load (ergo gas generator primary stream) to the thrusters 10 in the first level and allowing the boxed wing 15 to produce the lift necessary to maintain the attitude, while the thrusters only produce enough thrust to overcome drag.

Conversely, on approach to the destination, the attitude of the aircraft 5 can be adjusted with an increased angle of attack and the thrust augmentation again displaces the need for lift, as the forward speed reduces and the aircraft eventually can land vertically, on its tail, balanced by the thrusters 10, 20 and its combined augmentation effect.

One or more embodiments of the present invention are able to overcome the second issue of balancing the forces and moments by having smaller moment arms that are needed to balance them around the center of mass, which is achieved by having a distribution of thrust across various locations in the aircraft. This, in turn, allows these embodiments to have more control and makes it easier to maintain a hover/upright position.

As discussed in the '389 and '407 applications, the unique technology allows for the distribution of thrust across various locations of the aircraft, with augmentation levels achieved in various thrusters (e.g., in front, thrusters 20 behind the canard wings (movable canards) 30a, 30b, employed only at hovering phases take-off and landing and turned off at level flight and in the back, the "hot thrusters" 10 that generate the bulk of the thrust).

In the embodiment of a 1500# heavy vehicle 5 of FIG. 8, two smaller forward generators 25a, 25b are placed in the nose of the vehicle each feeding a smaller thruster 10a, 10b. The role of these forward generators 25a, 25b and thrusters 20a, 20b, which are placed near the canards 30, is to assist the take off by balancing the moments and forces in conjunction with the rear, larger thrusters, 10 and attain the level flight condition for which sufficient lift force is generated by the aerodynamic features of the vehicle 5 and complemented by the rear thrusters system.

At the point where the lift generated by the vehicle 5 becomes sufficient, the forward generators 25a, 25b and thrusters 20 shut off and retract within the fuselage, reducing the drag and allowing high speed of the vehicle when only the rear thrusters 10 operate.

In one embodiment a 1500 # Flying Vehicle uses a combined 500# augmenting thrusters 20 in the nose, supplied with gas by two forward generators 25a, 25b modified from 150 lbf turbojets. An augmentation of 1.75 yields a thrust of 262.5 lbf for each of the systems, for a combined nose thrust of 525 lbf. These forward generators 25a, 25b are gradually throttled back and eventually shut off when the vehicle 5 has reached the speed at which the aerodynamic lift force is sufficient, the thrusters 10a, 10b have completely swiveled into cruise position and produce a thrust enough to overcome drag.

On approach and landing, the front thrusters 20 are once again started with some assist from hot bleed air off the generators' 45a, 45b compressor discharge ports, to complement the lift reduction and allow the vehicle 5 to be controlled, while the rear thrusters 10 re-orient in landing/take off position.

A conventional small (<1500 lbf thrust) mini jet engine usually provides thrust at a single location, typically at the center of the exhaust section. Some small turbofans also provide the thrust in a concentrated point on the aircraft. One or more embodiments of the present invention allow the distribution of the thrust in a nearly linear and/or non-circular manner, as opposed to a circular manner as is the case in the existing prior art, and thus distribute the thrust per the length of a wing or other airfoils and/or control surfaces of an aircraft. In the vehicle 5, all gas generator and compressor bleed air streams may be used as motive fluids for the augmenting thrusters. Because this embodiment allows the distribution of the thrust in a linear, mainly non-circular and distributed, not at a concentrated point, it achieves better propulsive efficiency of the aircraft. In addition, there is the optionally advantageous feature of molding and shaping the thruster according to the shape of the airfoils to obtain better performance (e.g., increasing the stall margin of a given canard wing if thruster is placed downstream of it, or augmenting the lift on a main wing if the thruster is placed at an optimal location upstream of said main wing). The distributed thrust improves the performance of the aircraft by distributing an otherwise e.g. 600 lbf turbojet hot and fast stream from a concentrated location at the back of the turbojet engine in, for example, at least four locations on the aircraft. In addition, it would allow VTOL or STOL. In this example, thrusters are mounted at these four locations on the vehicle in an optimal manner, such that they are (i) receiving the pressurized air or gas stream from the compressor bleed system and exhaust of the gas generator respectively or a combination thereof and (ii) augmenting each of the four thrust forces that would otherwise result from the simple isentropic expansion of the four primary streams by 1.5-3 times. This also results in an advantageous distributed flow and thrust from the four locations, thus enhancing the aircraft maneuverability and propulsive efficiency.

FIGS. 15-16 illustrate the progression from take-off to level cruise flight of a vehicle 5 that has moveable rear thruster(s) 10 on the tail-end and retractable nose thruster(s) 20 on the front-end, with the nose thruster(s) being responsible for the fine tuning of the aircraft attitude in flight up to level flight (cruise). One of the advantages of this embodiment is that the nose thrusters 20, being smaller and employing hot gases from the forward generators 25a, 25b as primary fluid, do not necessarily need to swivel a lot or even at all to control the attitude if control surfaces are placed in position downstream of them, while the rear thrusters 10, being larger and operating with exhaust gas from the generators 45a, 45b, can be swiveled to maintain the altitude and attitude of the aircraft and drive its orientation in flight to the desired position and attitude. The nose thrusters 20 could then be shut down by shutting off the forward generators 25a, 25b, and/or retracted inside the fuselage, allowing the vehicle to fly only on the rear engines operating at throttle pulled condition (less than 100% speed) and still generate hot gases to supply the hot thrusters 10 with primary fluid. An augmentation of 2:1 is still possible in level flight, with minor or no contribution from the boxed wing 15 acting as shroud for the larger or macro-ejector formed by the hot thruster(s) and wing itself.

An embodiment includes a turboprop STOL version of the present invention. The turboprop version of the augmented propulsion system consists of the same front system of augmentation of thrust based on motive fluid provided by the two nose gas generators. The bleed system of the generators 45a, 45b may also be employed in further augmentation of the front thrusters, by providing the port and starboard front thrusters 20a, 20b with additional motive air from the bleed of the rear gas generators' compressors. The front thrusters provide an augmentation corresponding to specific thrust of 100-300 lbf for each lb/sec of motive air of exhaust gas provided by the bleed system and front gas generators exhaust. This value exceeds by far the typical 50-65 lbf/lb/sec specific thrust obtained with small turbojet engines, due to limited efficiencies of the components and lack of advanced technologies. When turned into a gas generator, the value of the compressed air and exhaust gas combined is utilized by employing the thrusters in front and back of the system resulting in augmentation ratios of over 2:1. As such, more thrust can be obtained from the same energy input.

In an embodiment, a control valve is employed to provide the balance of flow between the port and starboard thrusters 10a, 10b. The modulation of the air can be obtained with valves placed between the engine bleed and the control valve box 80. The valves allow for control of the flow on each thruster and/or balance of the flow of the motive air between the two front thrusters by opening or closing a passage to one or both of the front thrusters and changing the motive fluid supply. This, in turn, generates an imbalance in thrust, and the imbalance results in the change in the aircraft attitude. The thrusters can also be swiveled around their main axis, while being modulated for primary flow (motive fluid flow) at the same time. This allows for control on the pitch and roll as well as some limited control on the yaw, and combinations thereof.

An embodiment includes a jet augmenting propulsive system STOL version of the present invention. In this embodiment, the vehicle rear propulsion system consists of a jet augmenting system. Turbojets supply a high-speed exhaust gas through the box wing of the aircraft, produce in effect an augmentation of at least 1.05 and up to 1.15 times their original thrust. Turbojets are delivering in effect the motive gas to augment the thrust in a macro-ejector whose shroud is the box wing itself. The jet augmenting system is specifically designed to allow fast movement of the vehicle at the cost of additional fuel consumption, resulting in airspeeds of the vehicle exceeding 200 MPH and propulsive efficiencies exceeding 75%. The system results in a typical specific fuel consumption of 1.3-1.4 lb/hr of fuel per lbf generated, which is more economical than the 1.5 typical rate of the small turbojets. These levels are much more performant than the typical 1.5 lb/hr per lbf usually obtained with small turbojets, the majority of current markets for drones. The system can also achieve the performance of specific fuel consumption of a low-bypass turbofan at much smaller scale and without employing a free turbine and a fan, per se, reducing thus the weight and complexity of the entire propulsion system and eliminating a large, moving assembly such as the fan/free turbine assembly.

Alternatively or in addition to, if the mission of the aircraft is longer duration/range and slower airspeeds at higher propulsive efficiencies, then the rear section of the propulsive system can be made flexible enough to be replaced by a turbine/propeller system while keeping the common, identical gas generator (front of the propulsive system) and augmenting thrusters. The turbine will receive the same flow as in the case of the jet augmenting system, but will extract the energy from the gas generator exhaust flow and turn it into mechanical work used to rotate the propeller rather than fluidically augment the flow in an ejector type thruster. The interfaces are very similar, the replacement consisting of the removal of the transition piece conduit with a conduit that guides the hot, pressurized gases towards the free turbine driving the propeller, after which the exhaust gases are expelled in the downstream direction and into the wash of the propeller. The advantage of such a flexible system is that with the similar arrangement, a turbopropeller pusher or a jet augmenting system can be interchangeable, allowing the customer to choose the system based on the mission at hand. As such, a turbopropeller pusher system as described can achieve a specific fuel consumption level of below 0.6 lb/h per each horsepower or equivalent thrust lbf achieved. In one embodiment of the present invention, the flying vehicle may be able to transport a single person as far as 200 miles away moving at an average cruise speed of 150 mph.

Furthermore, the propeller can be perfectly contained by, for example, the box wing system described elsewhere, and thus the noise generated by the turboprop can be significantly reduced by direct (box wing) and indirect means (noise abatement materials inside the wing). In addition, the turboprop still benefits from the presence of the front thrusters and the use of bleed air to power them, allowing not only VTOL but, where appropriate and VTOL not necessary, short take-off and landing.

In one or more embodiments of the present invention, the short take-off and landing (STOL) concept can be achieved by the employment of the front thrusters, significantly lowering the runway length required for take-off. By swiveling the thrusters, additional vectored thrust can be oriented to increase pitch during take-off and reduce the length needed as compared to a conventional aircraft. The front thrusters may be shut off during cruise or loitering, or re-activated at various stages of the flight, to augment lift, or thrust or both. The augmentation of the thrust can be accomplished through the very design of the thrusters. The augmentation of the lift can be accomplished by the placement of the front thrusters in relation to both the canard (front wings) and the main box wing. The downstream location of the front wing delays stall of the front wings, allowing operation at higher angles of attack and higher lift coefficients before stall occurs. This is due to the lower pressure created in front of the thrusters, delaying the separation on the top of the wing, the main cause of stall on most wings at high angles of attack. The lift augmentation due to the main wing is mainly due to the increased flow resulting from the front thrusters, locally higher than the airspeed of the vehicle, which said flow is guided over the bottom part of the box wing and, as known to those familiar with the matter, augmenting the lift of the main wing.

The same principles can be applied to a STOL embodiment. In an embodiment, a port front thruster is swiveled at an angle favoring the thrust orientation with both forward and upward components, allowing the vehicle to take off and continue climbing at much steeper angles of attack and hence reducing the runway length needed. At the end of the climb or during the climb, the front thruster can be realigned to the main direction of flight or shut off completely by turning off the bleed valves of the engine/gas generator and adapting the speed and operation of the gas generator accordingly, driving the rear propulsion system only (e.g., jet augmenting system or turbopropeller). After landing, the front thrusters can be swiveled 180 degrees to provide a thrust reverse against the direction of the landing, shortening the landing length.

In an embodiment, and referring to FIGS. 12-14, a vehicle 1200 has a jet augmenting propulsive system with particular emphasis on VTOL capabilities. More specifically, vehicle 1200 includes a main body similar to main body 55 having a fore portion and a tail portion. Main body may include a cockpit portion 1208 configured to enable manned operation of the vehicle 1200. As with all flying/sailing craft, vehicle 1200 has a starboard side and a port side. At least one fluid generator 1211 is coupled to the main body and produces a fluid stream. In an embodiment, the fluid generator 1211 is disposed in the main body. At least one fore conduit and at least one tail conduit are fluidly coupled to the generator 1211.

First and second fore ejectors 1201, 1202 are fluidly coupled to the at least one fore conduit, coupled to the fore portion and respectively coupled to the starboard side and port side. The fore ejectors 1201, 1202 respectively include outlet structure out of which fluid from the at least one fore conduit flows at a predetermined adjustable velocity. Additionally, the entirety of each of the fore ejectors 1201, 1202 is rotatable about an axis oriented parallel to the leading edges of the fore ejectors (i.e., transverse axis) to provide thrust orientation with both forward and upward components, for example, allowing the vehicle 1200 to take off and continue climbing at much steeper angles of attack and hence reducing the runway length needed. At the end of the climb or during the climb, the fore ejectors 1201, 1202 can be realigned to the main direction of flight or shut off completely by turning off the bleed valves of the engine/fluid generator 1211, retracting the fore ejectors into the main body, and adapting the speed and operation of the gas generator accordingly, driving the rear propulsion system (e.g., tail ejectors 1203, 1204). At landing, the fore ejectors 1201, 1202 can be swiveled 180 degrees to provide a thrust reverse against the direction of the landing, shortening the landing length. In an embodiment, the entirety of each of the fore ejectors 1201, 1202 is rotatable about an axis oriented perpendicular to the leading edges of the fore ejectors.

First and second tail ejectors 1203, 1204 are fluidly coupled to at least one tail conduit and coupled to the tail portion. The tail ejectors 1203, 1204 include outlet structure out of which fluid from the at least one tail conduit flows at a predetermined adjustable velocity. Additionally, the entirety of each of the tail ejectors 1203, 1204 is rotatable about an axis oriented parallel to the leading edges of the tail ejectors (i.e., transverse axis). In an embodiment, the entirety of each of the tail ejectors 1203, 1204 is rotatable about an axis oriented perpendicular to the leading edges of the tail ejectors.

In an embodiment, the fluid generator 1211 includes a first region in which the fluid stream is at a low temperature and a second region in which the fluid stream is at a high temperature. The at least one fore conduit provides fluid from the first region to the fore ejectors 1201, 1202, and the at least one tail conduit provides fluid from the second region to the tail ejectors 1203, 1204.

A primary airfoil element 1215 is coupled to the tail portion. Element 1215 is located directly downstream of the fore ejectors 1201, 1202 such that the fluid from the fore ejectors flows over at least one aerodynamic surface of the primary airfoil element. In an embodiment, the primary airfoil element 1215 is a closed wing having a leading edge and a trailing edge, the leading and trailing edges of the closed wing defining an interior region. Tail ejectors 1203, 1204 are at least partially disposed within the interior region (i.e., between leading edge and trailing edge) and are controllably movable (e.g., advancement, retraction, etc.) within the interior region relative to the airfoil element 1215. As such, a shroud is formed by primary airfoil element 1215 around the tail ejectors 1203, 1204, thereby forming a macro-ejector.

The vehicle 1200 further includes first and second canard wings 1209, 1210 coupled to the fore portion and respectively coupled to the starboard side and port side. The canard wings 1209, 1210 are configured to develop boundary layers of ambient air flowing over the canard wings when the vehicle 1200 is in motion. The canard wings 1209, 1210 are respectively located directly upstream of the fore ejectors 1201, 1202 such that the fore ejectors are fluidly coupled to the boundary layers. The fore ejectors 1201, 1202 respectively include inlet portions (i.e., leading edges), and the fore ejectors are positioned such that the boundary layers are ingested by the inlet portions. Vehicle 1200 may further include control airfoils 1205, 1206, 1207.

Although the foregoing text sets forth a detailed description of numerous different embodiments, it should be understood that the scope of protection is defined by the words of the claims to follow. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A vehicle, comprising:
   a main body having a fore portion, a tail portion, a starboard side, a port side and a cockpit formed therein to accommodate a human pilot;
   a first fluid generator coupled to the main body and producing a first fluid stream;
   at least one tail conduit fluidly coupled to the first generator;
   first and second fore ejectors coupled to the fore portion and respectively coupled to the starboard side and port side, the fore ejectors respectively comprising an outlet structure out of which fluid flows at a predetermined adjustable velocity;
   at least one tail ejector fluidly coupled to the at least one tail conduit and coupled to the tail portion, the at least one tail ejector comprising an outlet structure out of which fluid from the at least one tail conduit flows at a predetermined adjustable velocity; and
   a primary airfoil element coupled to the tail portion and comprising a closed wing having a leading edge and a trailing edge, the leading and trailing edges of the closed wing defining an interior region, the at least one tail ejector being at least partially disposed within the interior region.

2. The vehicle of claim 1, further comprising first and second canard wings coupled to the fore portion and respectively coupled to the starboard side and port side, the canard wings configured to develop boundary layers of ambient air flowing over the canard wings when the vehicle is in motion, the canard wings being respectively located directly upstream of the first and second fore ejectors such that the first and second fore ejectors are fluidly coupled to the boundary layers.

3. The vehicle of claim 2, wherein the first and second canard wings each have a leading edge, and the entirety of each of the first and second canard wings is rotatable about an axis oriented parallel to the leading edge.

4. The vehicle of claim 2, wherein the first and second fore ejectors respectively comprise first and second inlet portions, and the first and second fore ejectors are positioned such that the boundary layers are ingested by the inlet portions.

5. The vehicle of claim 1, further comprising:
   second and third fluid generators coupled to the main body and respectively producing a second fluid stream and a third fluid stream; and
   first and second fore conduits respectively fluidly coupled to the second and third generators, wherein the first and second fore ejectors are respectively fluidly coupled to the first and second fore conduits and respectively receive the second and third fluid streams.

6. The vehicle of claim 1, wherein the first fluid stream produced by the first generator is the sole means of propulsion of the vehicle.

7. The vehicle of claim 1, wherein the first and second fore ejectors each have a leading edge, and the entirety of each of the first and second fore ejectors is rotatable about an axis oriented parallel to the leading edge.

8. The vehicle of claim 1, wherein the first and second fore ejectors are retractable into the main body during a cruise condition of the vehicle.

9. The vehicle of claim 1, wherein the at least one tail ejector has a leading edge, and the entirety of the at least one tail ejector is rotatable about an axis oriented parallel to the leading edge.

10. The vehicle of claim 1, wherein the tail ejector is controllably movable relative to the interior region while the vehicle is in flight.

11. The vehicle of claim 1, wherein:
    the fluid generator comprises a first region in which the fluid stream is at a low temperature and a second region in which the fluid stream is at a high temperature;
    the at least one fore conduit provides fluid from the first region to the first and second fore ejectors; and
    the at least one tail conduit provides fluid from the second region to the at least one tail ejector.

12. A vehicle, comprising:
    a main body having a fore portion, a tail portion, a starboard side, a port side and a cockpit to accommodate a human pilot;
    a first fluid generator coupled to the main body and producing a first fluid stream;
    at least one tail conduit fluidly coupled to the first generator;
    first and second fore ejectors coupled to the fore portion and respectively coupled to the starboard side and port side, the fore ejectors respectively comprising an outlet structure out of which fluid flows at a predetermined adjustable velocity;
    at least one propeller fluidly coupled to the at least one tail conduit and coupled to the tail portion; and
    a primary airfoil element comprising a closed wing having a leading edge and a trailing edge, the leading and trailing edges of the closed wing defining an interior region, the at least one propeller being at least partially disposed within the interior region.

13. The vehicle of claim 12, further comprising first and second canard wings coupled to the fore portion and respectively coupled to the starboard side and port side, the canard wings configured to develop boundary layers of ambient air flowing over the canard wings when the vehicle is in motion, the canard wings being respectively located directly upstream of the first and second fore ejectors such that the first and second fore ejectors are fluidly coupled to the boundary layers.

14. The vehicle of claim 13, wherein the first and second canard wings each have a leading edge, and the entirety of each of the first and second canard wings is rotatable about an axis oriented parallel to the leading edge.

15. The vehicle of claim 13, wherein the first and second fore ejectors respectively comprise first and second inlet portions, and the first and second fore ejectors are positioned such that the boundary layers are ingested by the inlet portions.

16. The vehicle of claim 12, further comprising:
    second and third fluid generators coupled to the main body and respectively producing a second fluid stream and a third fluid stream; and first and second fore conduits respectively fluidly coupled to the second and third generators, wherein the first and second fore ejectors are respectively fluidly coupled to the first and second fore conduits and respectively receive the second and third fluid streams.

17. The vehicle of claim 12, wherein the first and second fore ejectors each have a leading edge, and the entirety of each of the first and second fore ejectors is rotatable about an axis oriented parallel to the leading edge.

18. The vehicle of claim 12, wherein the first and second fore ejectors are retractable into the main body during a cruise condition of the vehicle.

19. The vehicle of claim 12, wherein:
the fluid generator comprises a first region in which the fluid stream is at a low temperature and a second region in which the fluid stream is at a high temperature;
the at least one fore conduit provides fluid from the first region to the first and second fore ejectors; and
the at least one tail conduit provides fluid from the second region to a turbine coupled to the at least one propeller.

* * * * *